US008739040B2

(12) United States Patent
Graham

(10) Patent No.: US 8,739,040 B2
(45) Date of Patent: May 27, 2014

(54) MULTIMEDIA VISUALIZATION AND INTEGRATION ENVIRONMENT

(75) Inventor: Jamey Graham, San Jose, CA (US)

(73) Assignee: Ricoh Company, Ltd., Tokyo (JP)

(*) Notice: Subject to any disclaimer, the term of this patent is extended or adjusted under 35 U.S.C. 154(b) by 1205 days.

(21) Appl. No.: 10/701,966

(22) Filed: Nov. 4, 2003

(65) Prior Publication Data
US 2004/0103372 A1 May 27, 2004

Related U.S. Application Data

(63) Continuation of application No. 10/081,129, filed on Feb. 21, 2002.

(51) Int. Cl.
G06F 3/048 (2013.01)
(52) U.S. Cl.
USPC .......................................................... 715/723
(58) Field of Classification Search
USPC ......... 715/764, 701, 702, 716, 787, 723, 835, 715/719, 724, 725; 725/61, 51, 52
See application file for complete search history.

(56) References Cited

U.S. PATENT DOCUMENTS

| 4,417,239 | A | 11/1983 | Demke et al. |
| 4,481,412 | A | 11/1984 | Fields |
| 4,807,186 | A | 2/1989 | Ohnishi et al. |
| 4,823,303 | A | 4/1989 | Terasawa |
| 4,881,135 | A | 11/1989 | Heilweil |
| 5,129,048 | A | 7/1992 | Ng |
| 5,153,831 | A | 10/1992 | Yianilos |
| 5,250,787 | A | 10/1993 | Arii et al. |
| 5,258,880 | A | 11/1993 | Takahashi |
| 5,309,359 | A | 5/1994 | Katz et al. |
| 5,339,391 | A | 8/1994 | Wroblewski et al. |
| 5,349,658 | A | 9/1994 | O'Rourke et al. |
| 5,382,776 | A | 1/1995 | Arii et al. |
| 5,384,703 | A | 1/1995 | Withgott et al. |
| 5,404,295 | A | 4/1995 | Katz et al. |
| 5,418,948 | A | 5/1995 | Turtle |
| 5,436,792 | A | 7/1995 | Leman et al. |

(Continued)

FOREIGN PATENT DOCUMENTS

| EP | 248 403 A2 | 12/1987 |
| EP | 378 848 A2 | 7/1990 |

(Continued)

OTHER PUBLICATIONS

Communication Pursuant to Article 96(2) EPC, European Application No. 04255836.1, Jun. 11, 2007, 10 pages.

(Continued)

Primary Examiner — William Bashore
Assistant Examiner — Hien Duong
(74) Attorney, Agent, or Firm — Kilpatrick Townsend & Stockton LLP

(57) ABSTRACT

Embodiments of the present invention provide techniques for retrieving and displaying multimedia information. According to an embodiment of the present invention, a graphical user interface (GUI) is provided that displays multimedia information that may be stored in a multimedia document. According to the teachings of the present invention, the GUI enables a user to navigate through multimedia information stored in a multimedia document. The GUI provides both a focused and a contextual view of the contents of the multimedia document.

15 Claims, 29 Drawing Sheets

(56) References Cited

U.S. PATENT DOCUMENTS

| | | |
|---|---|---|
| 5,442,795 A | 8/1995 | Levine et al. |
| 5,467,288 A | 11/1995 | Fasciano et al. |
| 5,479,600 A | 12/1995 | Wroblewski et al. |
| 5,481,666 A | 1/1996 | Nguyen et al. |
| 5,485,554 A | 1/1996 | Lowitz et al. |
| 5,568,406 A | 10/1996 | Gerber |
| 5,596,700 A | 1/1997 | Darnell et al. |
| 5,600,775 A | 2/1997 | King et al. |
| 5,633,723 A | 5/1997 | Sugiyama et al. |
| 5,638,543 A | 6/1997 | Pedersen et al. |
| 5,675,752 A | 10/1997 | Scott et al. |
| 5,680,636 A | 10/1997 | Levine et al. |
| 5,694,559 A | 12/1997 | Hobson et al. |
| 5,706,097 A | 1/1998 | Schelling et al. |
| 5,721,897 A | 2/1998 | Rubinstein et al. |
| 5,737,599 A | 4/1998 | Rowe et al. |
| 5,745,756 A | 4/1998 | Henley |
| 5,748,805 A | 5/1998 | Withgott et al. |
| 5,751,283 A | 5/1998 | Smith |
| 5,758,037 A | 5/1998 | Schroeder |
| 5,761,655 A | 6/1998 | Hoffman |
| 5,778,397 A | 7/1998 | Kupiec et al. |
| 5,781,785 A | 7/1998 | Rowe et al. |
| 5,784,616 A | 7/1998 | Horvitz |
| 5,790,114 A | 8/1998 | Geaghan et al. |
| 5,809,318 A | 9/1998 | Rivette et al. |
| 5,819,301 A | 10/1998 | Rowe et al. |
| 5,832,474 A | 11/1998 | Lopresti et al. |
| 5,835,667 A * | 11/1998 | Wactlar et al. .............. 386/241 |
| 5,838,317 A | 11/1998 | Bolnick et al. |
| 5,857,185 A | 1/1999 | Yamamura |
| 5,860,074 A | 1/1999 | Rowe et al. |
| 5,870,770 A | 2/1999 | Wolfe |
| 5,873,107 A | 2/1999 | Borovoy et al. |
| 5,892,536 A | 4/1999 | Logan et al. |
| 5,894,333 A | 4/1999 | Kanda et al. |
| 5,895,476 A | 4/1999 | Orr et al. |
| 5,898,166 A | 4/1999 | Fukuda et al. |
| 5,898,709 A | 4/1999 | Imade et al. |
| 5,933,829 A | 8/1999 | Durst et al. |
| 5,933,841 A | 8/1999 | Schumacher et al. |
| 5,943,679 A | 8/1999 | Niles et al. |
| 5,946,678 A * | 8/1999 | Aalbersberg ..................... 1/1 |
| 5,950,187 A | 9/1999 | Tsuda |
| 5,978,773 A | 11/1999 | Hudetz et al. |
| 5,986,692 A | 11/1999 | Logan et al. |
| 5,987,454 A | 11/1999 | Hobbs |
| 5,999,173 A | 12/1999 | Ubillos |
| 6,005,562 A | 12/1999 | Shiga et al. |
| 6,006,218 A | 12/1999 | Breese et al. |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,061,758 A | 5/2000 | Reber et al. |
| 6,094,648 A | 7/2000 | Aalbersberg |
| RE36,801 E | 8/2000 | Logan et al. |
| 6,098,082 A | 8/2000 | Gibbon et al. |
| 6,101,503 A | 8/2000 | Cooper et al. |
| 6,108,656 A | 8/2000 | Durst et al. |
| 6,115,718 A | 9/2000 | Huberman et al. |
| 6,125,229 A | 9/2000 | Dimitrova et al. |
| 6,151,059 A | 11/2000 | Schein et al. |
| 6,160,633 A | 12/2000 | Mori |
| 6,182,090 B1 | 1/2001 | Peairs |
| 6,193,658 B1 | 2/2001 | Wendelken et al. |
| 6,199,048 B1 | 3/2001 | Hudetz et al. |
| 6,211,869 B1 | 4/2001 | Loveman et al. |
| 6,222,532 B1 | 4/2001 | Ceccarelli |
| 6,262,724 B1 | 7/2001 | Crow et al. |
| 6,340,971 B1 | 1/2002 | Janse et al. |
| 6,369,811 B1 | 4/2002 | Graham et al. |
| 6,421,067 B1 | 7/2002 | Kamen et al. |
| 6,430,554 B1 | 8/2002 | Rothschild |
| 6,434,561 B1 | 8/2002 | Durst, Jr. et al. |
| 6,452,615 B1 | 9/2002 | Chiu et al. |
| 6,505,153 B1 | 1/2003 | Van Thong et al. |
| 6,518,986 B1 | 2/2003 | Mugura |
| 6,529,920 B1 | 3/2003 | Arons et al. |
| 6,535,639 B1 | 3/2003 | Uchihachi et al. |
| 6,542,933 B1 | 4/2003 | Durst, Jr. et al. |
| 6,546,385 B1 | 4/2003 | Mao et al. |
| 6,564,225 B1 * | 5/2003 | Brogliatti et al. ..................... 1/1 |
| 6,567,980 B1 * | 5/2003 | Jain et al. ..................... 725/61 |
| 6,596,031 B1 | 7/2003 | Parks |
| 6,601,026 B2 | 7/2003 | Appelt et al. |
| 6,608,563 B2 | 8/2003 | Weston et al. |
| 6,623,528 B1 | 9/2003 | Squilla et al. |
| 6,628,303 B1 * | 9/2003 | Foreman et al. .............. 715/723 |
| 6,636,869 B1 | 10/2003 | Reber et al. |
| 6,647,535 B1 | 11/2003 | Bozdagi et al. |
| 6,651,053 B1 | 11/2003 | Rothschild |
| 6,675,165 B1 | 1/2004 | Rothschild |
| 6,684,368 B1 | 1/2004 | Hull et al. |
| 6,745,234 B1 | 6/2004 | Philyaw et al. |
| 6,750,978 B1 | 6/2004 | Marggraff et al. |
| 6,760,541 B1 | 7/2004 | Ohba |
| 6,766,363 B1 | 7/2004 | Rothschild |
| 6,781,609 B1 | 8/2004 | Barker et al. |
| 6,789,228 B1 * | 9/2004 | Merril et al. .................. 715/243 |
| 6,865,608 B2 | 3/2005 | Hunter |
| 6,865,714 B1 | 3/2005 | Liu et al. |
| 6,993,573 B2 | 1/2006 | Hunter |
| 7,131,058 B1 | 10/2006 | Lapstun et al. |
| 7,143,362 B2 * | 11/2006 | Dieberger et al. ............. 715/764 |
| 7,167,191 B2 * | 1/2007 | Hull et al. ..................... 715/748 |
| 7,254,311 B2 * | 8/2007 | Nagasaka et al. ............. 386/241 |
| 7,304,662 B1 * | 12/2007 | Sullivan et al. ............... 348/150 |
| 7,319,964 B1 * | 1/2008 | Huang et al. .................. 704/278 |
| 7,495,795 B2 | 2/2009 | Graham et al. |
| 7,540,011 B2 * | 5/2009 | Wixson et al. .................. 725/52 |
| 7,596,755 B2 | 9/2009 | Graham |
| 7,765,574 B1 * | 7/2010 | Maybury et al. .............. 725/105 |
| 7,823,055 B2 * | 10/2010 | Sull et al. ..................... 715/201 |
| 8,341,194 B2 * | 12/2012 | Gottsman ..................... 707/805 |
| 8,560,559 B1 | 10/2013 | Patel et al. |
| 2001/0003214 A1 * | 6/2001 | Shastri et al. .................. 725/109 |
| 2001/0005203 A1 | 6/2001 | Wiernik |
| 2001/0013041 A1 | 8/2001 | Beck et al. |
| 2001/0037408 A1 | 11/2001 | Thrift et al. |
| 2001/0043789 A1 | 11/2001 | Nishimura et al. |
| 2001/0044810 A1 | 11/2001 | Timmons |
| 2002/0010641 A1 | 1/2002 | Stevens et al. |
| 2002/0012521 A1 * | 1/2002 | Nagasaka et al. ............... 386/46 |
| 2002/0036800 A1 | 3/2002 | Nozaki |
| 2002/0047870 A1 | 4/2002 | Carro |
| 2002/0048224 A1 | 4/2002 | Dygert et al. |
| 2002/0054083 A1 * | 5/2002 | Boreczky et al. .............. 345/738 |
| 2002/0056082 A1 * | 5/2002 | Hull et al. ...................... 725/1 |
| 2002/0059342 A1 | 5/2002 | Gupta et al. |
| 2002/0059608 A1 * | 5/2002 | Turner ........................... 725/53 |
| 2002/0065814 A1 * | 5/2002 | Okamoto et al. ................ 707/3 |
| 2002/0070982 A1 | 6/2002 | Hill et al. |
| 2002/0095460 A1 | 7/2002 | Benson |
| 2002/0099452 A1 | 7/2002 | Kawai |
| 2002/0107973 A1 * | 8/2002 | Lennon et al. ................. 709/231 |
| 2002/0116575 A1 | 8/2002 | Toyomura et al. |
| 2002/0135808 A1 | 9/2002 | Parry |
| 2002/0143772 A1 * | 10/2002 | Gottsman ....................... 707/10 |
| 2002/0152267 A1 * | 10/2002 | Lennon ......................... 709/203 |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0007776 A1 | 1/2003 | Kameyama et al. |
| 2003/0025599 A1 | 2/2003 | Monroe |
| 2003/0052897 A1 | 3/2003 | Lin |
| 2003/0065665 A1 | 4/2003 | Kinjo |
| 2003/0078766 A1 | 4/2003 | Appelt et al. |
| 2003/0090505 A1 | 5/2003 | McGee et al. |
| 2003/0117652 A1 | 6/2003 | Lapstun |
| 2003/0156589 A1 | 8/2003 | Suetsugu |
| 2003/0164844 A1 * | 9/2003 | Kravitz et al. ................. 345/700 |
| 2003/0184598 A1 | 10/2003 | Graham |

(56) References Cited

U.S. PATENT DOCUMENTS

| | | |
|---|---|---|
| 2003/0189588 A1 | 10/2003 | Girgensohn et al. |
| 2003/0220988 A1 | 11/2003 | Hymel |
| 2003/0234803 A1 | 12/2003 | Toyama et al. |
| 2004/0006577 A1 | 1/2004 | Rix |
| 2004/0008209 A1 | 1/2004 | Adams et al. |
| 2004/0015524 A1 | 1/2004 | Chalstrom et al. |
| 2004/0037540 A1 | 2/2004 | Frohlich et al. |
| 2004/0064338 A1 | 4/2004 | Shiota et al. |
| 2004/0064339 A1 | 4/2004 | Shiota et al. |
| 2004/0071441 A1 | 4/2004 | Foreman et al. |
| 2004/0090462 A1 | 5/2004 | Graham |
| 2004/0095376 A1 | 5/2004 | Graham et al. |
| 2004/0098671 A1 | 5/2004 | Graham et al. |
| 2004/0100506 A1 | 5/2004 | Shiota et al. |
| 2004/0119819 A1 | 6/2004 | Aggarwal et al. |
| 2004/0143602 A1 | 7/2004 | Ruiz et al. |
| 2004/0175036 A1 | 9/2004 | Graham |
| 2004/0181815 A1 | 9/2004 | Hull et al. |
| 2004/0187167 A1* | 9/2004 | Maguire et al. ............... 725/135 |
| 2004/0247298 A1 | 12/2004 | Ohba |
| 2004/0249650 A1 | 12/2004 | Freedman et al. |
| 2005/0064935 A1 | 3/2005 | Blanco |
| 2007/0033419 A1 | 2/2007 | Kocher et al. |
| 2008/0106597 A1 | 5/2008 | Amini et al. |
| 2009/0313301 A9* | 12/2009 | Reed et al. ................. 707/104.1 |
| 2010/0220976 A1* | 9/2010 | Ellis et al. ....................... 386/83 |

FOREIGN PATENT DOCUMENTS

| | | |
|---|---|---|
| EP | 459 174 A2 | 12/1991 |
| EP | 737 927 A2 | 10/1996 |
| EP | 762 297 A2 | 3/1997 |
| EP | 788 063 A2 | 6/1997 |
| EP | 788 064 A2 | 6/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 04-021165 A | 1/1992 |
| JP | 05-081327 A | 4/1993 |
| JP | 8-297677 A | 11/1996 |
| JP | 2000-253337 A | 9/2000 |
| JP | 2000-516006 A | 11/2000 |
| JP | 2001-111963 A | 4/2001 |
| JP | 2001-176246 A | 6/2001 |
| JP | 2001-362910 A | 11/2001 |
| JP | 2002-158936 A | 5/2002 |
| JP | 2004-023787 A | 1/2004 |
| JP | 2004-199696 A | 7/2004 |

OTHER PUBLICATIONS

Stifelman, L. et al., "The Audio Notebook," SIGCHI 2001, Mar. 31-Apr. 5, 2001, pp. 182-189, vol. 3, No. 1, Seattle, WA.
Communication mailed Aug. 14, 2007, received from the Japanese Patent Office in Japanese Application 11-195547.
Office Action of Jun. 10, 2008 in Japanese Application No. JP 2003-158077.
"About Telus investors glossary." pp. 1-7 downloaded from http://about.telus.com/investors/glossary.html on Apr. 14, 2005.
Acrobat Reader Version 2.0 (software application). Adobe Systems Incorporated. screenshots Figures 1-10 (1994).
Adobe Acrobat Reader 3.0 screen dumps (fig. 1-3). (1996).
Adobe Systems. Inc., "Adobe Photoshop 4.0 User Guide for Macintosh and Windows." 1996. Title Page, Copyright Page, Chap. 2, pp. 30-31.
Ball, Thomas, and Eick, Stephen G., "Software Visualization in the Large," IEEE Computer, vol. 29. No. 4, Apr. 1996. pp. 33-43. http://www.computer.org/computer/co1996/r4033abs.htm.
Begole et al.. "Flexible Collaboration Transparency," doc. ID: nestrl.vatech_cs/TR-98-11. Virginia Polytechnic Institute and State University (1998).
Begole et al.. "Supporting Worker Independence in Collaboration Transparency," doc. ID: nestrl.vatech_cs/TR-98-12, Virginia Polytechnic Institute and State University (1998).
Bobick et al. "A State Based Approach to the Representation and Recognition of Gesture." IEEE Trans. on Pattern Analysis and Machine Intelligence, pp. 1325-1337 (1997).
Boguraev et al. "Salience-based Content Characterization of Text Documents." In Proceedings of Workshop on Intelligent Scalable Text Summarization at the ACL/EACL Conference, Madrid, Spain. 12 pages (Jul. 7-12, 1997).
Boreczky. J. et al. "An interactive Comic Book Presentation for Exploring Video," Conference on Human factors in Computing Systems (CHI 2000). ACM Press. pp. 185-192, 2000.
Boykin et al. "Machine learning of Event Segmentation for News on Demand," Communications of the ACM, 43:35-41(2000).
Brandow et al., "Automatic Condensation of Electronic Publications by Sentence Selection." *Information Processing and Management*, 31(5):675-685 (1995).
Brown et al. "Automatic Content-Based Retrieval of Broadcast News." ACM Multimedia 5. San Francisco. CA (1995).
Byrd, D., "A Scrollbar-based Visualization for Document Navigation." doc. ID: xxx.cs.IR/9902028. Computing Research Repository: Information Retrieval (1999).
Chen et al. "Emotion Recognition from Audiovisual Information," Proc. IEEE Workshop on Multimedia Signal Processing. Los Angeles, CA, USA. pp. 83-88 (1998).
Chiu et al. "NoteLook: Taking Notes in Meetings with Digital Video and Ink," ACM Multimedia 99 Orlando. (1999).
Chiu et al. "Automatically linking multimedia meeting documents by image matching." Proceedings of Hypertext '00. ACM, New York, pp. 244-245 (2000).
Choi et al., "An Integrated Data Model and a Query Language for Content-Based Retrieval of Video." *MIS '98 LNCS 1508*, Springer Verlag Berlin Heidelberg, pp. 192-198 (1998).
Christel et al. "Evolving Video Skims into Useful Multimedia Abstractions." Proceedings of the CHI '98 Conference on Human Factors in Computing Systems (Los Angeles, CA, Apr. 1998), pp. 171-178 (1998).
Christel et al. "Information Visualization within a Digital Video Library," Journal of Intelligent Information Systems 11:35-257 (1998).
Office Action of Dec. 4, 2007 in JP2003-158077.
"Computer Terms," pp. 1-8 downloaded from http:www.parkmeadow.org/computer_terms.htm on Apr. 14, 2005.
Dellaert et al. "Recognizing emotion in speech," Proceedings ICSLP 96. Fourth International Conference on Spoken Language Processing New York (Cat. No. 96TH8206). IEEE. vol. 1970-1973 (1996).
Dimitrova et al. "Video Keyframe Extraction and Filtering: A Keyframe is not a Keyframe to Everyone." CIKM 1997:113-120 (1997).
Donato et al. "Classifying Facial Actions". IEEE Trans. on Pattern Analysis and Machine Intelligence. 21:974-989 (1999).
Drucker et al. "SmartSkip: Consumer Level Browsing and Skipping of Digital Video Content." Paper: Technology to Help People Find Information. vol. No. 4. Issue No. 1. pp. 219-226, Minneapolis, Minnesota, USA, (Apr. 20-25. 2002).
Essa et al. Coding Analysis Interpretation and Recognition of Facial Expressions. IEEE Trans. on Pattern Analysis and Machine Intelligence. 19:757-763 (1997).
"Flexible JAMM Screenshots." downloaded from internet site http://simon.cs.ct.edu/-jamm May 4, 2000.
Foote, Jonathan, et al. "An Intelligent Media Browser using Automatic Multimodal Analysis." ACM Multimedia 8, Bristol, UK (1998).
"Fujitsu Markets Facsimile Connection System for Computer I/O." *Comline Telecommunications*, Nov. 1989, p. 5.
Furui et al. "Japanese Broadcast News Transcription and Information Extraction." Communications of the ACM. 43(2):71-73. Feb. 2000.
Gauvain et al. "Transcribing Broadcast News for Audio and Video Indexing." Communications of the ACM, 43:64-70 (2000).

(56) References Cited

OTHER PUBLICATIONS

Gibbon "Generating Hypemiedia Documents from Transcriptions of Television Programs Using Parallel Text Alignment," *Handbook of Internet and Multimedia Systems and Applications*. David C. Gibbon: CRC Press, (1998).

Gliedman. J., "Virtual Office Managers." *Computer Shopper*. 18(9):290 (1998).

Grunin. L., "Action." *PC Magazine*. 12(15):240 (1993).

Hauptmann et al. "Story Segmentation and Detection of Commercials in Broadcast News Video." Advances in Digital Libraries Conference, Santa Barbara, CA. Apr. 22-23, 1998.

Hauptmann et al. "Text, speech and vision for video segmentation: the informedia project," Proc. AAAI Fall Symp. Computational Models for Integrating Language and Vision. Boston, MA, Nov. 10-12, 1995.

Hearst et al., "TileBars: Visualization of Term Distribution Information in Full Text Information Access," *Proceedings of the ACM SIGCHI Conference on Human Factors in Computing Systems (CHI)*. Denver. CO., May 1995. pp. 1-8. http://www.acm.org/sigchi/chi95/Electronic/docunmts/papers/mah bdy htm.

Hecht "Embedded data glyph Technology for Hardcopy Digital Documents." Proc. SPIE 2171:341-352 (1994).

Hill et al. "Edit Wear and Read Wear," Computer Graphics and Interactive Media Research Group. pp. 3-9, (May 1992).

Hu et al. "Multimedia Description Framework (MDF) for content descriptions of Audio/Video Documents," Fourth ACM Conference on Digital Libraries (DL '99) Aug. 11-14. 1999.

"IBM, Partners Team on Web-Based Image Search. Printing Sep. 29, 1995," Newsbytes News Network, Sep. 1995.

IBM Technical Disclosure Bulletin, "Quick Selection of Window Environment Coordinates," 35:57-60. ISS # 4B, (1992).

Identitech, "Identitech announces FYI 2.5.2 release with NT object server, SmartForm. and ODBC," Business Editors, Jul. 1996.

"Identitech Unysis: Unysis wins Florida Housing Finance Agency Contract: Identitech provides workflow software solution," Business Editors/Computer Writers, Jun. 1995.

Ioffe et al. "Finding people by sampling." Proc. International Conference on Computer Vision. pp. 1092-1097 (1999).

"IT&T Talk", pp. 1-4 dopwnloaded from http://www.iib.qld.gov.au/itcareers/talk.asp on Apr. 14, 2005.

Jin et al. "Topic Tracking for Radio, TV Broadcast, and Newswire." Proceedings of the DARPA Broadcast News Workshop, Feb. 28-Mar 3. 1999. Herndon, VA.

Komlodi et al. "Key Frame Preview Techniques for Video Browsing." (Proceedings of the 3rd ACM International Conference on Digital Libraries. Jun. 23-26, 1998, Pittsburgh, pp. 118-125 (1998).

Langley. P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406.

Li et al. "Text Extraction and Recognition in Digital Video." Proceedings of Third IAPR Workshop on Document Analysis Systems, pp. 119-128, 1998.

Li et al. "VISION: a digital video library," Proceedings of the 1st ACM International Conference on Digital Libraries. pp. 19-27, 1996.

Liang et al. "Practical video indexing and retrieval system." *SPIE*, 3240:294-303 (1988).

Lienhart et al. "On the Detection and Recognition of Television Commercials," Proc. IEEE Conf. on Multimedia Computing and Systems. Ottawa, Canada, pp. 509-516. Jun. 1997.

Lison et al., "Sight and Soun," *Unix Review*, 7(10):76-86 (1989).

Ma et al. "An Indexing and Browsing System for Home Video." Invited paper. EUSIPCO '2000. 10th European Signal Processing Conference. Sep. 5-8, 2000. Tampere, Finland.

Manber. U., "The Use of Customized Emphasis in Text Visualization," *Proceedings of 1997 IEEE Conf. on Information Visualization*, pp. 132-138. held Aug. 27-29, 1997 in London England.

Maybury "News on Demand," Communications of the ACM. 43:33-34 (2000).

Maybury et al. "Multimedia Summaries of Broadcast News." International Conference on Intelligent Information Systems pp. 447-449 (1997).

Maybury et al. "Multimedia Summaries of Broadcast News." International Conference on Intelligent Information Systems, Dec. 8-10, 1997.

Maybury et al. "Segmentation, Content Extraction and Visualization of Broadcast News Video Using Multistream Analysis." AAAI Paper (1997).

Merlino et al. "Broadcast News Navigation using Story Segmentation." Advanced Information Systems Center, The MITRE Corporation (1997).

Merlino et al. "Broadcast News Processing Techniques." MITRE Technical Report, MTR 99B0000031. Apr. 1999.

Mohan "Text-based search of TV news stories," Proc. SPIE 2916:2-13 (1996).

Myers et al. "Multi-View Intelligent Editor for Digital Video Libraries," First ACM and IEEE Joint Conference on Digital Libraries. Jun. 24-28, 2001, Roanoke, VA, pp. 106-115.

Oh et al. "Efficient and Cost-effective Techniques for Browsing and Indexing Large Video Databases," SIGMPD Conference 2000: 415-426.

Ohmori, Y., "A Tool for Programmable Access to Organized Multimedia Data—Enhanced MultiMedia Recorder (EMMR)," *Joho Shori Gakkai Kenkyu Hokoku*, 98(35[HI-78]):39-44 (1998).

Roschelle et al., "VideoNoter: A productivity too for video data analysis," *Behavior Research Methods, Instruments & Computers*, 23(2):219-224 (1991).

Saur et al.. "Automated Analysis and Annotation of Basketball Video," *SPIE*, 3022:176-187 (1997).

Schweighofer et al., "The Automatic Generation of Hypertext Links in Legal Documents," *Lecture Notes in Computer* Science, vol. 1134, Wagner et al., eds., from 7th Int. Conf., DEXA 96', held Sep. 1996 in Zurich. Switzerland (1996).

Shahraray et al. "Pictorial transcripts: multimedia processing applied to digital library creation." 1997 IEEE First Workshop on Multimedia Signal Processing pp. 581-586 (1997).

Shahraray et al. "Automated Authoring of Hypermedia Documents of Video Programs." *ACM Multimedia 95*, Nov. 5-9, 1995, San Francisco, CA (1995).

Sodergard et al., "Integrated multimedia publishing—combining TV and newspaper content on personal channels." downloaded from http:www8.org/w8-papers/1b-multimedia/integrated/integrated. html on Apr. 4, 2002, pp. 1-22.

Sonmez et al. "Multiple speaker tracking and detection: handset normalization and duration scoring," Digital Signal Processing 10:133-143 (2000).

"Spry Inc.'s Internet Front End Picked for PSI Cable Internet Service," *Information & • Interactive Services Report*, 15(7), (1994).

Strattner. A., "HP pioneers I-TV peripheral market," *Computer Shopper*, 14(2):71 (1994).

Suda et al. "Logo and word matching using a general approach to signal registration," Fourth International Conference on Document Analysis and Recognition. Ulm, Germany. Aug. 18-20, 1997. pp. 61-65.

Sumita et al., "Document Structure Extraction for Interactive Document Retrieval Systems," *Proceedings of SIGDOC 93*. pp. 301-310, held Oct. 5-8, 1993 in Kitchner, Ontario.

Taghva et al.. "Evaluation of an automatic markup system," Proceedings SPIE vol. 2422. . Document Recognition II. pp. 317-327 (Mar. 1995).

Taxt. T., "Segmentation of Document Images," *IEEE*, 11(12):1322-1329 (1989).

Tennenhouse et al. "A software-oriented approach to the design of media processing environments," Proceedings of the IEEE International Conference on Multimedia Computing and Systems. pp. 435-444 (1994).

Tonomura et al. "VideoMAP and VideoSpaceIcon : tools for anatomizing video content." Proc. INTERCHI '93 ACM pp. 131-136 (1993).

(56) References Cited

OTHER PUBLICATIONS

Uchihashi et al. "Video Manga: Generating Semantically Meaningful Video Summaries," *ACM Multimedia 99*, Orlando. Florida. Oct. 30-Nov. 5, 1999.
Van Horn-Christopher, "Have you talked to your computer today?," *Business Forum*, 19(3):10-11 (1994).
"VNR firm offers Storyboards" PR News. Dec. 4, 1995 downloaded from http://proquest.umi.com/pqdlink?index=20&did=000000010830394&SrchMode=3&sid=1&F on Aug. 9, 2004.
"WC3 issues first public draft of Synchronized Multimedia Integration Language (SMIL)," *Information Today*, 15(2):27 (1998) downloaded on May 28, 2004.
Wactlar et al. "Complementary Video and Audio Analysis for Broadcast News Archives." Communications of the ACM. 43:42-47 (2000).
Wactler et al. "Intelligent access to digital video: lnformedia project." Computer 29:46-52 (1996).
Wittenburg et al. "Browsing with Dynamic Key Frame Collages in Web-Based Entertainment Video Services." In Proceedings of IEEE International Conference on Multimedia Computing and Systems, Jun. 7-11, 1999, Florence, Italy 2:913-918 (1999).
"c:\...\9149920c.wpd—unmodified" Screen Shots of document created in Corel WordPerfect, 4 pages, (Apr. 30, 2002).
Product Brochure. YesVideo, downloaded from http://www.yesvideo.com/code on Mar. 15, 2005 (20 pages).
Zhang et al. "Detection of text Captions in Compressed domain Video," International Multimedia Conference Proceedings of the 2000 ACM workshops on Multimedia 2000 , Los Angeles, California, United States pp. 201-204.
Notice of Allowance for U.S. Appl. No. 10/174,522, mailed on Jan. 24, 2011, 12 pages.
Non-Final Office Action for U.S. Appl. No. 10/081,129, mailed on Jan. 5, 2006, 36 pages.
Non-Final Office Action for U.S. Appl. No. 10/081,129, mailed on Aug. 9, 2006, 17 pages.
Final Office Action for U.S. Appl. No. 10/081,129, mailed on Apr. 20, 2007, 19 pages.
Advisory Action for U.S. Appl. No. 10/081,129, mailed on Jul. 2, 2007, 4 pages.
Non-Final Office Action for U.S. Appl. No. 10/081,129, mailed on Apr. 28, 2008, 27 pages.
Final Office Action for U.S. Appl. No. 10/081,129, mailed on Dec. 29, 2008, 40 pages.
Notice of Allowance for U.S. Appl. No. 10/081,129, mailed on Apr. 8, 2009, 7 pages.
Final Office Action for U.S. Appl. No. 10/174,522, mailed on Jul. 17, 2008, 58 pages.
Non-Final Office Action for Appl. No. 10/174,522, mailed on Jan. 12, 2009, 16 pages.
Final Office Action for U.S. Appl. No. 10/174,522, mailed on Nov. 16, 2009, 17 pages.
Notice of Allowance for U.S. Appl. No. 10/174,522, mailed on Aug. 27, 2010, 35 pages.
Non-Final Office Action for U.S. Appl. No. 10/465,022, mailed on Dec. 12, 2006, 28 pages.
Final Office Action for U.S. Appl. No. 10/465,022, mailed on Aug. 21, 2007, 13 pages.
Non-Final Office Action for U.S. Appl. No. 10/465,022, mailed on Jan. 11, 2008, 16 pages.
Final Office Action for U.S. Appl. No. 10/465,022, mailed on Oct. 7, 2008, 26 pages.
Non-Final Office Action for U.S. Appl. No. 10/465,022, mailed on Jun. 25, 2009, 14 pages.
Non-Final Office Action for U.S. Appl. No. 10/465,022, mailed on Feb. 17, 2010, 14 pages.
Final Office Action for U.S. Appl. No. 10/465,022, mailed on Aug. 10, 2010, 23 pages.
Requirement for Restriction/Election for U.S. Appl. No. 10/465,027, mailed on Jun. 21, 2007, 5 pages.
Non-Final Office Action for U.S. Appl. No. 10/465,027, mailed on Oct. 17, 2007, 33 pages.
Final Office Action for U.S. Appl. No. 10/465,027, mailed on Jun. 19, 2008, 34 pages.
Notice of Allowance for U.S. Appl. No. 10/465,027, mailed on Nov. 13, 2008, 11 pages.
Non-Final Office Action for U.S. Appl. No. 10/795,031, mailed on Apr. 6, 2007, 28 pages.
Final Office Action for U.S. Appl. No. 10/795,031, mailed on Dec. 13, 2007, 19 pages.
Advisory Action for U.S. Appl. No. 10/795,031, mailed on May 19, 2008, 3 pages.
Non-Final Office Action for U.S. Appl. No. 10/795,031, mailed on Sep. 8, 2008, 56 pages.
Final Office Action for U.S. Appl. No. 10/795,031, mailed on Feb. 3, 2009, 17 pages.
Non-Final Office Action for U.S. Appl. No. 10/795,031, mailed on Dec. 10, 2009, 11 pages.
Final Office Action for U.S. Appl. No. 10/795,031, mailed on Jun. 9, 2010, 17 pages.
Final Office Action for U.S. Appl. No. 10/465,022 mailed on Aug. 23, 2012, 8 pages.
Final Office Action for U.S. Appl. No. 10/795,031 mailed on Aug. 21, 2012, 8 pages.
Non-Final Office Action for U.S. Appl. No. 10/795,031 mailed on Jun. 20, 2013, 10 pages.
Notice of Allowance for U.S. Appl. No. 10/465,022 mailed on Sep. 17, 2013, 16 pages.
Acrobat Reader Version 2.0 (software application), Adobe Systems Incorporated, screenshots Figures 1-10 (1994).
"c:\. . . \9149920c.wpd—unmodified" Screen Shots of document created in Corel WordPerfect, 4 pages, (Apr. 30, 2002).
"Flexible JAMM Screenshots," downloaded from internet site http://simon.cs.ct.edu/-jamm May, 4, 2000.
"Video Mail Retrieval Using Voice" Cambridge University Engineering Department Computer Laboratory and Olivetti Research Laboratory summary of research found at http://svr-www.eng.cam.ac.uk/research/projects/vmr/ (1997).
Adobe Acrobat Reader 3.0 screen dumps (fig. 1-3), (1996).
Adobe Premiere (video editing software) from Http://www.adobe.com (2002).
Adobe Systems, Inc., "Adobe Photoshop 4.0 User Guide for Macintosh and Windows," 1996, Title Page, Copyright Page, Chap. 2, pp. 30-31.
Apple Macintosh system 7 reference manual, pp. 30-31 (1991).
Ball et al., "Software Visualization in the Large," IEEE Computer, vol. 29, No. 4, Apr. 1996, pp. 33-43, http://www.computer.org/computer/co1996/r4033abs.htm.
Begole et al., "Flexible Collaboration Transparency," doc. ID: ncstrl.vatech_cs/TR-98-11, Virginia Polytechnic Institute and State University (1998).
Begole et al., "Supporting Worker Independence in Collaboration Transparency," doc. ID: ncstrl.vatech_cs/TR-98-12, Virginia Polytechnic Institute and State University (1998).
Bobick et al. "A State Based Approach to the Representation and Recognition of Gesture," IEEE Trans. on Pattern Analysis and Machine Intelligence, pp. 1325-1337 (1997).
Boguraev et al. "Salience-based Content Characterization of Text Documents," In Proceedings of Workshop on Intelligent Scalable Text Summarization at the ACL/EACL Conference, Madrid, Spain, 12 pages (Jul. 7-12, 1997).
Boreczky, J. et al. "An Interactive Comic Book Presentation for Exploring Video," Conference on Human factors in Computing Systems (CHI 2000), ACM Press, pp. 185-192, 2000.
Boykin et al, "Improving Broadcast News Segmentation Processing," IEEE Multimedia '99 (1999).
Boykin et al. " Machine learning of Event Segmentation for News on Demand," Communications of the ACM, 43:35-41(2000).
Brandow et al., "Automatic Condensation of Electronic Publications by Sentence Selection," *Information Processing and Management*, 31(5):675-685 (1995).
Brown et al. "Automatic Content-Based Retrieval of Broadcast News," ACM Multimedia 5, San Francisco, CA (1995).

(56) References Cited

OTHER PUBLICATIONS

Byrd, D., "A Scrollbar-based Visualization for Document Navigation," doc. ID: xxx.cs.IR/9902028, Computing Research Repository: Information Retrieval (1999).

Caj et al. "Integrated Multimedia Publishing—Combining TV and Newspaper Content on Personal Channels," WWW8 Conference, 1999.

Chen et al. "Emotion Recognition from Audiovisual Information," Proc. IEEE Workshop on Multimedia Signal Processing, Los Angeles, CA, USA, pp. 83-88 (1998).

Chen et al. "ViBE: A Video Indexing and Browsing Environment," Proceedings of the SPIE Conference on Multimedia Storage and Archiving Systems Sep. 20-22, 1999, Boston 3846:148-164 (1999).

Chiu et al. "NoteLook: Taking Notes in Meetings with Digital Video and Ink," ACM Multimedia 99 Orlando, (1999).

Chiu et al. "Automatically linking multimedia meeting documents by image matching," Proceedings of Hypertext '00. ACM, New York, pp. 244-245 (2000).

Christel et al. "Evolving Video Skims into Useful Multimedia Abstractions," Proceedings of the CHI '98 Conference on Human Factors in Computing Systems (Los Angeles, CA, Apr. 1998), pp. 171-178 (1998).

Christel et al. "Information Visualization within a Digital Video Library," Journal of Intelligent Information Systems 11.35-257 (1998).

Dellaert et al. "Recognizing emotion in speech," Proceedings ICSLP 96. Fourth International Conference on Spoken Language Processing New York (Cat. No. 96TH8206). IEEE. vol:1970-1973 (1996).

Dimitrova et al. "Video Keyframe Extraction and Filtering: A Keyframe is not a Keyframe to Everyone," CIKM 1997:113-120 (1997).

Doermann et al. "Applying Algebraic and differential invarients for logo recognition," Machine Vision and Applications 9:73-86 (1996).

Donato et al. "Classifying Facial Actions", IEEE Trans. on Pattern Analysis and Machine Intelligence, 21:974-989 (1999).

Drucker et al. "SmartSkip: Consumer Level Browsing and Skipping of Digital Video Content," Paper: Technology to Help People Find Information, vol. No. 4, Issue No. 1, pp. 219-226, Minneapolis, Minnesota, USA, (Apr. 20-25, 2002).

Essa et al. Coding Analysis Interpretation and Recognition of Facial Expressions, IEEE Trans. on Pattern Analysis and Machine Intelligence, 19:757-763 (1997).

Face recognition techniques described at web site http://www.visionics.com (2002).

Foote, Jonathan, et al. "An Intelligent Media Browser using Automatic Multimodal Analysis," ACM Multimedia 8, Bristol, UK (1998).

Furui et al. "Japanese Broadcast News Transcription and Information Extraction," Communications of the ACM, 43(2):71-73, Feb. 2000.

Gauvain et al. "Transcribing Broadcast News for Audio and Video Indexing," Communications of the ACM, 43:64-70 (2000).

Gibbon "Generating Hypermedia Documents from Transcriptions of Television Programs Using Parallel Text Alignment," *Handbook of Internet and Multimedia Systems and Applications*, David C. Gibbon; CRC Press, 1998.

Gliedman, J., "Virtual Office Managers," *Computer Shopper*, 18(9):290 (1998).

Gordon "Using annotated video as an information retrieval interface," ACM Proceedings of the 5th international Conference on Intelligent User Interfaces New Orleans pp. 133-140 (2000).

Greenberg, et al., "Sharing fisheye views in relaxed-Wysiwis groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Hauptmann et al. "Story Segmentation and Detection of Commercials in Broadcast News Video," Advances in Digital Libraries Conference, Santa Barbara, CA, Apr. 22-23 1998.

Hauptmann et al. "Text, speech and vision for video segmentation: the informedia project," Proc. AAAI Fall Symp. Computational Models for Integrating Language and Vision, Boston, MA, Nov. 10-12, 1995.

He et al. "Comparing Presentation Summaries: Slides vs. Reading vs. Listening," Conference on Human factors in Computing Systems (CHI 2000), Apr. 1-6, 2000.

Hearst et al., "TileBars: Visualization of Term Distribution Information in Full Text Information Access," *Proceedings of the ACM SIGCHI Conference on Human Factors in Computing Systems (CHI)*, Denver, CO., May 1995, pp. 1-8, http://www.acm.org/sigchi/chi95/Electronic/documnts/papers/mah bdy htm.

Hecht "Embedded data glyph Technology for Hardcopy Digital Documents," Proc. SPIE 2171:341-352 (1994).

Hecht "Printed Embedded Data Graphical User Interfaces," IEEE Computer, Mar. 2001.

Hill et al. "Edit Wear and Read Wear," Computer Graphics and Interactive Media Research Group, pp. 3-9, (May, 1992).

Hu et al. "Multimedia Description Framework (MDF) for content descriptions of Audio/Video Documents," Fourth ACM Conference on Digital Libraries (DL '99) Aug. 11-14, 1999.

IBM Technical Disclosure Bulletin, "Quick Selection of Window Environment Coordinates," 35:57-60, ISS # 4B, (1992).

Ioffe et al. "Finding people by sampling," Proc. International Conference on Computer Vision, pp. 1092-1097 (1999).

Jin et al. "Topic Tracking for Radio, TV Broadcast, and Newswire," Proceedings of the DARPA Broadcast News Workshop, Feb. 28-Mar 3, 1999, Herndon, VA.

Komlodi et al. "Key Frame Preview Techniques for Video Browsing," (Proceedings of the 3rd ACM International Conference on Digital Libraries, Jun. 23-26, 1998, Pittsburgh, pp. 118-125 (1998).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Li et al. "Automatic Text Detection and Tracking in Digital Video," IEEE Transactions on Image Processing—Special Issue on Image and Video Processing for Digital Libraries, 9:147-156 (2000).

Li et al. "Vision: a digital video library," Proceedings of the 1st ACM International Conference on Digital Libraries, pp. 19-27, 1996.

Li et al. "Text Extraction and Recognition in Digital Video," Proceedings of Third IAPR Workshop on Document Analysis Systems, pp. 119-128, 1998.

Liang et al. Practical video indexing and retrieval system SPIE 3240:294-303, (1988).

Lienhart et al. "On the Detection and Recognition of Television Commercials," Proc. IEEE Conf. on Multimedia Computing and Systems, Ottawa, Canada, pp. 509-516, Jun. 1997.

Ma et al. "An Indexing and Browsing System for Home Video," Invited paper, EUSIPCO'2000, 10th European Signal Processing Conference, Sep. 5-8, 2000, Tampere, Finland.

Manber, U., "The Use of Customized Emphasis in Text Visualization," *Proceedings of 1997 IEEE Conf. on Information Visualization*, pp. 132-138, held 8/27-29/97 in London England.

Maybury "News on Demand," Communications of the ACM, 43:33-34 (2000).

Maybury et al. "Multimedia Summaries of Broadcast News," International Conference on Intelligent Information Systems pp. 447-449 (1997).

Maybury et al. "Multimedia Summaries of Broadcast News," International Conference on Intelligent Information Systems, Dec. 8-10, 1997.

Maybury et al. "Segmentation, Content Extraction and Visualization of Broadcast News Video Using Multistream Analysis," AAAI Paper (1997).

Merialdo et al. "Automatic Construction of Personalized TV News Programs," Seventh ACM International Multimedia Conference, Orlando Nov. 1999.

(56) References Cited

OTHER PUBLICATIONS

Merlino et al. "Broadcast News Navigation using Story Segmentation," Advanced Information Systems Center, The MITRE Corporation (1997).
Merlino et al. "Broadcast News Processing Techniques," MITRE Technical Report, MTR 99B0000031, Apr. 1999.
Mohan "Text-based search of TV news stories," Proc. SPIE 2916:2-13 (1996).
Myers et al. "Multi-View Intelligent Editor for Digital Video Libraries," First ACM and IEEE Joint, Conference on Digital Libraries, Jun. 24-28, 2001, Roanoke, VA, pp. 106-115.
Oh et al. "Efficient and Cost-effective Techniques for Browsing and Indexing Large Video Databases," SIGMOD Conference 2000: 415-426.
Photina et al. "Improving acoustic models with captioned multimedia speech," Proceedings IEEE International Conference on Multimedia Computing and Systems, 2:767-71 (1999).
Rowley et al. "Neural network-based face detection," IEEE Transactions on Pattern Analysis and Machine Intelligence, 20:23-38 (1998).
Schweighofer et al., "The Automatic Generation of Hypertext Links in Legal Documents," *Lecture Notes in Computer Science*, vol. 1134, Wagner et al., eds., from 7th Int. Conf., DEXA 96', held Sep. 1996 in Zurich, Switzerland (1996).
Shahraray et al. "Automatic generation of pictorial transcripts of video programs," Proceedings of the SPIE—Int. Soc. Opt. Eng. 2417:512-518 (1995).
Shahraray et al. "Pictorial transcripts: multimedia processing applied to digital library creation," 1997 IEEE First Workshop on Multimedia Signal Processing pp. 581-586 (1997).
Shahraray et al. "Automated Authoring of Hypermedia Documents of Video Programs," *ACM Multimedia 95*, Nov. 5-9, 1995, San Francisco, CA (1995).
Smith et al. "Video Skimming and Characterization through the Combination of Image and Language Understanding," Computer Vision and Pattern Recognition IEEE 1997.
Sodergard et al., "Integrated multimedia publishing—combining TV and newspaper content on personal channels," downloaded from http:www8.org/w8-papers/lb-multimedia/integrated/integrated.html on Apr. 4, 2002, pp. 1-22.
Sonmez et al, "Multiple speaker tracking and detection: handset normalization and duration scoring," Digital Signal Processing 10:133-143 (2000).
Suda et al. "Logo and word matching using a general approach to signal registration," Fourth International Conference on Document Analysis and Recognition, Ulm, Germany, Aug. 18-20, 1997, pp. 61-65.
Sumita et al., "Document Structure Extraction for Interactive Document Retrieval Systems," *Proceedings of SIGDOC 93*, pp. 301-310, held Oct. 5-8, 1993 in Kitchner, Ontario.
Taghva et al., "Evaluation of an automatic markup system," Proceedings SPIE vol. 2422, Document Recognition II, pp. 317-327 (Mar. 1995).
Taxt, T., "Segmentation of Document Images," *IEEE*, 11(12):1322-1329 (1989).
Tennenhouse et al. "A software-oriented approach to the design of media processing environments," Proceedings of the IEEE International Conference on Multimedia Computing and Systems, pp. 435-444 (1994).
Tonomura et al. "VideoMAP and VideoSpacelcon : tools for anatomizing video content," Proc. INTERCHI'93 ACM pp. 131-136 (1993).
Uchihashi et al. "Summarizing Video Using a Shot Importance Measure and a Frame-Packing Algorithm," Proceedings of the International Conference on Acoustics, Speech, and Signal Processing (Phoenix, Az) 6:3041-3044 (1999).
Uchihashi et al. "Video Manga: Generating Semantically Meaningful Video Summaries," *ACM Multimedia 99*, Orlando, Florida, Oct. 30-Nov. 5, 1999.
Video content management and publishing software from Virage http://www.virage.com (2002).
Wactlar et al. "Complementary Video and Audio Analysis for Broadcast News Archives," Communications of the ACM, 43:42-47 (2000).
Wactler et al. "Intelligent access to digital video: Informedia project," Computer 29:46-52 (1996).

Weiss et al. "Composition and Search with a Video Algebra," IEEE Multimedia 2:12-25 (1995).
Wittenburg et al. "Browsing with Dynamic Key Frame Collages in Web-Based Entertainment Video Services," In Proceedings of IEEE International Conference on Multimedia Computing and Systems, Jun. 7-11, 1999, Florence, Italy 2:913-918 (1999).
Zhang et al. "Detection of text Captions in Compressed domain Video, " International Multimedia Conference Proceedings of the 2000 ACM workshops on Multimedia 2000, Los Angeles, California, United States pp. 201-204.
Wactlar "Informedia-Search and Sumarization in the Video Medium," proceedings of the Imagina 2000Conference, pp. 1-10 (Jan. 2000).
Non-Final Office Action for U.S. Appl. No. 10/795,031 mailed on Dec. 20, 2013, 25 pages.
Product Brochure, Shutterfly, downloaded from http://www.shutterfly.com on Mar. 15, 2005 (10 pages).
Product Brochure, YesVideo, downloaded from http://www.yesvideo.com/code on Mar. 15, 2005 (20 pages).
"About Telus investors glossary," pp. 1-7 downloaded from http://www.about.telus.com/investors/glossary.html on Apr. 14, 2005.
Choi et al., "An Integrated Data Model and a Query Language for Content-Based Retrieval of Video,"*MIS '98 LNCS 1508*, Springer Verlag Berlin Heidelberg, pp. 192-198 (1998).
"Computer Terms," pp. 1-8 downloaded from http:www.park-meadow.prg/computer_terms.htm on Apr. 14, 2005.
"Glossary for computer hardware and micro scope," pp. 1-11 downloaded from http://www.mumbaicyber.com/glossary_com_hardware_micro.asp on Apr. 14, 2005.
"Glossary: What Does It Mean?," pp. 1-3 downloaded from http://www.fairfield.k12.ct.us/fairfieldhs/cfairfieldhs03/glossary.htm on Apr. 14, 2005.
"IT&T Talk", pp. 1-4 dopwnloaded from http://www.iib.q1d.gov.au/itcareers/talk.asp on Apr. 14, 2005.
"Multimedia" pp. 1-2 downloaded from http://en.wikipedia.org/wiki/Multimedia on Apr. 14, 2005.
Ohmori, Y., "A Tool for Programmable Access to Organized Multimedia Recorder (EMMR)," *Joho Shori Gakkai Kenkvu Hokoku*, 98(35[HI-78]):39-44 (1998).
Phillips, R. L., "MediaView: A General Multimedia Digital Publication System," *Communications of the ACM*, 34(7):75-83 (1991).
Roschelle et al., "VideoNoter: A productivity too for video data analysis,"*Behavior Research Methods, Instruments & Computers*, 23(2):219-224 (1991).
Saur et al., "Automated Analysis and Annotation of Basketball Video,"*SPIE*, 3022:176-187 (1997).
Web pages from PaperClick.com printed from http://www.paperclip.com on Jun. 14, 2006.
"Fujitsu Markets Facsimile Connection System for Computer I/O," *Comline Telecommunications*, Nov. 1989, p. 5.
Grunin, L., "Action," *PC Magazine*, 12(15):240 (1993).
"Hang on—Blue Sky's WinHelp is on the way," *PC Week*, p. 59, Jul. 1995.
"IBM, Partners Team on Web-Based Image Search, Printing Sep. 29, 1995," Newsbytes News Network, Sep. 1995.
Identitech, "Identitech announces FYI 2.5.2 release with NT object server, SmartForm, and ODBC," Business Editors, Jul. 1996.
"Identitech Unysis: Unysis wins Florida Housing Finance Agency Contract; Identitech provides workflow software solution," Business Editors/Computer Writers, Jun. 1995.
Lison et al., "Sight and Sound," *Unix Review*, 7(10):76-86 (1989).
Okada et al., "Development of Application Programs for Distributed Processing Equipment," *Review of the Electrical Communication Laboratories*, 34(4):465-471 (1986).
"Spry Inc.'s Internet Front End Picke For PSI Cable Internet Service," *Information & Interactive Services Report*, 15(7), (1994).
Strattner, A., "HP pioneers I-TV peripheral market," *Computer Shopper*, 14(2):71 (1994).
Van Horn-Christopher, "Have you talked to your computer today?," *Business Forum*, 19(3):10-11.
"VNR firm offers Storyboards" PR News, Dec. 4, 1995, downloaded from http://proquest.umi.com/pqdlink?index=20&did=000000010830394&SrchMode=3&sid=1&F on Aug. 9, 2004.
"WC3 issues first public draft of Synchronized Multimedia Integration Language (SMIL)," *Information Today*,15(2):27 (1998) downloaded on May 28, 2004.

* cited by examiner

MULTIMEDIA VISUALIZATION AND INTEGRATION ENVIRONMENT

CROSS-REFERENCES TO RELATED APPLICATIONS

The present application claims priority from and is a continuation of U.S. Non-Provisional patent application Ser. No. 10/081,129, filed Feb. 21, 2002, the entire contents of which are incorporated herein by reference for all purposes.

The present application incorporates herein by reference for all purposes the entire contents of:

U.S. Non-Provisional application Ser. No. 10/001,895, filed Nov. 19, 2001; and

U.S. Non-Provisional application Ser. No. 08/995,616, filed Dec. 22, 1997.

COPYRIGHT

A portion of the disclosure of this patent document contains material that is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates to user interfaces for displaying information and more particularly to user interfaces for retrieving and displaying multimedia information that may be stored in a multimedia document.

With rapid advances in computer technology, an increasing amount of information is being stored in the form of electronic (or digital) documents. These electronic documents include multimedia documents that store multimedia information. The term "multimedia information" is used to refer to information that comprises information of several different types in an integrated form. The different types of information included in multimedia information may include a combination of text information, graphics information, animation information, sound (audio) information, video information, slides information, whiteboard information, and other types of information. Multimedia information is also used to refer to information comprising one or more objects wherein the objects include information of different types. For example, multimedia objects included in multimedia information may comprise text information, graphics information, animation information, sound (audio) information, video information, slides information, whiteboard information, and other types of information. Multimedia documents may be considered as compound objects that comprise video, audio, closed-caption text, keyframes, presentation slides, whiteboard capture information, as well as other multimedia type objects. Examples of multimedia documents include documents storing interactive web pages, television broadcasts, videos, presentations, or the like.

Several tools and applications are conventionally available that allow users to play back, store, index, edit, or manipulate multimedia information stored in multimedia documents. Examples of such tools and/or applications include proprietary or customized multimedia players (e.g., RealPlayer™ provided by RealNetworks, Microsoft Windows Media Player provided by Microsoft Corporation, QuickTime™ Player provided by Apple Corporation, Shockwave multimedia player, and others), video players, televisions, personal digital assistants (PDAs), or the like. Several tools are also available for editing multimedia information. For example, Virage, Inc. of San Mateo, Calif. (www.virage.com) provides various tools for viewing and manipulating video content and tools for creating video databases. Virage, Inc. also provides tools for face detection and on-screen text recognition from video information.

Given the vast number of electronic documents, readers of electronic documents are increasingly being called upon to assimilate vast quantities of information in a short period of time. To meet the demands placed upon them, readers find they must read electronic documents "horizontally" rather than "vertically," i.e., they must scan, skim, and browse sections of interest in one or more electronic documents rather then read and analyze a single document from start to end. While tools exist which enable users to "horizontally" read electronic documents containing text/image information (e.g., the reading tool described in U.S. Non-Provisional patent application Ser. No. 08/995,616), conventional tools cannot be used to "horizontally" read multimedia documents which may contain audio information, video information, and other types of information. None of the multimedia tools described above allow users to "horizontally" read a multimedia document.

In light of the above, there is a need for techniques that allow users to read a multimedia document "horizontally." Techniques that allow users to view, analyze, and navigate multimedia information stored in multimedia documents are desirable.

BRIEF SUMMARY OF THE INVENTION

The present invention provides techniques for retrieving and displaying multimedia information. According to an embodiment of the present invention, a graphical user interface (GUI) is provided that displays multimedia information that may be stored in a multimedia document. According to the teachings of the present invention, the GUI enables a user to navigate through multimedia information stored in a multimedia document. The GUI provides both a focused and a contextual view of the contents of the multimedia document. The GUI thus allows users to "horizontally" read multimedia documents.

According to an embodiment of the present invention, techniques are provided for displaying multimedia information stored in a multimedia document on a display. The multimedia information comprises information of a plurality of types including information of a first type and information of a second type. In this embodiment, a graphical user interface (GUI) is displayed on the display. A representation of the multimedia information stored by the multimedia document is displayed in a first area of the GUI. The displayed representation of the multimedia information in the first area comprises a representation of information of the first type and a representation of information of the second type. A first lens is displayed covering a first portion of the first area. A representation of multimedia information comprising a portion of the representation of information of the first type covered by the first lens and a portion of the representation of information of the second type covered by the first lens is displayed in a second area of the GUI.

According to another embodiment of the present invention, techniques are provided for displaying multimedia information stored in a multimedia document on a display. The multimedia information comprises information of a first type and information of a second type. In this embodiment, a graphical user interface (GUI) is displayed on the display. A representation of the multimedia information stored by the multimedia document occurring between a start time ($t_s$) and an end time ($t_e$) associated with the multimedia document is displayed in a first area of the GUI. The representation of the multimedia information displayed in the first area of the GUI comprises a representation of information of the first type occurring between $t_s$ and $t_e$ and a representation of information of the second type occurring between $t_s$ and $t_e$, where ($t_e > t_s$). A first lens is displayed emphasizing a portion of the first area of the GUI, where the portion of the first area emphasized by the first lens comprises a representation of multimedia information occurring between a first time ($t_1$) and a second time ($t_2$), where ($t_s \leq t_1 < t_2 < t_e$). The representation of multimedia information occurring between $t_1$ and $t_2$ is displayed in a second area of the GUI. The representation of multimedia information displayed in the second area comprises a representation of information of the first type occurring between $t_1$ and $t_2$ and a representation of information of the second type occurring between $t_1$ and $t_2$.

According to yet another embodiment of the present invention, techniques are provided for displaying multimedia information stored in a multimedia document on a display. The multimedia information comprises video information and information of a first type. In this embodiment, a graphical user interface (GUI) is displayed on the display. A first set of one or more video keyframes extracted from the video information occurring between a start time ($t_s$) and an end time ($t_e$) associated with the multimedia document, where ($t_e > t_s$), are displayed in a first section of a first area of the GUI. Text information corresponding to the information of the first type occurring between $t_s$ and $t_e$ is displayed in a second section of the first area of the GUI. A first lens is displayed emphasizing a portion of the first section of the first area occurring between a first time ($t_1$) and a second time ($t_2$) and a portion of the second section of the first area occurring between $t_1$ and $t_2$. The emphasized portion of the first section of the first area comprises a second set of one or more video keyframes extracted from the video information occurring between $t_1$ and $t_2$, and the emphasized portion of the second section of the first area comprises text information corresponding to information of the first type occurring between $t_1$ and $t_2$, wherein the second set of one or more keyframes is a subset of the first set of one or more keyframes and ($t_s \leq t_1 < t_2 \leq t_e$). The second set of one or more keyframes is displayed in a first section of a second area of the GUI. Text information corresponding to the information of the first type occurring between $t_1$ and $t_2$ is displayed in a second section of the second area of the GUI.

The foregoing, together with other features, embodiments, and advantages of the present invention, will become more apparent when referring to the following specification, claims, and accompanying drawings.

DETAILED DESCRIPTION OF THE INVENTION

Embodiments of the present invention provide techniques for retrieving and displaying multimedia information. According to an embodiment of the present invention, a graphical user interface (GUI) is provided that displays multimedia information that may be stored in a multimedia document. According to the teachings of the present invention, the GUI enables a user to navigate through multimedia information stored in a multimedia document. The GUI provides both a focused and a contextual view of the contents of the multimedia document. The GUI thus allows a user to "horizontally" read multimedia documents.

As indicated above, the term "multimedia information" is intended to refer to information that comprises information of several different types in an integrated form. The different types of information included in multimedia information may include a combination of text information, graphics information, animation information, sound (audio) information, video information, slides information, whiteboard images information, and other types of information. For example, a video recording of a television broadcast may comprise video information and audio information. In certain instances the video recording may also comprise close-captioned (CC) text information which comprises material related to the video information, and in many cases, is an exact representation of the speech contained in the audio portions of the video recording. Multimedia information is also used to refer to information comprising one or more objects wherein the objects include information of different types. For example, multimedia objects included in multimedia information may comprise text information, graphics information, animation information, sound (audio) information, video information, slides information, whiteboard images information, and other types of information.

The term "multimedia document" as used in this application is intended to refer to any electronic storage unit (e.g., a file) that stores multimedia information in digital format. Various different formats may be used to store the multimedia information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others. Examples of multimedia documents include video recordings, MPEG files, news broadcast recordings, presentation recordings, recorded meetings, classroom lecture recordings, broadcast television programs, or the like.

Figure 1:
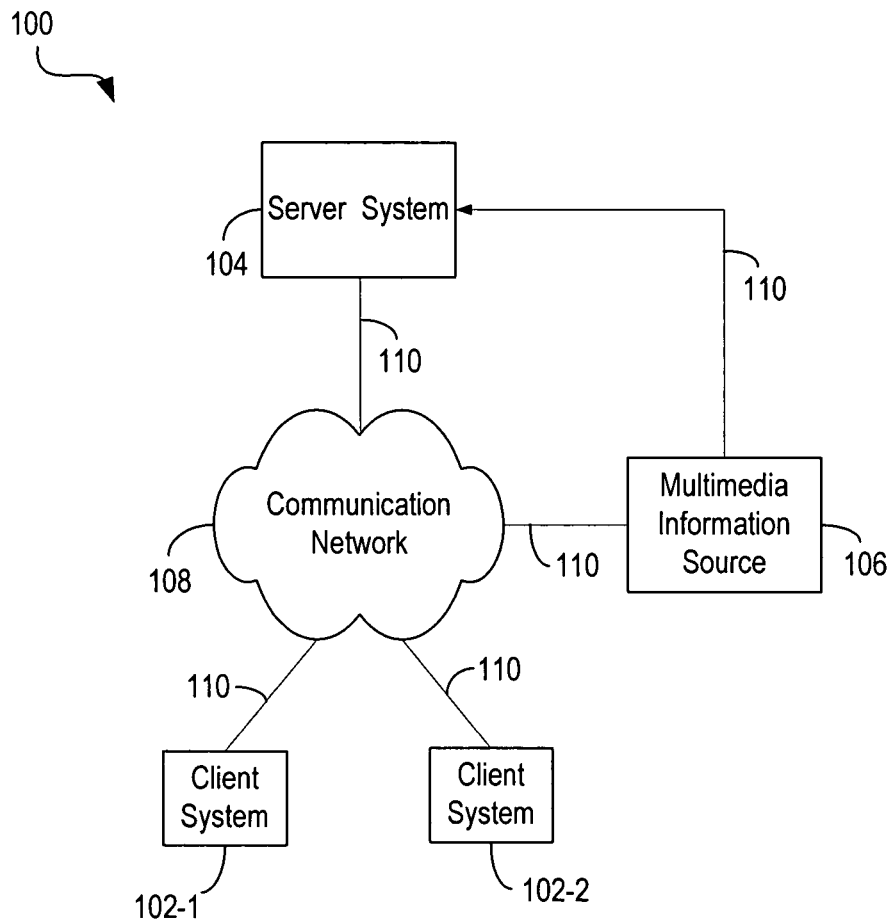
FIG. 1 is a simplified block diagram of a distributed network that may incorporate an embodiment of the present invention.

FIG. 1 is a simplified block diagram of a distributed network 100 that may incorporated an embodiment of the present invention. As depicted in FIG. 1, distributed network 100 comprises a number of computer systems including one or more client systems 102, a server system 104, and a multimedia information source (MIS) 106 coupled to communication network 108 via a plurality of communication links 110. Distributed network 100 depicted in FIG. 1 is merely illustrative of an embodiment incorporating the present invention and does not limit the scope of the invention as recited in the claims. One of ordinary skill in the art would recognize other variations, modifications, and alternatives. For example, the present invention may also be embodied in a stand-alone system. In a stand-alone environment, the functions performed by the various computer systems depicted in FIG. 1 may be performed by a single computer system.

Communication network 108 provides a mechanism allowing the various computer systems depicted in FIG. 1 to communicate and exchange information with each other. Communication network 108 may itself be comprised of many interconnected computer systems and communication links. While in one embodiment, communication network 108 is the Internet, in other embodiments, communication network may any suitable communication network including a local area network (LAN), a wide area network (WAN), a wireless network, an intranet, a private network, a public network, a switched network, or the like.

Communication links 110 used to connect the various systems depicted in FIG. 1 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Computer systems connected to communication network 108 may be classified as "clients" or "servers" depending on the role the computer systems play with respect to requesting information and/or services or providing information and/or services. Computer systems that are used by users to request information or to request a service are classified as "client" computers (or "clients"). Computer systems that store information and provide the information in response to a user request received from a client computer, or computer systems that perform processing to provide the user-requested services are called "server" computers (or "servers"). It should however be apparent that a particular computer system may function both as a client and as a server.

Accordingly, according to an embodiment of the present invention, server system 104 is configured to perform processing to facilitate generation of a GUI that displays multimedia information according to the teachings of the present invention. The GUI generated by server system 104 may be output to the user (e.g., a reader of the multimedia document) via an output device coupled to server system 104 or via client systems 102. The GUI generated by server 104 enables the user to retrieve and browse multimedia information that may be stored in a multimedia document. The GUI provides both a focused and a contextual view of the contents of a multimedia document and thus enables the multimedia document to be read "horizontally."

The processing performed by server system 104 to generate the GUI and to provide the various features according to the teachings of the present invention may be implemented by software modules executing on server system 104, by hardware modules coupled to server system 104, or combinations thereof. In alternative embodiments of the present invention, the processing may also be distributed between the various computer systems depicted in FIG. 1.

The multimedia information that is displayed in the GUI may be stored in a multimedia document that is accessible to server system 104. For example, the multimedia document may be stored in a storage subsystem of server system 104. The multimedia document may also be stored by other systems such as MIS 106 that are accessible to server 104. Alternatively, the multimedia document may be stored in a memory location accessible to server system 104.

In alternative embodiments, instead of accessing a multimedia document, server system 104 may receive a stream of multimedia information (e.g., a streaming media signal, a cable signal, etc.) from a multimedia information source such as MIS 106. According to an embodiment of the present invention, server system 104 stores the multimedia information signals in a multimedia document and then generates a GUI that displays the multimedia information. Examples of MIS 106 include a television broadcast receiver, a cable receiver, a digital video recorder (e.g., a TIVO box), or the like. For example, multimedia information source 106 may be embodied as a television that is configured to receive multimedia broadcast signals and to transmit the signals to server system 104. In alternative embodiments, server system 104 may be configured to intercept multimedia information signals received by MIS 106. Server system 104 may receive the multimedia information directly from MIS 106 or may alternatively receive the information via a communication network such as communication network 108.

As described above, MIS 106 depicted in FIG. 1 represents a source of multimedia information. According to an embodiment of the present invention, MIS 106 may store multimedia documents that are accessed by server system 104. For example, MIS 106 may be a storage device or a server that stores multimedia documents that may be accessed by server system 104. In alternative embodiments, MIS 106 may provide a multimedia information stream to server system 104. For example, MIS 106 may be a television receiver/antenna providing live television feed information to server system 104. MIS 106 may be a device such as a video recorder/player, a DVD player, a CD player, etc. providing recorded video and/or audio stream to server system 104. In alternative embodiments, MIS 106 may be a presentation or meeting recorder device that is capable of providing a stream of the captured presentation or meeting information to server system 104. MIS 106 may also be a receiver (e.g., a satellite dish or a cable receiver) that is configured to capture or receive (e.g., via a wireless link) multimedia information from an external source and then provide the captured multimedia information to server system 104 for further processing.

Users may use client systems 102 to view the GUI generated by server system 104. Users may also use client systems 102 to interact with the other systems depicted in FIG. 1. For example, a user may use user system 102 to select a particular multimedia document and request server system 104 to generate a GUI displaying multimedia information stored by the particular multimedia document. A user may also interact with the GUI generated by server system 104 using input devices coupled to client system 102. In alternative embodiments, client system 102 may also perform processing to facilitate generation of a GUI according to the teachings of the present invention. A client system 102 may be of different types including a personal computer, a portable computer, a workstation, a computer terminal, a network computer, a mainframe, a kiosk, a personal digital assistant (PDA), a communication device such as a cell phone, or any other data processing system.

According to an embodiment of the present invention, a single computer system may function both as server system 104 and as client system 102. Various other configurations of the server system 104, client system 102, and MIS 106 are possible.

Figure 2:
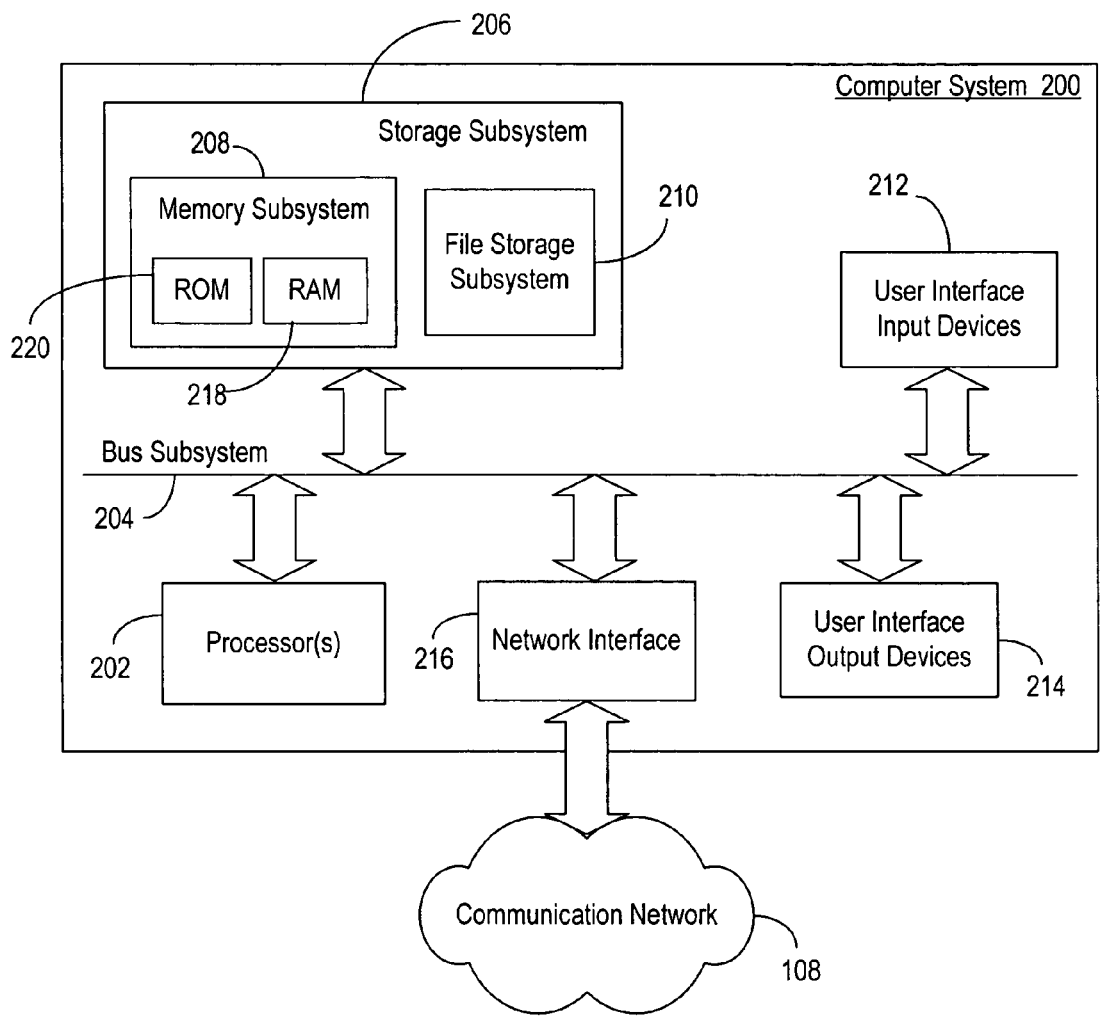
FIG. 2 is a simplified block diagram of a computer system according to an embodiment of the present invention.

FIG. 2 is a simplified block diagram of a computer system 200 according to an embodiment of the present invention. Computer system 200 may be used as any of the computer systems depicted in FIG. 1. As shown in FIG. 2, computer system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with computer system 200. A user may be a human user, a device, a process, another computer, or the like. Network interface subsystem 216 provides an interface to other computer systems and communication networks.

Bus subsystem 204 provides a mechanism for letting the various components and subsystems of computer system 200 communicate with each other as intended. The various subsystems and components of computer system 200 need not be at the same physical location but may be distributed at various locations within network 100. Although bus subsystem 204 is shown schematically as a single bus, alternative embodiments of the bus subsystem may utilize multiple busses.

User interface input devices 212 may include a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 200. According to an embodiment of the present invention, the GUI generated according to the teachings of the present invention may be presented to the user via output devices 214.

Storage subsystem 206 may be configured to store the basic programming and data constructs that provide the functionality of the computer system and of the present invention. For example, according to an embodiment of the present invention, software modules implementing the functionality of the present invention may be stored in storage subsystem 206 of server system 104. These software modules may be executed by processor(s) 202 of server system 104. In a distributed environment, the software modules may be stored on a plurality of computer systems and executed by processors of the plurality of computer systems. Storage subsystem 206 may also provide a repository for storing various databases that may be used by the present invention. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 200 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2.

Figure 3:
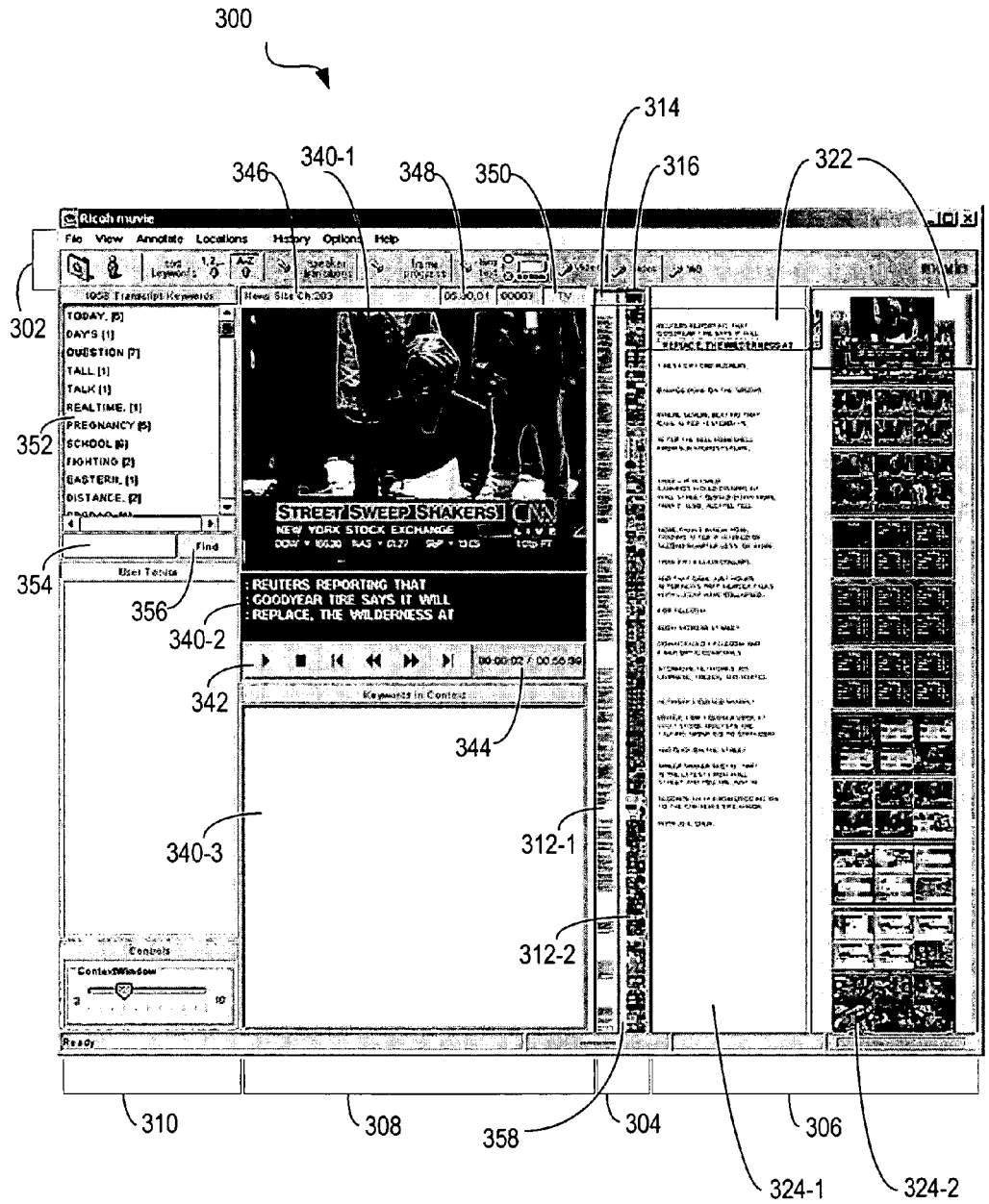
FIG. 3 depicts a simplified user interface 300 generated according to an embodiment of the present invention for viewing multimedia information.

FIG. 3 depicts a simplified user interface 300 generated according to an embodiment of the present invention for viewing multimedia information. It should be apparent that GUI 300 depicted in FIG. 3 is merely illustrative of an embodiment incorporating the present invention and does not limit the scope of the invention as recited in the claims. One of ordinary skill in the art would recognize other variations, modifications, and alternatives.

GUI 300 displays multimedia information stored in a multimedia document. The multimedia information stored by the multimedia document and displayed by GUI 300 may comprise information of a plurality of different types. As depicted in FIG. 3, GUI 300 displays multimedia information corresponding to a television broadcast that includes video information, audio information, and possibly closed-caption (CC) text information. The television broadcast may be stored as a television broadcast recording in a memory location accessible to server system 104. It should however be apparent that the present invention is not restricted to displaying television recordings. Multimedia information comprising other types of information may also be displayed according to the teachings of the present invention.

The television broadcast may be stored using a variety of different techniques. According to one technique, the television broadcast is recorded and stored using a satellite receiver connected to a PC-TV video card of server system 104. Applications executing on server system 104 then process the recorded television broadcast to facilitate generation of GUI 300. For example, the video information contained in the television broadcast may be captured using an MPEG capture application that creates a separate metafile (e.g., in XML format) containing temporal information for the broadcast and closed-caption text, if provided. Information stored in the metafile may then be used to generate GUI 300 depicted in FIG. 3.

As depicted in FIG. 3, GUI 300 comprises several viewing areas including a first viewing area 302, a second viewing area 304, a third viewing area 306, a fourth viewing area 308, and a fifth viewing area 310. It should be apparent that in alternative embodiments the present invention may comprise more or fewer viewing areas than those depicted in FIG. 3. Further, in alternative embodiments of the present invention one or more viewing areas may be combined into one viewing area, or a particular viewing area may be divided in multiple viewing areas. Accordingly, the viewing areas depicted in FIG. 3 and described below are not meant to restrict the scope of the present invention as recited in the claims.

According to an embodiment of the present invention, first viewing area 302 displays one or more commands that may be selected by a user viewing GUI 300. Various user interface features such as menu bars, drop-down menus, cascading menus, buttons, selection bars, buttons, etc. may be used to display the user-selectable commands. According to an embodiment of the present invention, the commands provided in first viewing area 302 include a command that enables the user to select a multimedia document whose multimedia information is to be displayed in the GUI. The commands may also include one or more commands that allow the user to configure and/or customize the manner in which multimedia information stored in the user-selected multimedia document is displayed in GUI 300. Various other commands may also be provided in first viewing area 302.

According to an embodiment of the present invention, second viewing area 304 displays a scaled representation of multimedia information stored by the multimedia document. The user may select the scaling factor used for displaying information in second viewing area 304. According to a particular embodiment of the present invention, a representation of the entire (i.e., multimedia information between the start time and end time associated with the multimedia document) multimedia document is displayed in second viewing area 304. In this embodiment, one end of second viewing area 304 represents the start time of the multimedia document and the opposite end of second viewing area 304 represents the end time of the multimedia document.

As shown in FIG. 3, according to an embodiment of the present invention, second viewing area 304 comprises one or more thumbnail images 312. Each thumbnail image displays a representation of a particular type of information included in the multimedia information stored by the multimedia document. For example, two thumbnail images 312-1 and 312-2 are displayed in second viewing area 304 of GUI 300 depicted in FIG. 3. Thumbnail image 312-1 displays text information corresponding to information included in the multimedia information stored by the multimedia document being displayed by GUI 300. The text displayed in thumbnail image 312-1 may represent a displayable representation of CC text included in the multimedia information displayed by GUI 300. Alternatively, the text displayed in thumbnail image 312-1 may represent a displayable representation of a transcription of audio information included in the multimedia information stored by the multimedia document whose contents are displayed by GUI 300. Various audio-to-text transcription techniques may be used to generate a transcript for the audio information.

Thumbnail image 312-2 displays a representation of video information included in the multimedia information displayed by GUI 300. In the embodiment depicted in FIG. 3, the video information is displayed using video keyframes extracted from the video information included in the multimedia information stored by the multimedia document. The video keyframes may be extracted from the video information in the multimedia document at various points in time using a specified sampling rate. A special layout style, which may be user-configurable, is used to display the extracted keyframes in thumbnail image 312-2 to enhance readability of the frames.

One or more thumbnail images may be displayed in second viewing area 304 based upon the different types of information included in the multimedia information being displayed. Each thumbnail image 312 displayed in second viewing area 304 displays a representation of information of a particular type included in the multimedia information stored by the multimedia document. According to an embodiment of the present invention, the number of thumbnails displayed in second viewing area 304 and the type of information displayed by each thumbnail is user-configurable.

According to an embodiment of the present invention, the various thumbnail images displayed in second viewing area 304 are temporally synchronized or aligned with each other along a timeline. This implies that the various types of information included in the multimedia information and occurring at approximately the same time are displayed next to each other. For example, thumbnail images 312-1 and 312-2 are aligned such that the text information (which may represent CC text information or a transcript of the audio information) displayed in thumbnail image 312-1 and video keyframes displayed in thumbnail 312-2 that occur in the multimedia information at a particular point in time are displayed close to each other (e.g., along the same horizontal axis). Accordingly, information that has a particular time stamp is displayed proximal to information that has approximately the same time stamp. This enables a user to determine the various types of information occurring approximately concurrently in the multimedia information being displayed by GUI 300 by simply scanning second viewing area 304 in the horizontal axis.

According to the teachings of the present invention, a viewing lens or window 314 (hereinafter referred to as "thumbnail viewing area lens 314") is displayed in second viewing area 304. Thumbnail viewing area lens 314 covers or emphasizes a portion of second viewing area 304. According to the teachings of the present invention, multimedia information corresponding to the area of second viewing area 304 covered by thumbnail viewing area lens 314 is displayed in third viewing area 306.

In the embodiment depicted in FIG. 3, thumbnail viewing area lens 314 is positioned at the top of second viewing area 304 and emphasizes a top portion (or starting portion) of the multimedia document. The position of thumbnail viewing area lens 314 may be changed by a user by sliding or moving lens 314 along second viewing area 304. For example, in FIG. 3, thumbnail viewing area lens 314 may be moved vertically along second viewing area 304.

In response to a change in the position of thumbnail viewing area lens 314 from a first location in second viewing area 304 to a second location along second viewing area 304, the multimedia information displayed in third viewing area 306 is automatically updated such that the multimedia information displayed in third viewing area 306 continues to correspond to the area of second viewing area 304 emphasized by thumbnail viewing area lens 314. Accordingly, a user may use thumbnail viewing area lens 314 to navigate and scroll through the contents of the multimedia document displayed by GUI 300. Thumbnail viewing area lens 314 thus provides a context and indicates a location of the multimedia information displayed in third viewing area 306 within the entire multimedia document.

Figure 4:
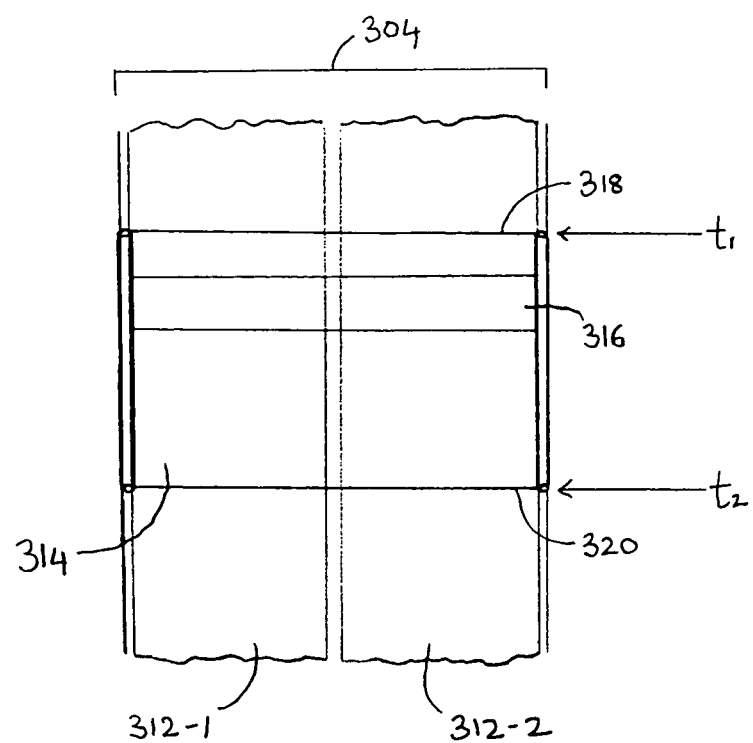
FIG. 4 is a zoomed-in simplified diagram of a thumbnail viewing area lens according to an embodiment of the present invention.

FIG. 4 is a zoomed-in simplified diagram of thumbnail viewing area lens 314 according to an embodiment of the present invention. As depicted in FIG. 4, thumbnail viewing area lens 314 is bounded by a first edge 318 and a second edge 320. Thumbnail viewing area lens 314 emphasizes an area of second viewing area 304 between edge 318 and edge 320. Based upon the position of thumbnail viewing area lens 314 over second viewing area 304, edge 318 corresponds to specific time "$t_1$" in the multimedia document and edge 320 corresponds to a specific time "$t_2$" in the multimedia document wherein $t_2 > t_1$. For example, when thumbnail viewing area lens 314 is positioned at the start of second viewing area 304 (as depicted in FIG. 3), $t_1$ may correspond to the start time of the multimedia document being displayed, and when thumbnail viewing area lens 314 is positioned at the end of second viewing area 304, $t_2$ may correspond to the end time of the multimedia document. Accordingly, thumbnail viewing area lens 314 emphasizes a portion of second viewing area 304 between times $t_1$ and $t_2$. According to an embodiment of the present invention, multimedia information corresponding to the time segment between $t_2$ and $t_1$ (which is emphasized or covered by thumbnail viewing area lens 314) is displayed in third viewing area 306. Accordingly, when the position of thumbnail viewing area lens 314 is changed along second viewing area 304 in response to user input, the information displayed in third viewing area 306 is updated such that the multimedia information displayed in third viewing area 306 continues to correspond to the area of second viewing area 304 emphasized by thumbnail viewing area lens 314.

As shown in FIG. 4 and FIG. 3, thumbnail viewing area lens 314 comprises a sub-lens 316 which further emphasizes a sub-portion of the portion of second viewing area 304 emphasized by thumbnail viewing area lens 314. According to an embodiment the present invention, the portion of second viewing area 304 emphasized or covered by sub-lens 316 corresponds to the portion of third viewing area 306 emphasized by lens 322. Sub-lens 316 can be moved along second viewing area 304 within edges 318 and 320 of thumbnail viewing area lens 314. When sub-lens 316 is moved from a first location to a second location within the boundaries of thumbnail viewing area lens 314, the position of lens 322 in third viewing area 306 is also automatically changed to correspond to the changed location of sub-lens 316. Further, if the position of lens 322 is changed from a first location to a second location over third viewing area 306, the position of sub-lens 316 is also automatically updated to correspond to the changed position of lens 322. Further details related to lens 322 are described below.

As described above, multimedia information corresponding to the portion of second viewing area 304 emphasized by thumbnail viewing area lens 314 is displayed in third viewing area 306. Accordingly, a representation of multimedia information occurring between time $t_1$ and $t_2$ (corresponding to a segment of time of the multimedia document emphasized by thumbnail viewing area lens 314) is displayed in third viewing area 306. Third viewing area 306 thus displays a zoomed-in representation of the multimedia information stored by the multimedia document corresponding to the portion of the multimedia document emphasized by thumbnail viewing area lens 314.

As depicted in FIG. 3, third viewing area 306 comprises one or more panels 324. Each panel displays a representation of information of a particular type included in the multimedia information occurring during the time segment emphasized by thumbnail viewing area lens 314. For example, in GUI 300 depicted in FIG. 3, two panels 324-1 and 324-2 are displayed in third viewing area 306. According to an embodiment of the present invention, each panel 324 in third viewing area 306 corresponds to a thumbnail image 312 displayed in second viewing area 304 and displays information corresponding to the section of the thumbnail image covered by thumbnail viewing area lens 314.

Like thumbnail images 312, panels 324 are also temporally aligned or synchronized with each other. Accordingly, the various types of information included in the multimedia information and occurring at approximately the same time are displayed next to each other in third viewing area 306. For example, panels 324-1 and 324-2 depicted in FIG. 3 are aligned such that the text information (which may represent CC text information or a transcript of the audio information) displayed in panel 324-1 and video keyframes displayed in panel 324-2 that occur in the multimedia information at a approximately the same point in time are displayed close to each other (e.g., along the same horizontal axis). Accordingly, information that has a particular time stamp is displayed proximal to other types of information that has approximately the same time stamp. This enables a user to determine the various types of information occurring approximately concurrently in the multimedia information by simply scanning third viewing area 306 in the horizontal axis.

Panel 324-1 depicted in GUI 300 corresponds to thumbnail image 312-1 and displays text information corresponding to the area of thumbnail image 312-1 emphasized or covered by thumbnail viewing area lens 314. The text information displayed by panel 324-1 may correspond to text extracted from CC information included in the multimedia information, or alternatively may represent a transcript of audio information included in the multimedia information. According to an embodiment of the present invention, the present invention takes advantage of the automatic story segmentation and other features that are often provided in close-captioned (CC) text from broadcast news. Most news agencies who provide CC text as part of their broadcast use a special syntax in the CC text (e.g., a ">>>" delimiter to indicate changes in story line or subject, a ">>" delimiter to indicate changes in speakers, etc.). Given the presence of this kind of information in the CC text information included in the multimedia information, the present invention incorporates these features in the text displayed in panel 324-1. For example, a ">>>" delimiter may be displayed to indicate changes in story line or subject, a ">>" delimiter may be displayed to indicate changes in speakers, additional spacing may be displayed between text portions related to different story lines to clearly demarcate the different stories, etc. This enhances the readability of the text information displayed in panel 324-1.

Panel 324-2 depicted in GUI 300 corresponds to thumbnail image 312-2 and displays a representation of video information corresponding to the area of thumbnail image 312-2 emphasized or covered by thumbnail viewing area lens 314. Accordingly, panel 324-2 displays a representation of video information included in the multimedia information stored by the multimedia document and occurring between times $t_1$ and $t_2$ associated with thumbnail viewing area lens 314. In the embodiment depicted in FIG. 3, video keyframes extracted from the video information included in the multimedia information are displayed in panel 324-2. A special layout style (which is user-configurable) is used to display the extracted keyframes to enhance readability of the frames.

Various different techniques may be used to display video keyframes in panel 324-2. According to an embodiment of the present invention, the time segment between time $t_1$ and time $t_2$ is divided into sub-segments of a pre-determined time period. Each sub-segment is characterized by a start time and an end time associated with the sub-segment. According to an embodiment of the present invention, the start time of the first sub-segment corresponds to time $t_1$ while the end time of the last sub-segment corresponds to time $t_2$. Server 104 then extracts a set of one or more video keyframes from the video information stored by the multimedia document for each sub-segment occurring between the start time and end time associated with the sub-segment. For example, according to an embodiment of the present invention, for each sub-segment, server 104 may extract a video keyframe at 1-second intervals between a start time and an end time associated with the sub-segment.

For each sub-segment, server 104 then selects one or more keyframes from the set of extracted video keyframes for the sub-segment to be displayed in panel 324-2. The number of keyframes selected to be displayed in panel 324-2 for each sub-segment is user-configurable. Various different techniques may be used for selecting the video keyframes to be displayed from the extracted set of video keyframes for each time sub-segment. For example, if the set of video keyframes extracted for a sub-segment comprises 24 keyframes and if six video keyframes are to be displayed for each sub-segment (as shown in FIG. 3), server 104 may select the first two video keyframes, the middle two video keyframes, and the last two video keyframes from the set of extracted video keyframes for the sub-segment.

In another embodiment, the video keyframes to be displayed for a sub-segment may be selected based upon the sequential positions of the keyframes in the set of keyframes extracted for sub-segment. For example, if the set of video keyframes extracted for a sub-segment comprises 24 keyframes and if six video keyframes are to be displayed for each sub-segment, then the 1st, 5th, 9th, 13th, 17th, and 21st keyframe may be selected. In this embodiment, a fixed number of keyframes are skipped.

In yet another embodiment, the video keyframes to be displayed for a sub-segment may be selected based upon time values associated with the keyframes in the set of keyframes extracted for sub-segment. For example, if the set of video keyframes extracted for a sub-segment comprises 24 keyframes extracted at a sampling rate of 1 second and if six video keyframes are to be displayed for each sub-segment, then the first frame may be selected and subsequently a keyframe occurring 4 seconds after the previously selected keyframe may be selected.

In an alternative embodiment of the present invention, server 104 may select keyframes from the set of keyframes based upon differences in the contents of the keyframes. For each sub-segment, server 104 may use special image processing techniques to determine differences in the contents of the keyframes extracted for the sub-segment. If six video keyframes are to be displayed for each sub-segment, server 104 may then select six keyframes from the set of extracted keyframes based upon the results of the image processing techniques. For example, the six most dissimilar keyframes may be selected for display in panel 324-2. It should be apparent that various other techniques known to those skilled in the art may also be used to perform the selection of video keyframes.

The selected keyframes are then displayed in panel 324-2. Various different formats may be used to display the selected keyframes in panel 324-2. For example, as shown in FIG. 3, for each sub-segment, the selected keyframes are laid out left-to-right and top-to-bottom.

In an alternative embodiment of the present invention, the entire multimedia document is divided into sub-segments of a pre-determined time period. Each sub-segment is characterized by a start time and an end time associated with the sub-segment. According to an embodiment of the present invention, the start time of the first sub-segment corresponds to the start time of the multimedia document while the end time of the last sub-segment corresponds to the end time of the multimedia document. As described above, server 104 then extracts a set of one or more video keyframes from the video information stored by the multimedia document for each sub-segment based upon the start time and end time associated with the sub-segment. Server 104 then selects one or more keyframes for display for each sub-segment. Based upon the position of thumbnail viewing area lens 314, keyframes that have been selected for display and that occur between $t_1$ and $t_2$ associated with thumbnail viewing area lens 314 are then displayed in panel 324-2.

It should be apparent that various other techniques may also be used for displaying video information in panel 324-2 in alternative embodiments of the present invention. According to an embodiment of the present invention, the user may configure the technique to be used for displaying video information in third viewing area 306.

In GUI 300 depicted in FIG. 3, each sub-segment is 8 seconds long and video keyframes corresponding to a plurality of sub-segments are displayed in panel 324-2. Six video keyframes are displayed from each sub-segment. For each sub-segment, the displayed keyframes are laid out in a left-to-right and top-to-bottom manner.

It should be apparent that, in alternative embodiments of the present invention, the number of panels displayed in third viewing area 306 may be more or less than the number of thumbnail images displayed in second viewing area 304. According to an embodiment of the present invention, the number of panels displayed in third viewing area 306 is user-configurable.

According to the teachings of the present invention, a viewing lens or window 322 (hereinafter referred to as "panel viewing area lens 322") is displayed covering or emphasizing a portion of overview region 306. According to the teachings of the present invention, multimedia information corresponding to the area of third viewing area 306 emphasized by panel viewing area lens 322 is displayed in fourth viewing area 308. A user may change the position of panel viewing area lens 322 by sliding or moving lens 322 along third viewing area 306. In response to a change in the position of panel viewing area lens 322 from a first location in third viewing area 306 to a second location, the multimedia information displayed in fourth viewing area 308 is automatically updated such that the multimedia information displayed in fourth viewing area 308 continues to correspond to the area of third viewing area 306 emphasized by panel viewing area lens 322. Accordingly, a user may use panel viewing area lens 322 to change the multimedia information displayed in fourth viewing area 308.

As described above, a change in the location of panel viewing area lens 322 also causes a change in the location of sub-lens 316 such that the area of second viewing area 304 emphasized by sub-lens 316 continues to correspond to the area of third viewing area 306 emphasized by panel viewing area lens 322. Likewise, as described above, a change in the location of sub-lens 316 also causes a change in the location of panel viewing area lens 322 over third viewing area 306 such that the area of third viewing area 306 emphasized by panel viewing area lens 322 continues to correspond to the changed location of sub-lens 316.

Figure 5A:
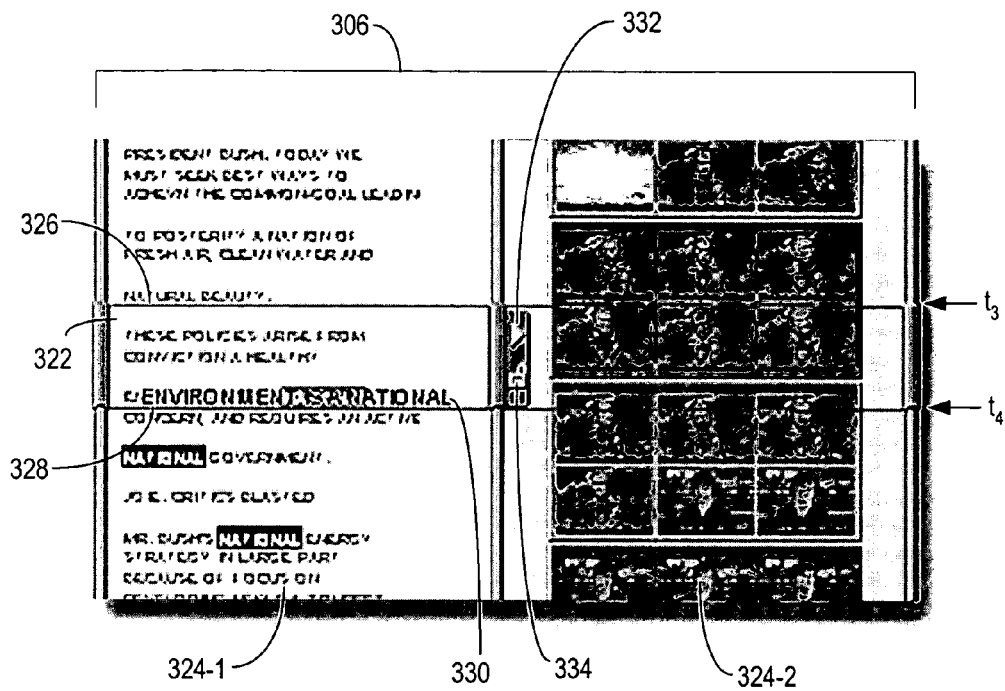
FIGS. 5A, 5B, and 5C are simplified diagrams of a panel viewing area lens according to an embodiment of the present invention.

FIG. 5A is a zoomed-in simplified diagram of panel viewing area lens 322 according to an embodiment of the present invention. As depicted in FIG. 5A, panel viewing area lens 322 is bounded by a first edge 326 and a second edge 328. Panel viewing area lens 322 emphasizes an area of third viewing area 306 between edge 326 and edge 328. Based upon the position of panel viewing area lens 322 over third viewing area 306, edge 326 corresponds to specific time "$t_3$" in the multimedia document and edge 328 corresponds to a specific time "$t_4$" in the multimedia document where $t_4 > t_3$ and ($t_1 \leq t_3 < t_4 \leq t_2$). For example, when panel viewing area lens 322 is positioned at the start of third viewing area 306, $t_3$ may be equal to $t_1$, and when panel viewing area lens 322 is positioned at the end of third viewing area 306, $t_4$ may be equal to $t_2$. Accordingly, panel viewing area lens 322 emphasizes a portion of third viewing area 306 between times $t_3$ and $t_4$. According to an embodiment of the present invention, multimedia information corresponding to the time segment between $t_3$ and $t_4$ (which is emphasized or covered by panel viewing area lens 322) is displayed in fourth viewing area 308. When the position of panel viewing area lens 322 is changed along third viewing area 306 in response to user input, the information displayed in fourth viewing area 308 updated such that the multimedia information displayed in fourth viewing area 308 continues to correspond to the area of third viewing area 306 emphasized by panel viewing area lens 322. Third viewing area 306 thus provides a context and indicates the location of the multimedia information displayed in fourth viewing area 308 within the multimedia document.

According to an embodiment of the present invention, a particular line of text (or one or more words from the last line of text) emphasized by panel viewing area lens 322 may be displayed on a section of lens 322. For example, as depicted in FIGS. 5A and 3, the last line of text 330 "Environment is a national" that is emphasized by panel viewing area lens 322 in panel 324-1 is displayed in bolded style on panel viewing area lens 322.

According to an embodiment of the present invention, special features may be attached to panel viewing area lens 322 to facilitate browsing and navigation of the multimedia document. As shown in FIG. 5A, a "play/pause button" 322 and a "lock/unlock button" 334 are provided on panel viewing area lens 322 according to an embodiment of the present invention. Play/Pause button 332 allows the user to control playback of the video information from panel viewing area lens 322. Lock/Unlock button 334 allows the user to switch the location of the video playback from area 340-1 of fourth viewing area 308 to a reduced window on top of panel viewing area lens 322.

Figure 5B:
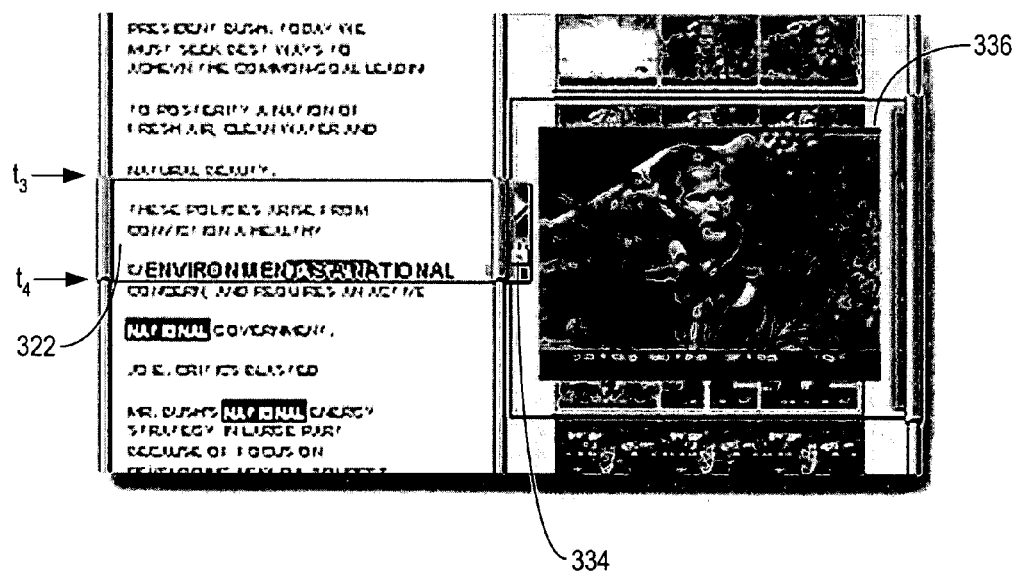

FIG. 5B is a simplified example of panel viewing area lens 322 with its lock/unlock button 334 activated or "locked" (i.e., the video playback is locked onto panel viewing area lens 322) according to an embodiment of the present invention. As depicted in FIG. 5B, in the locked mode, the video information is played back on a window 336 on lens 322. In the embodiment depicted in FIG. 5B, the portion of panel viewing area lens 322 over panel 342-2 is expanded in size beyond times $t_3$ and $t_4$ to accommodate window 336. According to an embodiment of the present invention, the video contents displayed in window 336 correspond to the contents displayed in area 340-1 of fourth viewing area 308.

According to an embodiment of the present invention, window 336 has transparent borders so that portions of the underlying third viewing area 306 (e.g., the keyframes displayed in panel 324-2) can be seen. This helps to maintain the user's location focus while viewing third viewing area 306. The user may use play/pause button 332 to start and stop the video displayed in window 336. The user may change the location of panel viewing area lens 322 while the video is being played back in window 336. A change in the location of panel viewing area lens 322 causes the video played back in window 336 to change corresponding to the new location of panel viewing area lens 322. The video played back in window 336 corresponds to the new time values $t_3$ and $t_4$ associated with panel viewing area lens 322.

Figure 5C:
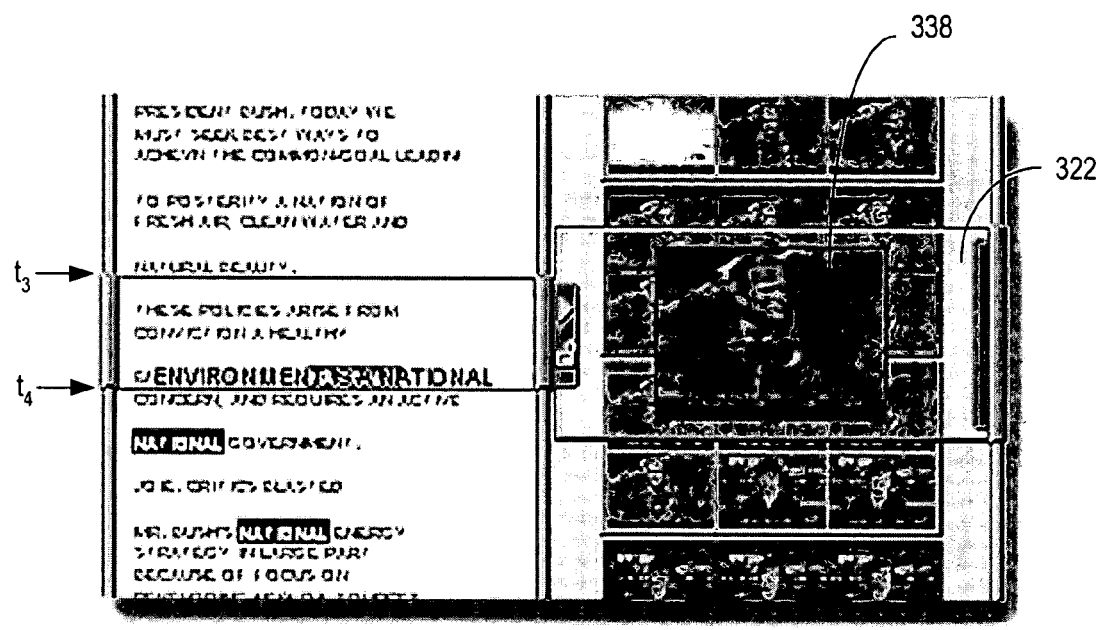

FIG. 5C is a simplified example of panel viewing area lens 322 wherein a representative video keyframe is displayed on panel viewing area lens 322 according to an embodiment of the present invention. In this embodiment server 104 analyzes the video keyframes of panel 324-2 emphasized or covered by panel viewing area lens 322 and determines a particular keyframe 338 that is most representative of the keyframes emphasized by panel viewing area lens 322. The particular keyframe is then displayed on a section of panel viewing area lens 322 covering panel 324-2. In the embodiment depicted in FIG. 5C, the portion of panel viewing area lens 322 over panel 342-2 is expanded in size beyond times $t_3$ and $t_4$ to accommodate display of keyframe 338.

As described above, multimedia information corresponding to the section of third viewing area 306 covered by panel viewing area lens 322 (i.e., multimedia information occurring in the time segment between $t_3$ and $t_4$) is displayed in fourth viewing area 308. As depicted in FIG. 3, fourth viewing area 308 may comprise one or more sub viewing areas 340 (e.g., 340-1, 340-2, and 340-3). According to an embodiment of the present invention, one or more of sub-regions 340 may display a particular type of information included in the multimedia information corresponding to the section of third viewing area 306 emphasized by panel viewing area lens 322.

For example, as depicted in FIG. 3, video information corresponding to (or starting from) the video information emphasized by panel viewing area lens 322 in third viewing area 306 is displayed in sub viewing area 340-1. According to an embodiment of the present invention, video information starting at time $t_3$ (time corresponding to the top edge of panel viewing area lens 322) may be played back in sub viewing area 340-1. In alternative embodiments, the video information played back in area 340-1 may start at time $t_4$ or some other user-configurable time between $t_3$ and $t_4$. The playback of the video in sub viewing area 340-1 may be controlled using control bar 342. Control bar 342 provides a plurality of controls including controls for playing, pausing, stopping, rewinding, and forwarding the video played in sub viewing area 340-1. The current time and length 344 of the video being played in area 340-1 is also displayed. Information identifying the name of the video 346, the date 348 the video was recorded, and the type of the video 350 is also displayed.

In alternative embodiments of the present invention, instead of playing back video information, a video keyframe from the video keyframes emphasized by panel viewing area lens 322 in panel 324-2 is displayed in sub viewing area 340-1. According to an embodiment of the present invention, the keyframe displayed in area 340-1 represents a keyframe that is most representative of the keyframes emphasized by panel viewing area lens 322.

According to an embodiment of the present invention, text information (e.g., CC text, transcript of audio information, etc.) emphasized by panel viewing area lens 322 in third viewing area 306 is displayed in sub viewing area 340-2. According to an embodiment of the present invention, sub viewing area 340-2 displays text information that is displayed in panel 324-1 and emphasized by panel viewing area lens 322. As described below, various types of information may be displayed in sub viewing area 340-3.

Additional information related to the multimedia information stored by the multimedia document may be displayed in fifth viewing area 310 of GUI 300. For example, as depicted in FIG. 3, words occurring in the text information included in the multimedia information displayed by GUI 300 are displayed in area 352 of fifth viewing area 310. The frequency of each word in the multimedia document is also displayed next to each word. For example, the word "question" occurs seven times in the multimedia information CC text. Various other types of information related to the multimedia information may also be displayed in fifth viewing area 310.

According to an embodiment of the present invention, GUI 300 provides features that enable a user to search for one or more words that occur in the text information (e.g., CC text, transcript of audio information) extracted from the multimedia information. For example, a user can enter one or more query words in input field 354 and upon selecting "Find" button 356, server 104 analyzes the text information extracted from the multimedia information stored by the multimedia document to identify all occurrences of the one or more query words entered in field 354. The occurrences of the one or more words in the multimedia document are then highlighted when displayed in second viewing area 304, third viewing area 306, and fourth viewing area 308. For example, according to an embodiment of the present invention, all occurrences of the query words are highlighted in thumbnail image 312-1, in panel 324-1, and in sub viewing area 340-2. In alternative embodiments of the present invention, occurrences of the one or more query words may also be highlighted in the other thumbnail images displayed in second viewing area 304, panels displayed in third viewing area 306, and sub viewing areas displayed in fourth viewing area 308.

Figure 6:
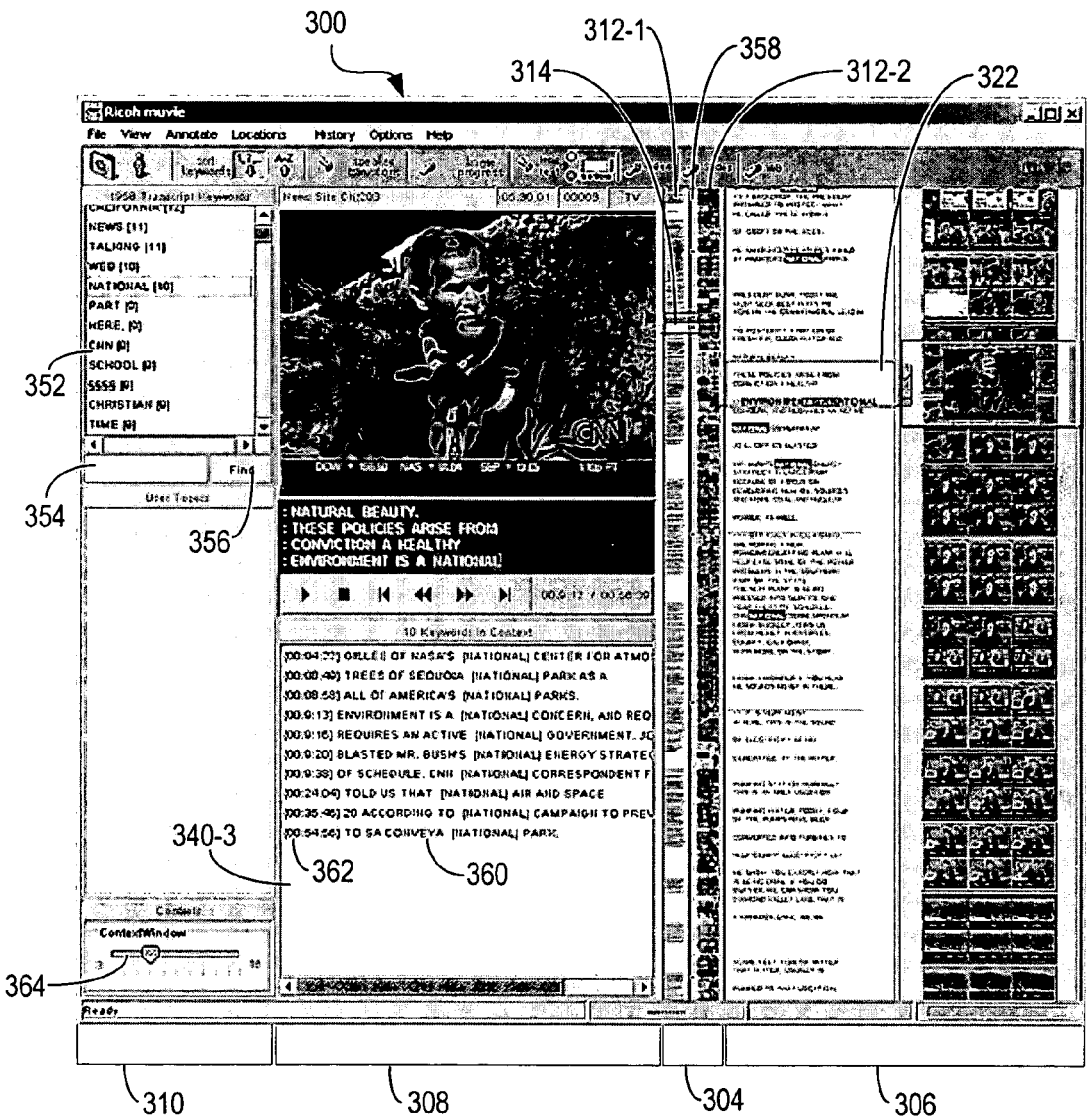
FIG. 6 depicts a simplified user interface generated according to an embodiment of the present invention wherein user-selected words are annotated.

The user may also specify one or more words to be highlighted in the multimedia information displayed in GUI 300. For example, a user may select one or more words to be highlighted from area 352. All occurrences of the keywords selected by the user in area 352 are then highlighted in second viewing area 304, third viewing area 306, and fourth viewing area 308. For example, as depicted in FIG. 6, the user has selected the word "National" in area 352. In response to the user's selection, according to an embodiment of the present invention, all occurrences of the word "National" highlighted in second viewing area 304, third viewing area 306, and third viewing area 306.

According to an embodiment of the present invention, lines of text 360 that comprise the user-selected word(s) (or query words entered in field 354) are displayed in sub viewing area 340-3 of fourth viewing area 308. For each line of text, the time 362 when the line occurs (or the timestamp associated with the line of text) in the multimedia document is also displayed. The timestamp associated with the line of text generally corresponds to the timestamp associated with the first word in the line.

For each line of text, one or more words surrounding the selected or query word(s) are displayed. According to an embodiment of the present invention, the number of words surrounding a selected word that are displayed in area 340-3 are user configurable. For example, in GUI 300 depicted in FIG. 6, a user can specify the number of surrounding words to be displayed in area 340-3 using control 364. The number specified by the user indicates the number of words that occur before the select word and the number of words that occur after the selected word that are to be displayed. In the embodiment depicted in FIG. 6, control 364 is a slider bar that can be adjusted between a minimum value of "3" a maximum value of "10". The user can specify the number of surrounding words to be displayed by adjusting slider bar 364. For example, if the slider bar is set to "3", then three words that occur before a selected word and three words that occur after the selected word will be displayed in area 340-3. The minimum and maximum values are user configurable.

Figure 7:
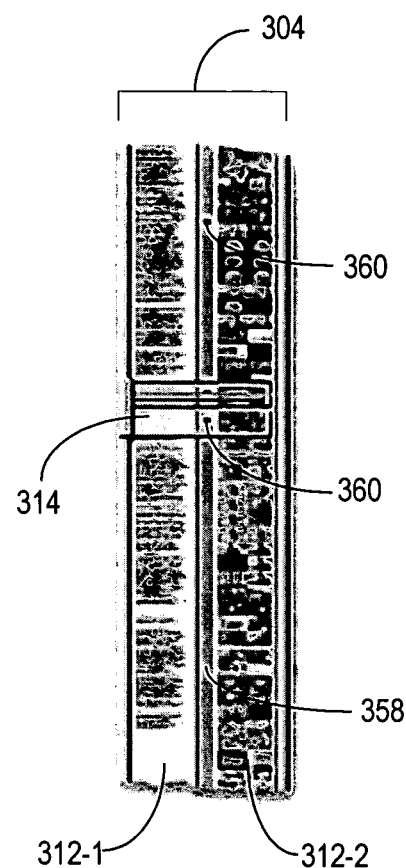
FIG. 7 is a simplified zoomed-in view of a second viewing area of a GUI generated according to an embodiment of the present invention.
Figure 20A:
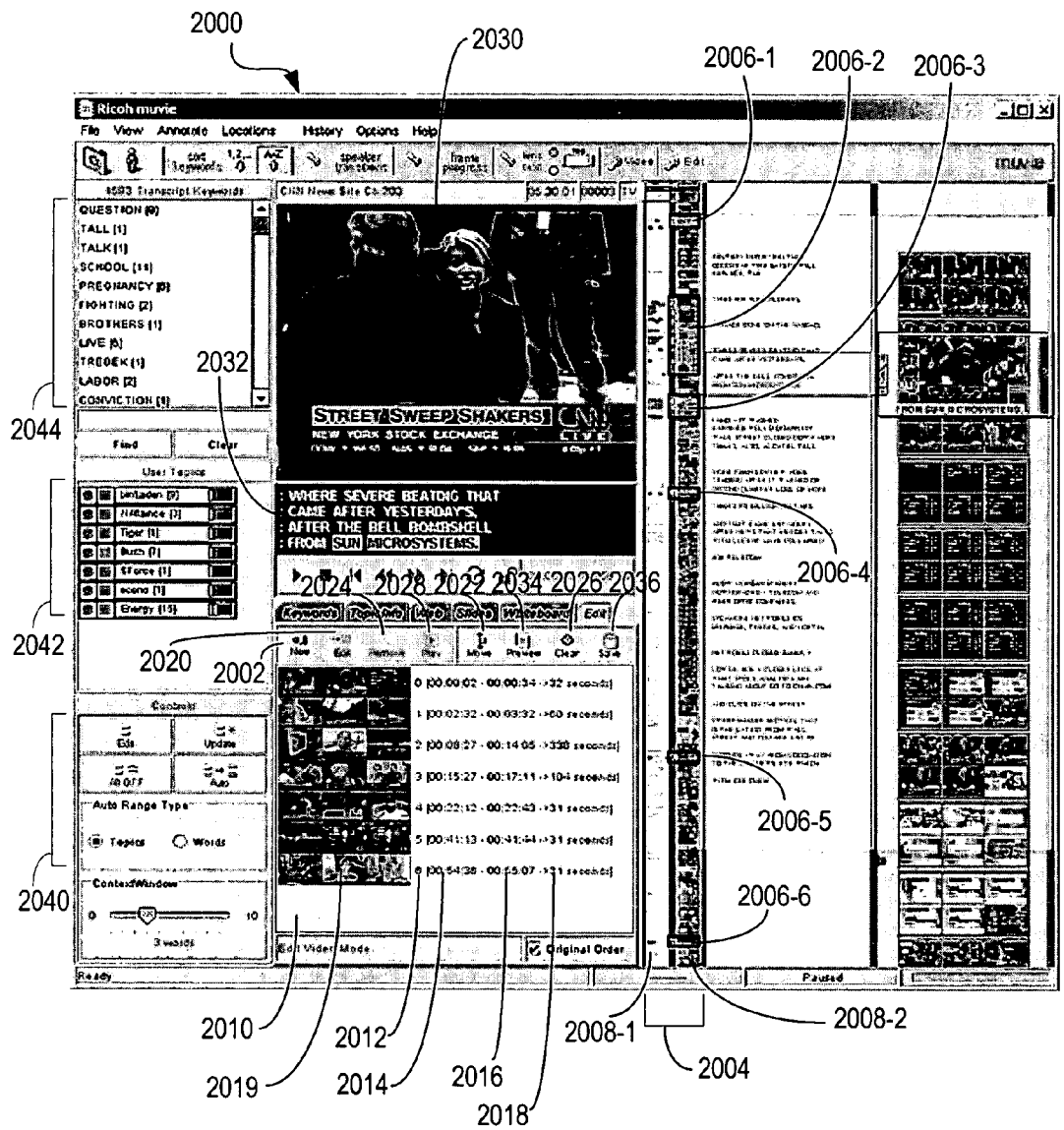
FIG. 20A depicts a simplified user interface that displays ranges according to an embodiment of the present invention.

Further, GUI 300 depicted in FIG. 6 comprises an area 358 sandwiched between thumbnail images 312-1 and 312-2 that indicates locations of occurrences of the query words or other words specified by the user. For example, area 358 comprises markers indicating the locations of word "National" in thumbnail image 312-1. The user can then use either thumbnail viewing area lens 314, or panel viewing area lens 322 to scroll to a desired location within the multimedia document. FIG. 7 depicts a simplified zoomed-in view of second viewing area 304 showing area 358 according to an embodiment of the present invention. As depicted in FIG. 7, area 358 (or channel 358) comprises markers 360 indicating locations in thumbnail image 312-1 that comprise occurrences of the word "National". In alternative embodiments of the present invention, markers in channel 358 may also identify locations of the user-specified words or phrases in the other thumbnail images displayed in second viewing area 304. In alternative embodiments, locations of occurrences of the query words or other words specified by the user may be displayed on thumbnail images 312 (as depicted in FIG. 20A).

As shown in FIG. 6, the position of thumbnail viewing area lens 314 has been changed with respect to FIG. 3. In response to the change in position of thumbnail viewing area lens 314, the multimedia information displayed in third viewing area 306 has been changed to correspond to the section of second viewing area 304 emphasized by thumbnail viewing area lens 314. The multimedia information displayed in fourth viewing area 308 has also been changed corresponding to the new location of panel viewing area lens 322.

According to an embodiment of the present invention, multimedia information displayed in GUI 300 that is relevant to user-specified topics of interest is highlighted or annotated. The annotations provide visual indications of information that is relevant to or of interest to the user. GUI 300 thus provides a convenient tool that allows a user to readily locate portions of the multimedia document that are relevant to the user.

According to an embodiment of the present invention, information specifying topics that are of interest or are relevant to the user may be stored in a user profile. One or more words or phrases may be associated with each topic of interest. Presence of the one or more words and phrases associated with a particular user-specified topic of interest indicates presence of information related to the particular topic. For example, a user may specify two topics of interest—"George W. Bush" "Energy Crisis". Words or phrases associated with the topic "George Bush" include "President Bush," "the President," "Mr. Bush," and other like words and phrases. Words or phrases associated with the topic "Energy Crisis" may include "industrial pollution," "natural pollution," "clean up the sources," "amount of pollution," "air pollution", "electricity," "power-generating plant," or the like. Probability values may be associated with each of the words or phrases indicating the likelihood of the topic of interest given the presence of the word or phrase. Various tools may be provided to allow the user to configure topics of interest, to specify keywords and phrases associated with the topics, and to specify probability values associated with the keywords or phrases.

It should be apparent that various other techniques known to those skilled in the art may also be used to model topics of interest to the user. These techniques may include the use of Bayesian networks, relevance graphs, or the like. Techniques for determining sections relevant to user-specified topics, techniques for defining topics of interest, techniques for associating keywords and/or key phrases and probability values are described in U.S. application Ser. No. 08/995,616, filed Dec. 22, 1997, the entire contents of which are herein incorporated by reference for all purposes.

According to an embodiment of the present invention, in order to identify locations in the multimedia document related to user-specified topics of interest, server 104 searches the multimedia document to identify locations within the multimedia document of words or phrases associated with the topics of interest. As described above, presence of words and phrases associated with a particular user-specified topic of interest in the multimedia document indicate presence of the particular topic relevant to the user. The words and phrases that occur in the multimedia document and that are associated with user specified topics of interest are annotated when displayed by GUI 300.

Figure 8:
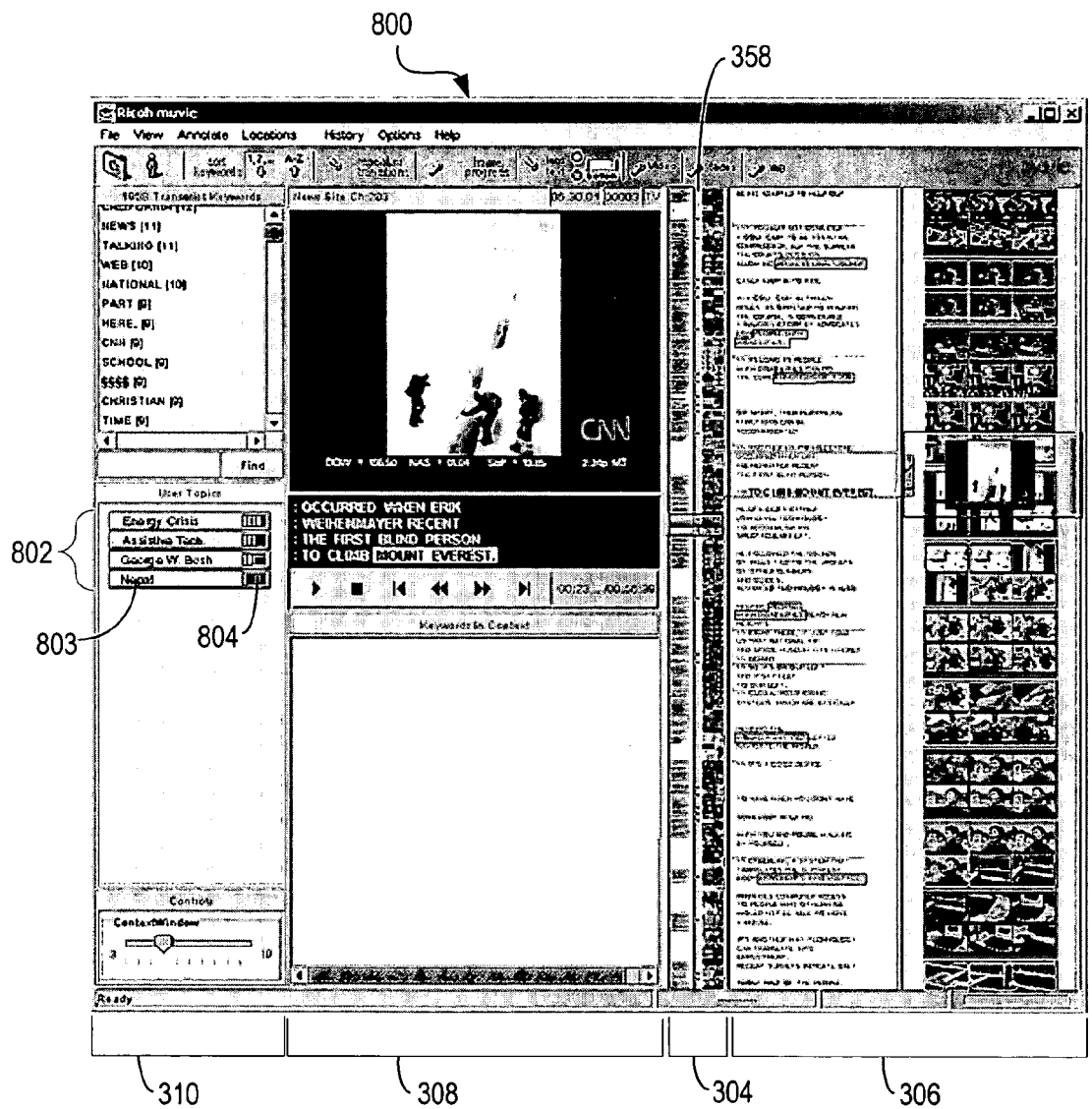
FIG. 8 depicts a simplified GUI in which multimedia information that is relevant to one or more topics of interest to a user is annotated according to an embodiment of the present invention.

FIG. 8 depicts an example of a simplified GUI 800 in which multimedia information that is relevant to one or more topics of interest to a user is annotated (or highlighted) when displayed in GUI 800 according to an embodiment of the present invention. GUI 800 depicted in FIG. 8 is merely illustrative of an embodiment of the present invention and does not limit the scope of the invention as recited in the claims. One of ordinary skill in the art would recognize other variations, modifications, and alternatives.

In the embodiment depicted in FIG. 8, the user has specified four topics of interest 802. A label 803 identifies each topic. The topics specified in GUI 800 include "Energy Crisis," "Assistive Tech," "George W. Bush," and "Nepal." In accordance with the teachings of the present invention, keywords and key phrases relevant to the specified topics are highlighted in second viewing area 304, third viewing area 306, and fourth viewing area 308. Various different techniques may be used to highlight or annotate the keywords and/or key phrases related to the topics of interest. According to an embodiment of the present invention, different colors and styles (e.g., bolding, underlining, different font size, etc.) may be used to highlight words and phrases related to user-specified topics. For example, each topic may be assigned a particular color and content related to a particular topic might be highlighted using the particular color assigned to the particular topic. For example, as depicted in FIG. 8, a first color is used to highlight words and phrases related to the "Energy Crisis" topic of interest, a second color is used to highlight words and phrases related to the "Assistive Tech" topic of interest, a third color is used to highlight words and phrases related to the "George W. Bush" topic of interest, and a fourth color is used to highlight words and phrases related to the "Nepal" topic of interest.

According to an embodiment of the present invention, server 104 searches the text information (either CC text or transcript of audio information) extracted from the multimedia information to locate words or phrases relevant to the user topics. If server 104 finds a word or phrase in the text information that is associated with a topic of interest, the word or phrase is annotated when displayed in GUI 800. As described above, several different techniques may be used to annotate the word or phrase. For example, the word or phrase may highlighted, bolded, underlined, demarcated using sidebars or balloons, font may be changed, etc.

Keyframes (representing video information of the multimedia document) that are displayed by the GUI and that are related to user specified topics of interest may also be highlighted. According to an embodiment of the present invention, server system 104 may use OCR techniques to extract text from the keyframes extracted from the video information included in the multimedia information. The text output of the OCR techniques may then be compared with words or phrases associated with one or more user-specified topics of interest. If there is a match, the keyframe containing the matched word or phrase (i.e., the keyframe from which the matching word or phrase was extracted by OCR techniques) may be annotated when the keyframe is displayed in GUI 800 either in second viewing area 304, third viewing area 306, or fourth viewing area 308 of GUI 800. Several different techniques may be used to annotate the keyframe. For example, a special box may be drawn around a keyframe that is relevant to a particular topic of interest. The color of the box may correspond to the color associated with the particular topic of interest. The matching text in the keyframe may also be highlighted or underlined or displayed in reverse video. As described above, the annotated keyframes displayed in second viewing area 304 (e.g., the keyframes displayed in thumbnail image 312-2 in FIG. 3) may be identified by markers displayed in channel area 358. In alternative embodiments, the keyframes may be annotated in thumbnail image 312-2.

According to an embodiment of the present invention, as shown in FIG. 8, a relevance indicator 804 may also be displayed for each user topic. For a particular topic, the relevance indicator for the topic indicates the degree of relevance (or a relevancy score) of the multimedia document to the particular topic. For example, as shown in FIG. 8, the number of bars displayed in a relevance indicator associated with a particular topic indicates the degree of relevance of the multimedia document to the particular topic. Accordingly, the multimedia document displayed in GUI 800 is most relevant to user topic "Energy Crisis" (as indicated by four bars) and least relevant to user topic "Nepal" (indicated by one bar). Various other techniques (e.g., relevance scores, bar graphs, different colors, etc.) may also be used to indicate the degree of relevance of each topic to the multimedia document.

According to an embodiment of the present invention, the relevancy score for a particular topic may be calculated based upon the frequency of occurrences of the words and phrases associated with the particular topic in the multimedia information. Probability values associated with the words or phrases associated with the particular topic may also be used to calculate the relevancy score for the particular topic. Various techniques known to those skilled in the art may also be used to determine relevancy scores for user specified topics of interest based upon the frequency of occurrences of words and phrases associated with a topic in the multimedia information and the probability values associated with the words or phrases. Various other techniques known to those skilled in the art may also be used to calculate the degree of relevancy of the multimedia document to the topics of interest.

As previously stated, a relevance indicator is used to display the degree or relevancy or relevancy score to the user. Based upon information displayed by the relevance indicator, a user can easily determine relevance of multimedia information stored by a multimedia document to topics that may be specified by the user.

Figure 9:
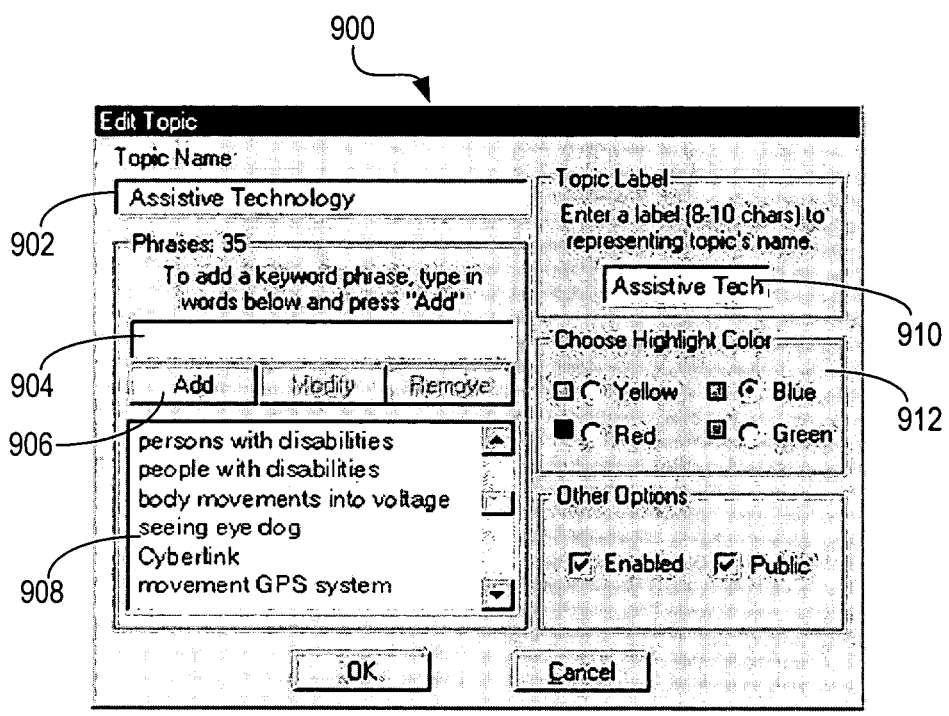
FIG. 9 depicts a simplified user interface for defining a topic of interest according to an embodiment of the present invention.

FIG. 9 depicts a simplified user interface 900 for defining a topic of interest according to an embodiment of the present invention. User interface 900 may be invoked by selecting an appropriate command from first viewing area 302. GUI 900 depicted in FIG. 9 is merely illustrative of an embodiment of the present invention and does not limit the scope of the invention as recited in the claims. One of ordinary skill in the art would recognize other variations, modifications, and alternatives.

A user may specify a topic of interest in field 902. A label identifying the topic of interest can be specified in field 910. The label specified in field 910 is displayed in the GUI generated according to the teachings of the present invention to identify the topic of interest. A list of keywords and/or phrases associated with the topic specified in field 902 is displayed in area 908. A user may add new keywords to the list, modify one or more keywords in the list, or remove one or more keywords from the list of keywords associated with the topic of interest. The user may specify new keywords or phrases to be associated with the topic of interest in field 904. Selection of "Add" button 906 adds the keywords or phrases specified in field 904 to the list of keywords previously associated with a topic. The user may specify a color to be used for annotating information relevant to the topic of interest by selecting the color in area 912. For example, in the embodiment depicted in FIG. 9, locations in the multimedia document related to "Assistive Technology" will be annotated in blue color.

Figure 10:
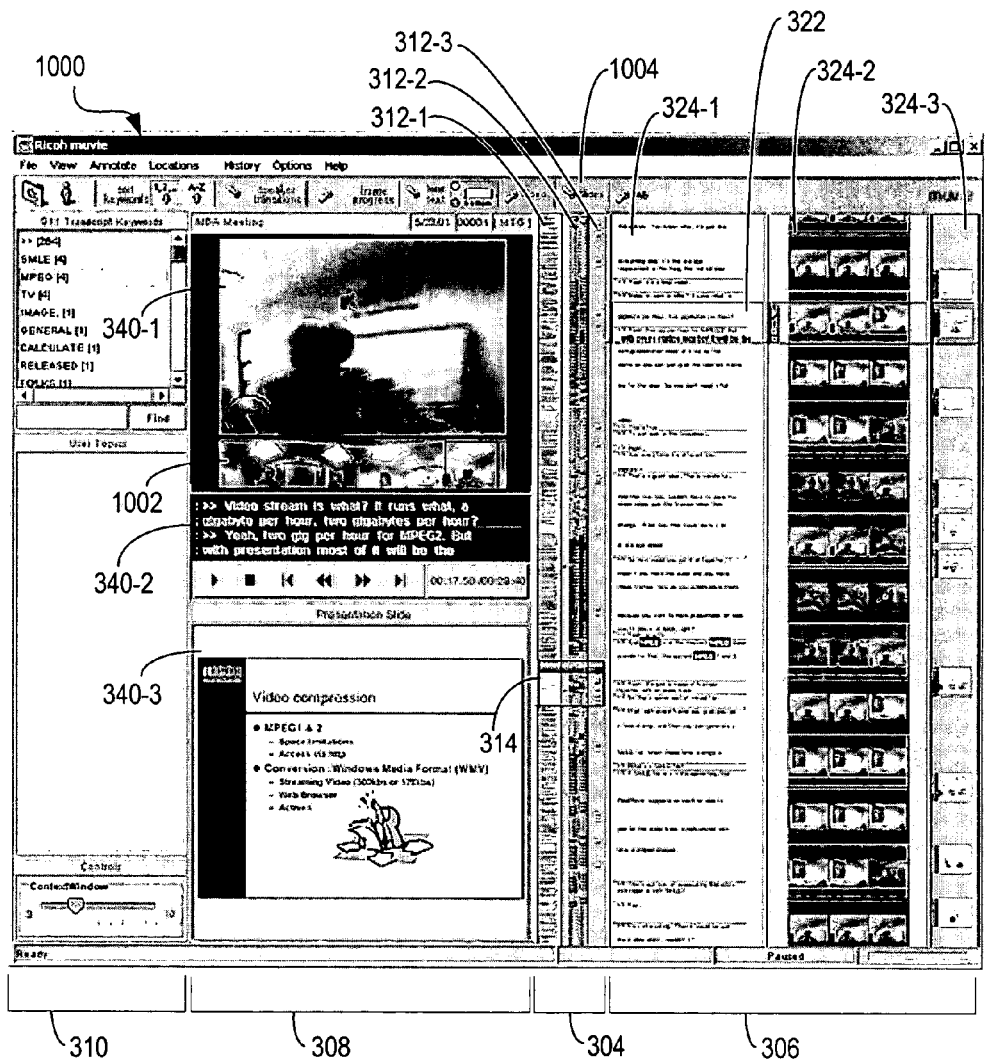
FIG. 10 depicts a simplified user interface that displays multimedia information stored by a meeting recording according to an embodiment of the present invention.

According to the teachings of the present invention, various different types of information included in multimedia information may be displayed by the GUI generated by server 104. FIG. 10 depicts a simplified user interface 1000 that displays multimedia information stored by a meeting recording according to an embodiment of the present invention. It should be apparent that GUI 1000 depicted in FIG. 10 is merely illustrative of an embodiment incorporating the present invention and does not limit the scope of the invention as recited in the claims. One of ordinary skill in the art would recognize other variations, modifications, and alternatives.

The multimedia information stored by the meeting recording may comprise video information, audio information and possibly CC text information, and slides information. The slides information may comprise information related to slides (e.g., a PowerPoint presentation slides) presented during the meeting. For example, slides information may comprise images of slides presented at the meeting. As shown in FIG. 10, second viewing area 304 comprises three thumbnail images 312-1, 312-2, and 312-3. Text information (either CC text information or a transcript of audio information included in the meeting recording) extracted from the meeting recording multimedia information is displayed in thumbnail image 312-1. Video keyframes extracted from the video information included in the meeting recording multimedia information are displayed in thumbnail image 312-2. Slides extracted from the slides information included in the multimedia information are displayed in thumbnail image 312-3. The thumbnail images are temporally aligned with one another. The information displayed in thumbnail image 312-4 provides additional context for the video and text information in that, the user can view presentation slides that were presented at various times throughout the meeting recording.

Third viewing area 306 comprises three panels 324-1, 324-2, and 324-3. Panel 324-1 displays text information corresponding to the section of thumbnail image 312-1 emphasized or covered by thumbnail viewing area lens 314. Panel 324-2 displays video keyframes corresponding to the section of thumbnail image 312-2 emphasized or covered by thumbnail viewing area lens 314. Panel 324-3 displays one or more slides corresponding to the section of thumbnail image 312-3 emphasized or covered by thumbnail viewing area lens 314. The panels are temporally aligned with one another.

Fourth viewing area 308 comprises three sub-viewing areas 340-1, 340-2, and 340-3. Sub viewing area 340-1 displays video information corresponding to the section of panel 324-2 covered by panel viewing area lens 322. As described above, sub-viewing area 340-1 may display a keyframe corresponding to the emphasized portion of panel 324-2. Alternatively, video based upon the position of panel viewing area lens 322 may be played back in area 340-1. According to an embodiment of the present invention, time $t_3$ associated with lens 322 is used as the start time for playing the video in area 340-1 of fourth viewing area 308. A panoramic shot 1002 of the meeting room (which may be recorded using a 360 degrees camera) is also displayed in area 340-1 of fourth viewing area 308. Text information emphasized by panel viewing area lens 322 in panel 324-1 is displayed in area 340-2 of fourth viewing area 308. One or more slides emphasized by panel viewing area lens 322 in panel 324-3 are displayed in area 340-3 of fourth viewing area 308. According to an embodiment of the present invention, the user may also select a particular slide from panel 324-3 by clicking on the slide. The selected slide is then displayed in area 340-3 of fourth viewing area 308.

According to an embodiment of the present invention, the user can specify the types of information included in the multimedia document that are to be displayed in the GUI. For example, the user can turn on or off slides related information (i.e., information displayed in thumbnail 312-3, panel 324-3, and area 340-3 of fourth viewing area 308) displayed in GUI 1000 by selecting or deselecting "Slides" button 1004. If a user deselects slides information, then thumbnail 312-3 and panel 324-3 are not displayed by GUI 1000. Thumbnail 312-3 and panel 324-3 are displayed by GUI 1000 if the user selects button 1004. Button 1004 thus acts as a switch for displaying or not displaying slides information. In a similar manner, the user can also control other types of information displayed by a GUI generated according to the teachings of the present invention. For example, features may be provided for turning on or off video information, text information, and other types of information that may be displayed by GUI 1000.

Figure 11:
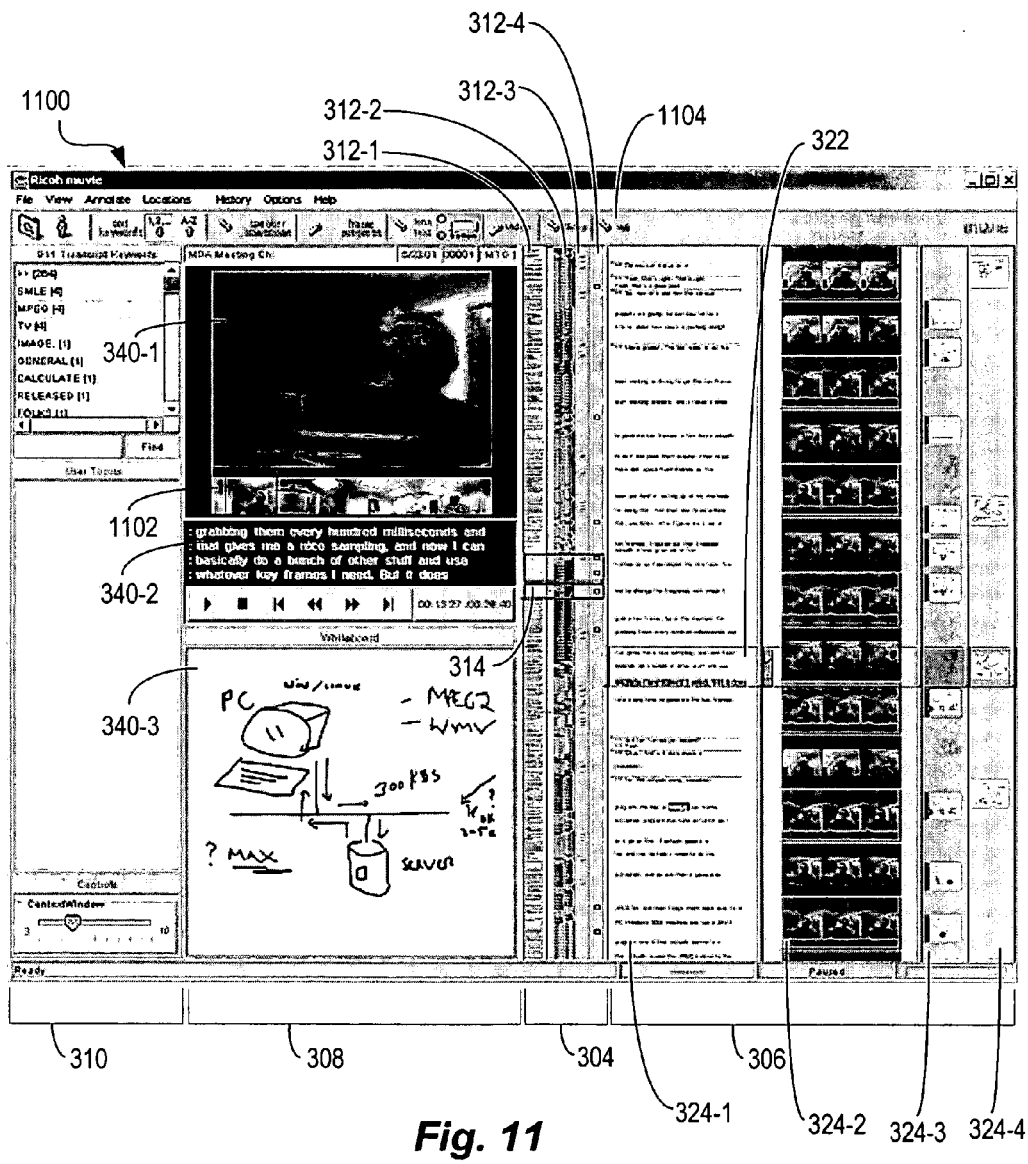
FIG. 11 depicts a simplified user interface that displays multimedia information stored by a multimedia document according to an embodiment of the present invention.

FIG. 11 depicts a simplified user interface 1100 that displays multimedia information stored by a multimedia document according to an embodiment of the present invention. It should be apparent that GUI 1100 depicted in FIG. 11 is merely illustrative of an embodiment incorporating the present invention and does not limit the scope of the invention as recited in the claims. One of ordinary skill in the art would recognize other variations, modifications, and alternatives.

The multimedia document whose contents are displayed in GUI 1100 comprises video information, audio information or CC text information, slides information, and whiteboard information. The whiteboard information may comprise images of text and drawings drawn on a whiteboard. As shown in FIG. 11, second viewing area 304 comprises four thumbnail images 312-1, 312-2, 312-3, and 312-4. Text information (either CC text information or a transcript of audio information included in the meeting recording) extracted from the multimedia document is displayed in thumbnail image 312-1. Video keyframes extracted from the video information included in the multimedia document are displayed in thumbnail image 312-2. Slides extracted from the slides information included in the multimedia information are displayed in thumbnail image 312-3. Whiteboard images extracted from the whiteboard information included in the multimedia document are displayed in thumbnail image 312-4. The thumbnail images are temporally aligned with one another.

Third viewing area 306 comprises four panels 324-1, 324-2, 324-3, and 324-4. Panel 324-1 displays text information corresponding to the section of thumbnail image 312-1 emphasized or covered by thumbnail viewing area lens 314. Panel 324-2 displays video keyframes corresponding to the section of thumbnail image 312-2 emphasized or covered by thumbnail viewing area lens 314. Panel 324-3 displays one or more slides corresponding to the section of thumbnail image 312-3 emphasized or covered by thumbnail viewing area lens 314. Panel 324-4 displays one or more whiteboard images corresponding to the section of thumbnail image 312-4 emphasized or covered by thumbnail viewing area lens 314. The panels are temporally aligned with one another.

Fourth viewing area 308 comprises three sub-viewing areas 340-1, 340-2, and 340-3. Area 340-1 displays video information corresponding to the section of panel 324-2 covered by panel viewing area lens 322. As described above, sub-viewing area 340-1 may display a keyframe or play back video corresponding to the emphasized portion of panel 324-2. According to an embodiment of the present invention, time $t_3$ (as described above) associated with lens 322 is used as the start time for playing the video in area 340-1 of fourth viewing area 308. A panoramic shot 1102 of the location where the multimedia document was recorded (which may be recorded using a 360 degrees camera) is also displayed in area 340-1 of fourth viewing area 308. Text information emphasized by panel viewing area lens 322 in panel 324-1 is displayed in area 340-2 of fourth viewing area 308. Slides emphasized by panel viewing area lens 322 in panel 324-3 or whiteboard images emphasized by panel viewing area lens 322 in panel 324-4 may be displayed in area 340-3 of fourth viewing area 308. In the embodiment depicted in FIG. 11, a whiteboard image corresponding to the section of panel 324-4 covered by panel viewing area lens 322 is displayed in area 340-3. According to an embodiment of the present invention, the user may also select a particular slide from panel 324-3 or select a particular whiteboard image from panel 324-4 by clicking on the slide or whiteboard image. The selected slide or whiteboard image is then displayed in area 340-3 of fourth viewing area 308.

As described above, according to an embodiment of the present invention, the user can specify the types of information from the multimedia document that are to be displayed in the GUI. For example, the user can turn on or off a particular type of information displayed by the GUI. "WB" button 1104 allows the user to turn on or off whiteboard related information (i.e., information displayed in thumbnail image 312-4, panel 324-4, and area 340-3 of fourth viewing area 308) displayed in GUI 1000.

Figure 12:
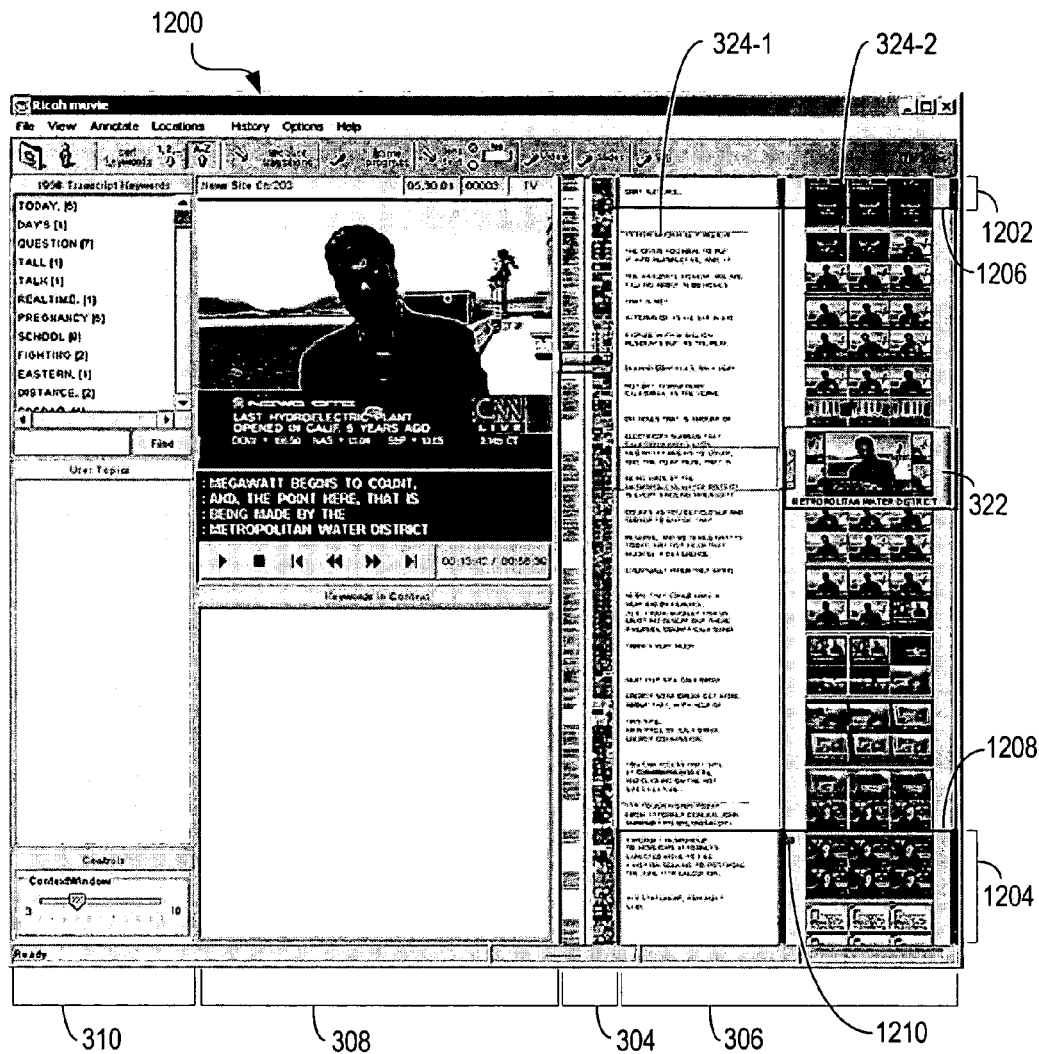
FIG. 12 depicts a simplified user interface that displays multimedia information stored by a multimedia document according to an embodiment of the present invention.

FIG. 12 depicts a simplified user interface 1200 that displays contents of a multimedia document according to an embodiment of the present invention. It should be apparent that GUI 1200 depicted in FIG. 12 is merely illustrative of an embodiment incorporating the present invention and does not limit the scope of the invention as recited in the claims. One of ordinary skill in the art would recognize other variations, modifications, and alternatives.

As depicted in FIG. 12, preview areas 1202 and 1204 are provided at the top and bottom of third viewing area 306. In this embodiment, panel viewing area lens 322 can be moved along third viewing area 306 between edge 1206 of preview area 1202 and edge 1208 of preview area 1204. Preview areas 1202 and 1204 allow the user to preview the contents displayed in third viewing area 306 when the user scrolls the multimedia document using panel viewing area lens 322. For example, as the user is scrolling down the multimedia document using panel viewing area lens 322, the user can see upcoming contents in preview area 1204 and see the contents leaving third viewing area 306 in preview area 1202. If the user is scrolling up the multimedia document using panel viewing area lens 322, the user can see upcoming contents in preview area 1202 and see the contents leaving third viewing area 306 in preview area 1204. According to an embodiment of the present invention, the size (or length) of each preview region can be changed and customized by the user. For example, in GUI 1200 depicted in FIG. 12, a handle 1210 is provided that can be used by the user to change the size of preview region 1204. According to an embodiment of the present invention, preview areas may also be provided in second viewing area 304.

Figure 13:
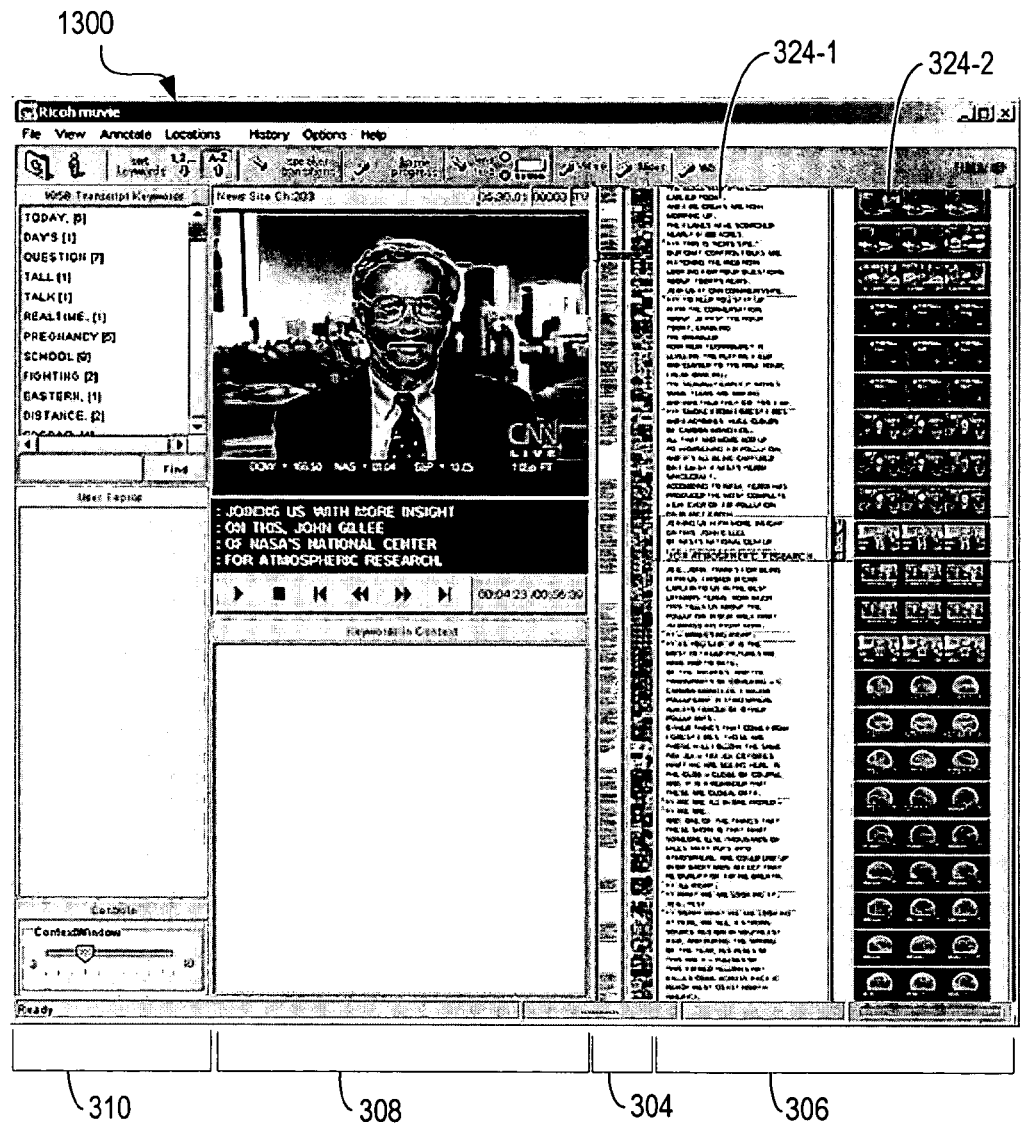
FIG. 13 depicts a simplified user interface that displays contents of a multimedia document according to an embodiment of the present invention.

FIG. 13 depicts a simplified user interface 1300 that displays contents of a multimedia document according to an embodiment of the present invention. It should be apparent that GUI 1300 depicted in FIG. 13 is merely illustrative of an embodiment incorporating the present invention and does not limit the scope of the invention as recited in the claims. One of ordinary skill in the art would recognize other variations, modifications, and alternatives.

As depicted in FIG. 13, text information is displayed in panel 324-1 of third viewing area 306 in compressed format, i.e., the white spaces between the text lines have been removed. This enhances the readability of the text information. The lines of text displayed in panel 324-1 are then used to determine the video frames to be displayed in panel 324-2. According to an embodiment of the present invention, a timestamp is associated with each line of text displayed in panel 324-1. The timestamp associated with a line of text represents the time when the text occurred in the multimedia document being displayed by GUI 1300. In one embodiment, the timestamp associated with a line of text corresponds to the timestamp associated with the first word in the line of text. The lines of text displayed in panel 324-1 are then grouped into groups, with each group comprising a pre-determined number of lines.

Video keyframes are then extracted from the video information stored by the multimedia document for each group of lines depending on time stamps associated with lines in the group. According to an embodiment of the present invention, server 104 determines a start time and an end time associated with each group of lines. A start time for a group corresponds to a time associated with the first (or earliest) line in the group while an end time for a group corresponds to the time associated with the last line (or latest) line in the group. In order to determine keyframes to be displayed in panel 324-2 corresponding to a particular group of text lines, server 104 extracts a set of one or more video keyframes from the portion of the video information occurring between the start and end time associated with the particular group. One or more keyframes are then selected from the extracted set of video keyframes to be displayed in panel 324-2 for the particular group. The one or more selected keyframes are then displayed in panel 324-1 proximal to the group of lines displayed in panel 324-1 for which the keyframes have been extracted.

For example, in FIG. 13, the lines displayed in panel 324-1 are divided into groups wherein each group comprises 4 lines of text. For each group, the time stamp associated with the first line in the group corresponds to the start time for the group while the time stamp associated with the fourth line in the group corresponds to the end time for the group of lines. Three video keyframes are displayed in panel 324-2 for each group of four lines of text displayed in panel 324-1 in the embodiment depicted in FIG. 13. According to an embodiment of the present invention, the three video keyframes corresponding to a particular group of lines correspond to the first, middle, and last keyframe from the set of keyframes extracted from the video information between the start and end times of the particular group. As described above, various other techniques may also be used to select the video keyframes that are displayed in panel 324-2. For each group of lines displayed in panel 324-1, the keyframes corresponding to the group of lines are displayed such that the keyframes are temporally aligned with the group of lines. In the embodiment depicted in FIG. 13, the height of keyframes for a group of lines is approximately equal to the vertical height of the group of lines.

The number of text lines to be included in a group is user configurable. Likewise, the number of video keyframes to be extracted for a particular group of lines is also user configurable. Further, the video keyframes to be displayed in panel 324-2 for each group of lines can also be configured by the user of the present invention.

The manner in which the extracted keyframes are displayed in panel 324-2 is also user configurable. Different techniques may be used to show the relationships between a particular group of lines and video keyframes displayed for the particular group of lines. For example, according to an embodiment of the present invention, a particular group of lines displayed in panel 324-1 and the corresponding video keyframes displayed in panel 324-2 may be color-coded or displayed using the same color to show the relationship. Various other techniques known to those skilled in the art may also be used to show the relationships.

GUI Generation Technique According to an Embodiment of the Present Invention

The following section describes techniques for generating a GUI (e.g., GUI 300 depicted in FIG. 3) according to an embodiment of the present invention. For purposes of simplicity, it is assumed that the multimedia information to be displayed in the GUI comprises video information, audio information, and CC text information. The task of generating GUI 300 can be broken down into the following tasks: (a) displaying thumbnail 312-1 displaying text information extracted from the multimedia information in second viewing area 304; (b) displaying thumbnail 312-2 displaying video keyframes extracted from the video information included in the multimedia information; (c) displaying thumbnail viewing area lens 314 emphasizing a portion of second viewing area 304 and displaying information corresponding to the emphasized portion of second viewing area 304 in third viewing area 306, and displaying panel viewing area lens 322 emphasizing a portion of third viewing area 306 and displaying information corresponding to the emphasized portion of third viewing area 306 in fourth viewing area 308; and (d) displaying information in fifth viewing area 310.

Figure 14:
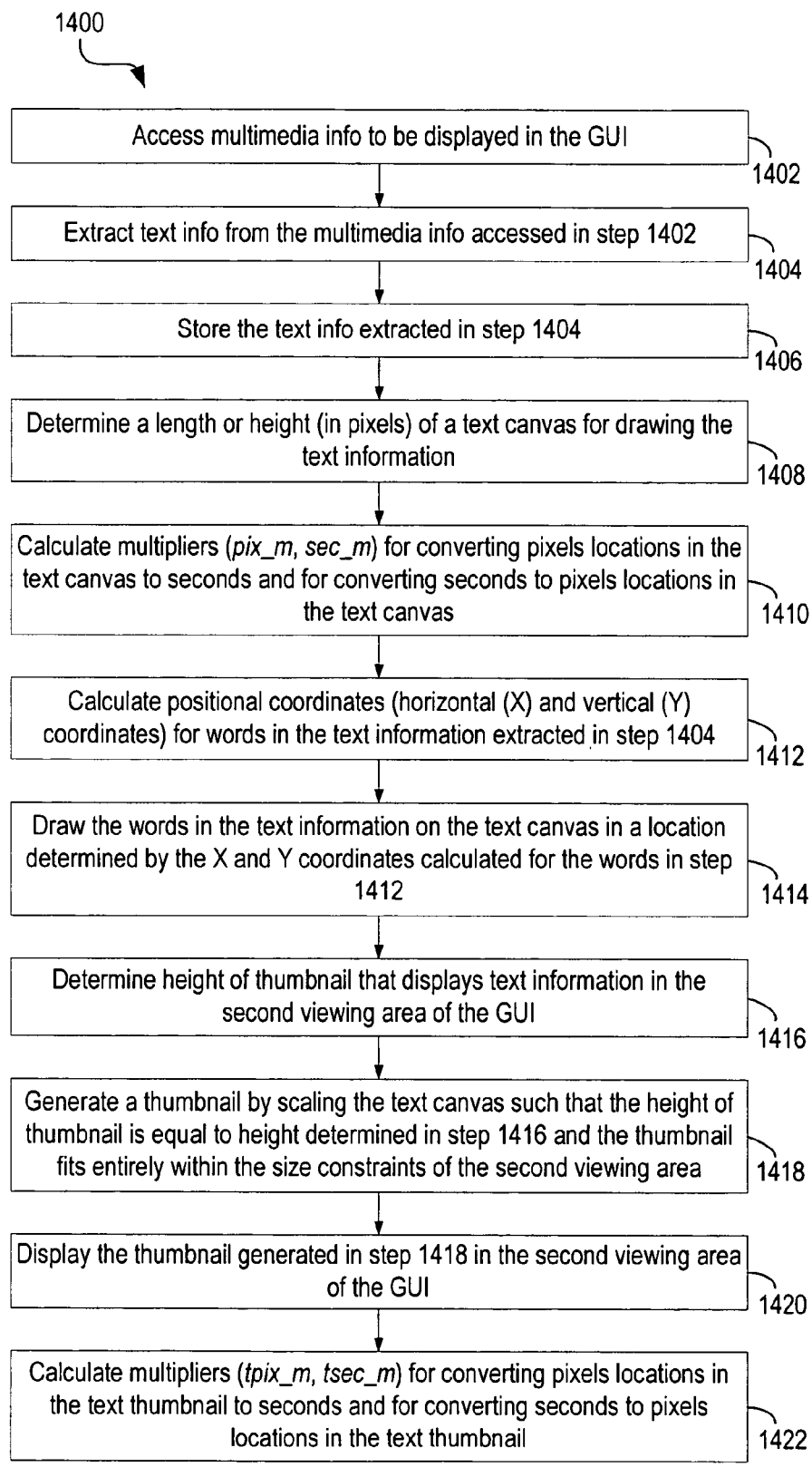
FIG. 14 is a simplified high-level flowchart depicting a method of displaying a thumbnail depicting text information in the second viewing area of a GUI according to an embodiment of the present invention.

FIG. 14 is a simplified high-level flowchart 1400 depicting a method of displaying thumbnail 312-1 in second viewing area 304 according to an embodiment of the present invention. The method depicted in FIG. 14 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 14 is merely illustrative of an embodiment incorporating the present invention and does not limit the scope of the invention as recited in the claims. One of ordinary skill in the art would recognize other variations, modifications, and alternatives.

As depicted in FIG. 14, the method is initiated when server 104 accesses multimedia information to be displayed in the GUI (step 1402). As previously stated, the multimedia information may be stored in a multimedia document accessible to server 104. As part of step 1402, server 104 may receive information (e.g., a filename of the multimedia document) identifying the multimedia document and the location (e.g., a directory path) of the multimedia document. A user of the present invention may provide the multimedia document identification information. Server 104 may then access the multimedia document based upon the provided information. Alternatively, server 104 may receive the multimedia information to be displayed in the GUI in the form of a streaming media signal, a cable signal, etc. from a multimedia information source. Server system 104 may then store the multimedia information signals in a multimedia document and then use the stored document to generate the GUI according to the teachings of the present invention.

Server 104 then extracts text information from the multimedia information accessed in step 1402 (step 1404). If the multimedia information accessed in step 1402 comprises CC text information, then the text information corresponds to CC text information that is extracted from the multimedia information. If the multimedia information accessed in step 1402 does not comprise CC text information, then in step 1404, the audio information included in the multimedia information accessed in step 1402 is transcribed to generate a text transcript for the audio information. The text transcript represents the text information extracted in step 1404.

The text information determined in step 1404 comprises a collection of lines with each line comprising one or more words. Each word has a timestamp associated with it indicating the time of occurrence of the word in the multimedia information. The timestamp information for each word is included in the CC text information. Alternatively, if the text represents a transcription of audio information, the timestamp information for each word may be determined during the audio transcription process.

As part of step 1404, each line is assigned a start time and an end time based upon words that are included in the line. The start time for a line corresponds to the timestamp associated with the first word occurring in the line, and the end time for a line corresponds to the timestamp associated with the last word occurring in the line.

The text information determined in step 1404, including the timing information, is then stored in a memory location accessible to server 104 (step 1406). In one embodiment, a data structure (or memory structure) comprising a linked list of line objects is used to store the text information. Each line object comprises a linked list of words contained in the line. Timestamp information associated with the words and the lines is also stored in the data structure. The information stored in the data structure is then used to generate GUI 300.

Server 104 then determines a length or height (in pixels) of a panel (hereinafter referred to as "the text canvas") for drawing the text information (step 1408). In order to determine the length of the text canvas, the duration ("duration") of the multimedia information (or the duration of the multimedia document storing the multimedia document) in seconds is determined. A vertical pixels-per-second of time ("pps") value is also defined. The "pps" determines the distance between lines of text drawn in the text canvas. The value of pps thus depends on how close the user wants the lines of text to be to each other when displayed and upon the size of the font to be used for displaying the text. According to an embodiment of the present invention, a 5 pps value is specified with a 6 point font. The overall height (in pixels) of the text canvas ("textCanvasHeight") is determined as follows:

$$\text{textCanvasHeight} = \text{duration} \cdot \text{pps}$$

For example, if the duration of the multimedia information is 1 hour (i.e., 3600 seconds) and for a pps value of 5, the height of the text canvas (textCanvasHeight) is 18000 pixels (3600*5).

Multipliers are then calculated for converting pixel locations in the text canvas to seconds and for converting seconds to pixels locations in the text canvas (step 1410). A multiplier "pix_m" is calculated for converting a given time value (in seconds) to a particular vertical pixel location in the text canvas. The pix_m multiplier can be used to determine a pixel location in the text canvas corresponding to a particular time value. The value of pix_m is determined as follows:

$$\text{pix\_m} = \text{textCanvas Height}/\text{duration}$$

For example, if duration=3600 seconds and textCanvasHeight=18000 pixels, then pix_m=18000/3600=5.

A multiplier "sec_m" is calculated for converting a particular pixel location in the text canvas to a corresponding time value. The sec_m multiplier can be used to determine a time value for a particular pixel location in the text canvas. The value of sec_m is determined as follows:

$$\text{sec\_m} = \text{duration}/\text{textCanvasHeight}$$

For example, if duration=3600 seconds and textCanvasHeight=18000 pixels, then sec_m=3600/18000=0.2.

The multipliers calculated in step 1410 may then be used to convert pixels to seconds and seconds to pixels. For example, the pixel location in the text canvas of an event occurring at time t=1256 seconds in the multimedia information is: 1256*pix_m=1256*5=6280 pixels from the top of the text canvas. The number of seconds corresponding to a pixel location p=231 in the text canvas is: 231*sec_m=231*0.2=46.2 seconds.

Based upon the height of the text canvas determined in step 1408 and the multipliers generated in step 1410, positional coordinates (horizontal (X) and vertical (Y) coordinates) are then calculated for words in the text information extracted in step 1404 (step 1412). As previously stated, information related to words and lines and their associated timestamps may be stored in a data structure accessible to server 104. The positional coordinate values calculated for each word might also be stored in the data structure.

The Y (or vertical) coordinate ($W_y$) for a word is calculated by multiplying the timestamp ($W_t$) (in seconds) associated with the word by multiplier pix_m determined in step 1410. Accordingly:

$$W_y (\text{in pixels}) = W_t \cdot \text{pix\_m}$$

For example, if a particular word has $W_t$=539 seconds (i.e., the words occurs 539 seconds into the multimedia information), then $W_y$=539*5=2695 vertical pixels from the top of the text canvas.

The X (or horizontal) coordinate ($W_x$) for a word is calculated based upon the word's location in the line and the width of the previous words in the line. For example if a particular line (L) has four words, i.e., L: $W_1$ $W_2$ $W_3$ $W_4$, then $$W_x \text{ of } W_1 = 0$$

$$W_x \text{ of } W_2 = (W_x \text{ of } W_1) + (\text{Width of } W_1) + (\text{Spacing between words})$$

$$W_x \text{ of } W_3 = (W_x \text{ of } W_2) + (\text{Width of } W_2) + (\text{Spacing between words})$$

$$W_x \text{ of } W_4 = (W_x \text{ of } W_3) + (\text{Width of } W_3) + (\text{Spacing between words})$$

The words in the text information are then drawn on the text canvas in a location determined by the X and Y coordinates calculated for the words in step 1412 (step 1414).

Server 104 then determines a height of thumbnail 312-1 that displays text information in second viewing area 304 of GUI 300 (step 1416). The height of thumbnail 312-1 (ThumbnailHeight) depends on the height of the GUI window used to displaying the multimedia information and the height of second viewing area 304 within the GUI window. The value of ThumbnailHeight is set such that thumbnail 312-1 fits in the GUI in the second viewing area 304.

Thumbnail 312-1 is then generated by scaling the text canvas such that the height of thumbnail 312-1 is equal to ThumbnailHeight and the thumbnail fits entirely within the size constraints of second viewing area 304 (step 1418).

Thumbnail 312-1, which represents a scaled version of the text canvas, is then displayed in second viewing area 304 of GUI 300 (step 1420).

Multipliers are then calculated for converting pixel locations in thumbnail 312-1 to seconds and for converting seconds to pixel locations in thumbnail 312-1 (step 1422). A multiplier "tpix_m" is calculated for converting a given time value (in seconds) to a particular pixel location in thumbnail 312-1. Multiplier tpix_m can be used to determine a pixel location in the thumbnail corresponding to a particular time value. The value of tpix_m is determined as follows:

$$tpix\_m = ThumbnailHeight/duration$$

For example, if duration=3600 seconds and Thumbnail-Height=900, then tpix_m=900/3600=0.25

A multiplier "tsec_m" is calculated for converting a particular pixel location in thumbnail 312-1 to a corresponding time value. Multiplier tsec_m can be used to determine a time value for a particular pixel location in thumbnail 312-1. The value of tsec_m is determined as follows:

$$tsec\_m = duration/ThumbnailHeight$$

For example, if duration=3600 seconds and Thumbnail-Height=900, then tsec_m=3600/900=4.

Multipliers tpix_m and tsec_m may then be used to convert pixels to seconds and seconds to pixels in thumbnail 312-1. For example, the pixel location in thumbnail 312-1 of a word occurring at time t=1256 seconds in the multimedia information is: 1256*tpix_m=1256*0.25=314 pixels from the top of thumbnail 312-1. The number of seconds represented by a pixel location p=231 in thumbnail 312-1 is: 231*tsec_m=231*4=924 seconds.

Figure 15:
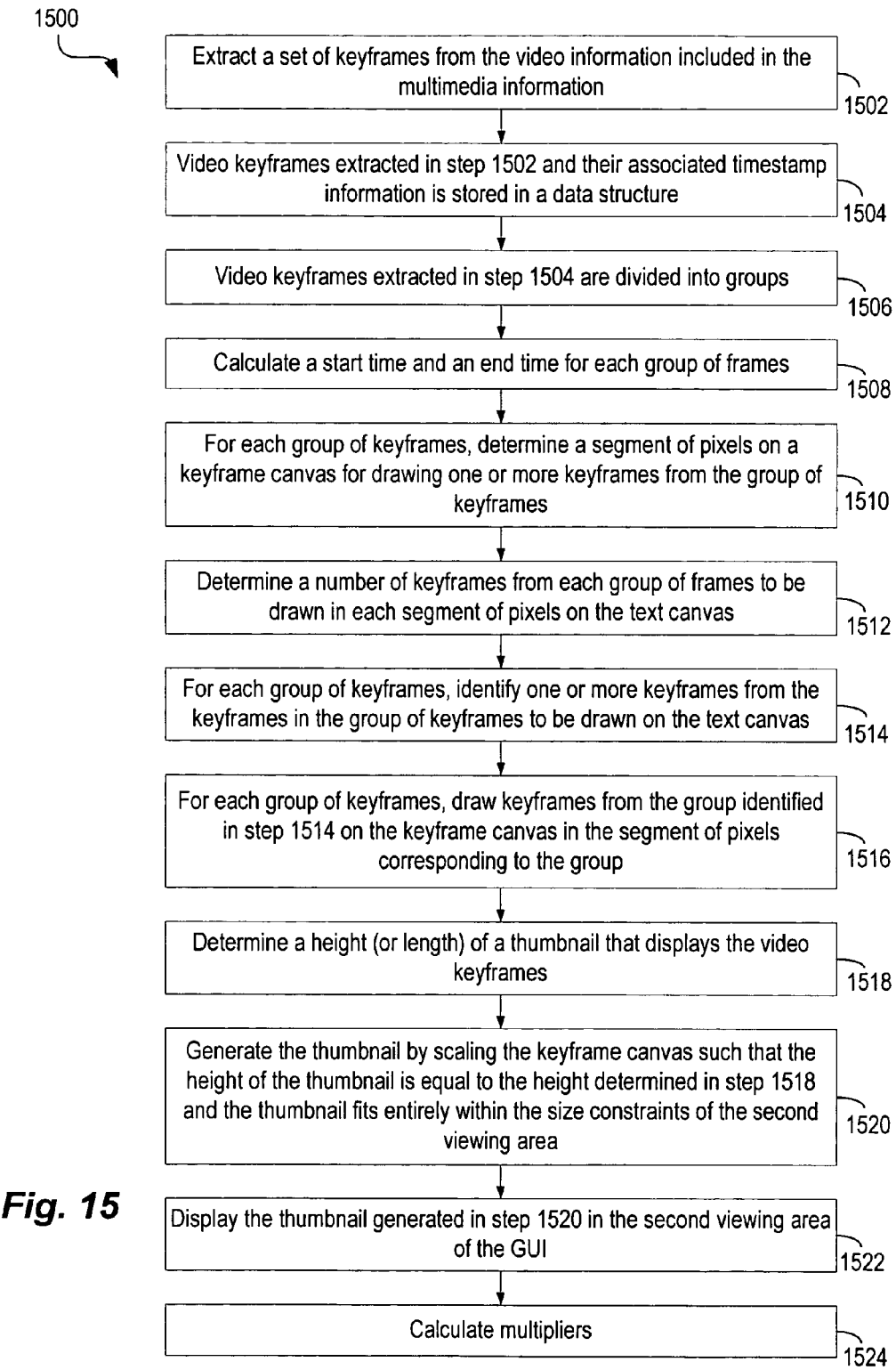
FIG. 15 is a simplified high-level flowchart depicting a method of displaying a thumbnail that depicts video keyframes extracted from the video information in the second viewing area of a GUI according to an embodiment of the present invention.

FIG. 15 is a simplified high-level flowchart 1500 depicting a method of displaying thumbnail 312-2, which depicts video keyframes extracted from the video information, in second viewing area 304 of GUI 300 according to an embodiment of the present invention. The method depicted in FIG. 15 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 15 is merely illustrative of an embodiment incorporating the present invention and does not limit the scope of the invention as recited in the claims. One of ordinary skill in the art would recognize other variations, modifications, and alternatives.

For purposes of simplicity, it is assumed that thumbnail 312-1 displaying text information has already been displayed according to the flowchart depicted in FIG. 14. As depicted in FIG. 15, server 104 extracts a set of keyframes from the video information included in the multimedia information (step 1502). The video keyframes may be extracted from the video information by sampling the video information at a particular sampling rate. According to an embodiment of the present invention, keyframes are extracted from the video information at a sampling rate of 1 frame per second. Accordingly, if the duration of the multimedia information is 1 hour (3600 seconds), then 3600 video keyframes are extracted from the video information in step 1502. A timestamp is associated with each keyframe extracted in step 1502 indicating the time of occurrence of the keyframe in the multimedia information.

The video keyframes extracted in step 1502 and their associated timestamp information is stored in a data structure (or memory structure) accessible to server 104 (step 1504). The information stored in the data structure is then used for generating thumbnail 312-2.

The video keyframes extracted in step 1504 are then divided into groups (step 1506). A user-configurable time period ("groupTime") is used to divide the keyframes into groups. According to an embodiment of the present invention, groupTime is set to 8 seconds. In this embodiment, each group comprises video keyframes extracted within an 8 second time period window. For example, if the duration of the multimedia information is 1 hour (3600 seconds) and 3600 video keyframes are extracted from the video information using a sampling rate of 1 frame per second, then if group-Time is set to 8 seconds, the 3600 keyframes will be divided into 450 groups, with each group comprising 8 video keyframes.

A start and an end time are calculated for each group of frames (step 1508). For a particular group of frames, the start time for the particular group is the timestamp associated with the first (i.e., the keyframe in the group with the earliest timestamp) video keyframe in the group, and the end time for the particular group is the timestamp associated with the last (i.e., the keyframe in the group with the latest timestamp) video keyframe in the group.

For each group of keyframes, server 104 determines a segment of pixels on a keyframe canvas for drawing one or more keyframes from the group of keyframes (step 1510). Similar to the text canvas, the keyframe canvas is a panel on which keyframes extracted from the video information are drawn. The height of the keyframe canvas ("keyframeCanvasHeight") is the same as the height of the text canvas ("textCanvasHeight") described above (i.e., keyframeCanvasHeight=textCanvasHeight). As a result, multipliers pix_m and sec_m (described above) may be used to convert a time value to a pixel location in the keyframe canvas and to convert a particular pixel location in the keyframe canvas to a time value.

The segment of pixels on the keyframe canvas for drawing keyframes from a particular group is calculated based upon the start time and end time associated with the particular group. The starting vertical (Y) pixel coordinate ("segmentStart") and the end vertical (Y) coordinate ("segmentEnd") of the segment of pixels in the keyframe canvas for a particular group of keyframes is calculated as follows:

$$segmentStart = (Start\ time\ of\ group)*pix\_m$$

$$segmentEnd = (End\ time\ of\ group)*pix\_m$$

Accordingly, the height of each segment ("segmentHeight") in pixels of the text canvas is:

$$segmentHeight = segmentEnd - segmentStart$$

The number of keyframes from each group of frames to be drawn in each segment of pixels on the text canvas is then determined (step 1512). The number of keyframes to be drawn on the keyframe canvas for a particular group depends on the height of the segment ("segmentHeight") corresponding to the particular group. If the value of segmentHeight is small only a small number of keyframes may be drawn in the segment such that the drawn keyframes are comprehensible to the user when displayed in the GUI. The value of segmentHeight depends on the value of pps. If pps is small, then segmentHeight will also be small. Accordingly, a larger value of pps may be selected if more keyframes are to be drawn per segment.

According to an embodiment of the present invention, if the segmentHeight is equal to 40 pixels and each group of keyframes comprises 8 keyframes, then 6 out of the 8 keyframes may be drawn in each segment on the text canvas. The number of keyframes to be drawn in a segment is generally the same for all groups of keyframes. for example, in the embodiment depicted in FIG. 3, six keyframes are drawn in each segment on the text canvas.

After determining the number of keyframes to be drawn in each segment of the text canvas, for each group of keyframes, server 104 identifies one or more keyframes from keyframes in the group of keyframes to be drawn on the keyframe canvas (step 1514). Various different techniques may be used for selecting the video keyframes to be displayed in a segment for a particular group of frames. According to one technique, if each group of video keyframes comprises 8 keyframes and if 6 video keyframes are to be displayed in each segment on the keyframe canvas, then server 104 may select the first two video keyframes, the middle two video keyframes, and the last two video keyframes from each group of video keyframes be drawn on the keyframe canvas. As described above, various other techniques may also be used to select one or more keyframes to displayed from the group of keyframes. For example, the keyframes may be selected based upon the sequential positions of the keyframes in the group of keyframes, based upon time values associated with the keyframes, or based upon other criteria.

According to another technique, server 104 may use special image processing techniques to determine similarity or dissimilarity between keyframes in each group of keyframes. If six video keyframes are to be displayed from each group, server 104 may then select six keyframes from each group of keyframes based upon the results of the image processing techniques. According to an embodiment of the present invention, the six most dissimilar keyframes in each group may be selected to be drawn on the keyframe canvas. It should be apparent that various other techniques known to those skilled in the art may also be used to perform the selection of video keyframes.

Keyframes from the groups of keyframes identified in step 1514 are then drawn on the keyframe canvas in their corresponding segments (step 1516). Various different formats may be used for drawing the selected keyframes in a particular segment. For example, as shown in FIG. 3, for each segment, the selected keyframes may be laid out left-to-right and top-to-bottom in rows of 3 frames. Various other formats known to those skilled in the art may also be used to draw the keyframes on the keyframe canvas. The size of each individual keyframe drawn on the keyframe canvas depends on the height (segmentHeight) of the segment in which the keyframe is drawn and the number of keyframes to be drawn in the segment. As previously stated, the height of a segment depends on the value of pps. Accordingly, the size of each individual keyframe drawn on the keyframe canvas also depends on the value of pps.

Server 104 then determines a height (or length) of thumbnail 312-2 that displays the video keyframes in GUI 300 (step 1518). According to the teachings of the present invention, the height of thumbnail 312-2 is set to be the same as the height of thumbnail 312-1 that displays text information (i.e., the height of thumbnail 312-2 is set to ThumbnailHeight).

Thumbnail 312-2 is then generated by scaling the keyframe canvas such that the height of thumbnail 312-2 is equal to ThumbnailHeight and thumbnail 312-2 fits entirely within the size constraints of second viewing area 304 (step 1520). Thumbnail 312-2, which represents a scaled version of the keyframe canvas, is then displayed in second viewing area 304 of GUI 300 (step 1522). Thumbnail 312-2 is displayed in GUI 300 next to thumbnail image 312-1 and is temporally aligned or synchronized with thumbnail 312-1 (as shown in FIG. 3). Accordingly, the top of thumbnail 312-2 is aligned with the top of thumbnail 312-1.

Multipliers are calculated for thumbnail 312-2 for converting pixel locations in thumbnail 312-2 to seconds and for converting seconds to pixel locations in thumbnail 312-2 (step 1524). Since thumbnail 312-2 is the same length as thumbnail 312-1 and is aligned with thumbnail 312-1, multipliers "tpix_m" and "tsec_m" calculated for thumbnail 312-1 can also be used for thumbnail 312-2. These multipliers may then be used to convert pixels to seconds and seconds to pixels in thumbnail 312-2.

According to the method displayed in FIG. 15, the size of each individual video keyframe displayed in thumbnail 312-2 depends, in addition to other criteria, on the length of thumbnail 312-2 and on the length of the video information. Assuming that the length of thumbnail 312-2 is fixed, then the height of each individual video keyframe displayed in thumbnail 312-2 is inversely proportional to the length of the video information. Accordingly, as the length of the video information increases, the size of each keyframe displayed in thumbnail 312-2 decreases. As a result, for longer multimedia documents, the size of each keyframe may become so small that the video keyframes displayed in thumbnail 312-2 are no longer recognizable by the user. To avoid this, various techniques may be used to display the video keyframes in thumbnail 312-2 in a manner that makes thumbnail 312-2 more readable and recognizable by the user.

Figure 16:
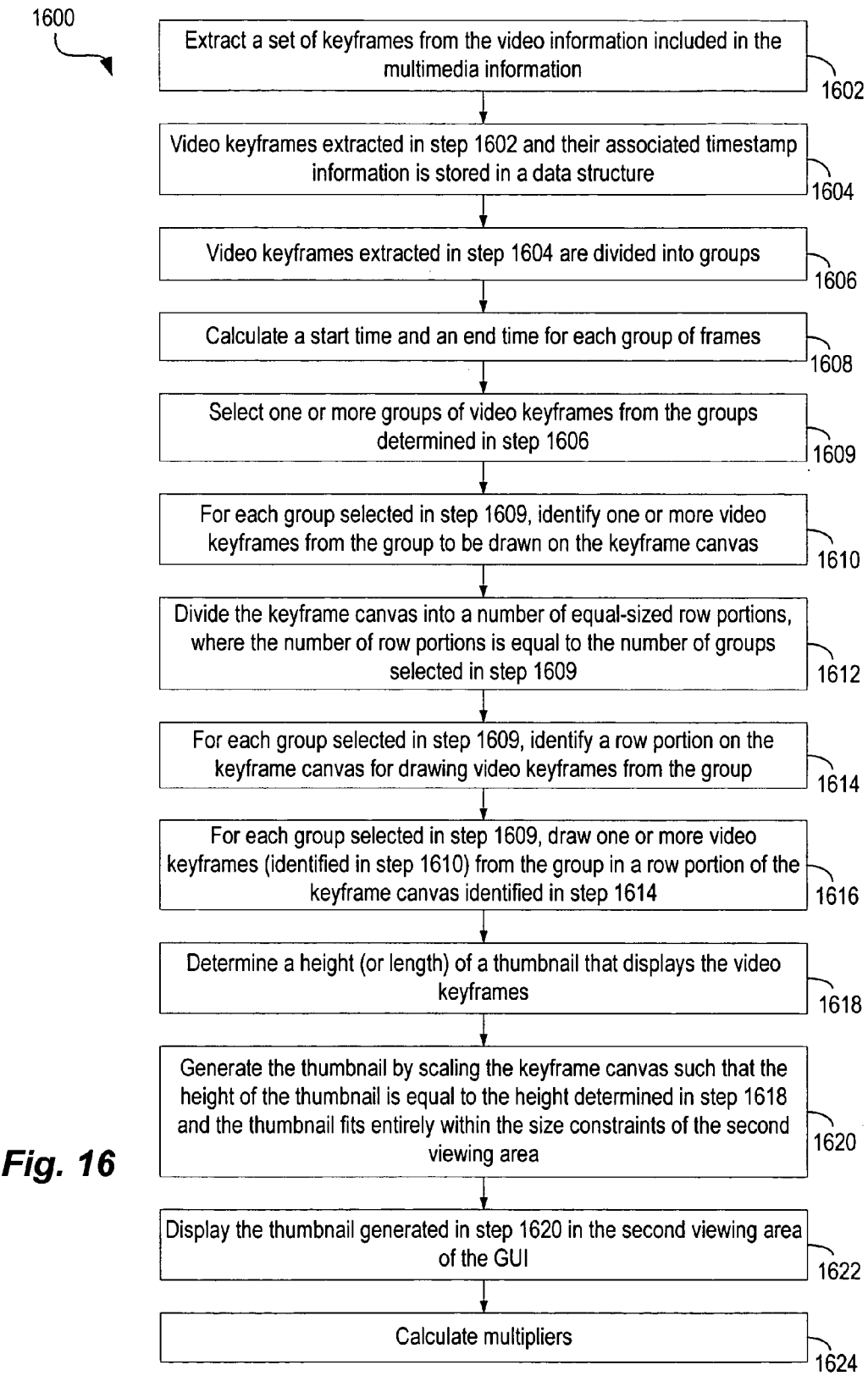
FIG. 16 is a simplified high-level flowchart depicting another method of displaying thumbnail 312-2 according to an embodiment of the present invention.

FIG. 16 is a simplified high-level flowchart 1600 depicting another method of displaying thumbnail 312-2 according to an embodiment of the present invention. The method depicted in FIG. 16 maintains the comprehensibility and usability of the information displayed in thumbnail 312-2 by reducing the number of video keyframes drawn in the keyframe canvas and displayed in thumbnail 312-2. The method depicted in FIG. 16 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 16 is merely illustrative of an embodiment incorporating the present invention and does not limit the scope of the invention as recited in the claims. One of ordinary skill in the art would recognize other variations, modifications, and alternatives.

As depicted in FIG. 16, steps 1602, 1604, 1606, and 1608 are the same as steps 1502, 1504, 1506, and 1508, depicted in FIG. 15 and explained above. After step 1608, one or more groups whose video keyframes are to be drawn in the keyframe canvas are then selected from the groups determined in step 1606 (step 1609). Various different techniques may be used to select the groups in step 1609. According to one technique, the groups determined in step 1606 are selected based upon a "SkipCount" value that is user-configurable. For example, if SkipCount is set to 4, then every fifth group (i.e., 4 groups are skipped) is selected in step 1609. The value of SkipCount may be adjusted based upon the length of the multimedia information. According to an embodiment of the present invention, the value of SkipCount is directly proportional to the length of the multimedia information, i.e., SkipCount is set to a higher value for longer multimedia documents.

For each group selected in step 1609, server 104 identifies one or more keyframes from the group to be drawn on the keyframe canvas (step 1610). As described above, various techniques may be used to select keyframes to be drawn on the keyframe canvas.

The keyframe canvas is then divided into a number of equal-sized row portions, where the number of row portions is equal to the number of groups selected in step 1609 (step 1612). According to an embodiment of the present invention, the height of each row portion is approximately equal to the height of the keyframe canvas ("keyframeCanvasHeight") divided by the number of groups selected in step 1609.

For each group selected in step 1609, a row portion of the keyframe canvas is then identified for drawing one or more video keyframes from the group (step 1614). According to an embodiment of the present invention, row portions are associated with groups in chronological order. For example, the first row is associated with a group with the earliest start time, the second row is associated with a group with the second earliest start time, and so on.

For each group selected in step 1609, one or more keyframes from the group (identified in step 1610) are then drawn on the keyframe canvas in the row portion determined for the group in step 1614 (step 1616). The sizes of the selected keyframes for each group are scaled to fit the row portion of the keyframe canvas. According to an embodiment of the present invention, the height of each row portion is more than the heights of the selected keyframes, and height of the selected keyframes is increased to fit the row portion. This increases the size of the selected keyframes and makes them more visible when drawn on the keyframe canvas. In this manner, keyframes from the groups selected in step 1609 are drawn on the keyframe canvas.

The keyframe canvas is then scaled to form thumbnail 312-2 that is displayed in second viewing area 304 according to steps 1618, 1620, and 1622. Since the height of the keyframes drawn on the keyframe canvas is increased according to an embodiment of the present invention, as described above, the keyframes are also more recognizable when displayed in thumbnail 312-2. Multipliers are then calculated according to step 1624. Steps 1618, 1620, 1622, and 1624 are similar to steps 1518, 1520, 1522, and 1524, depicted in FIG. 15 and explained above. As described above, by selecting a subset of the groups, the number of keyframes to be drawn on the keyframe canvas and displayed in thumbnail 312-2 is reduced. This is turn increases the height of each individual video keyframe displayed in thumbnail 312-2 thus making them more recognizable when displayed.

Figure 17:
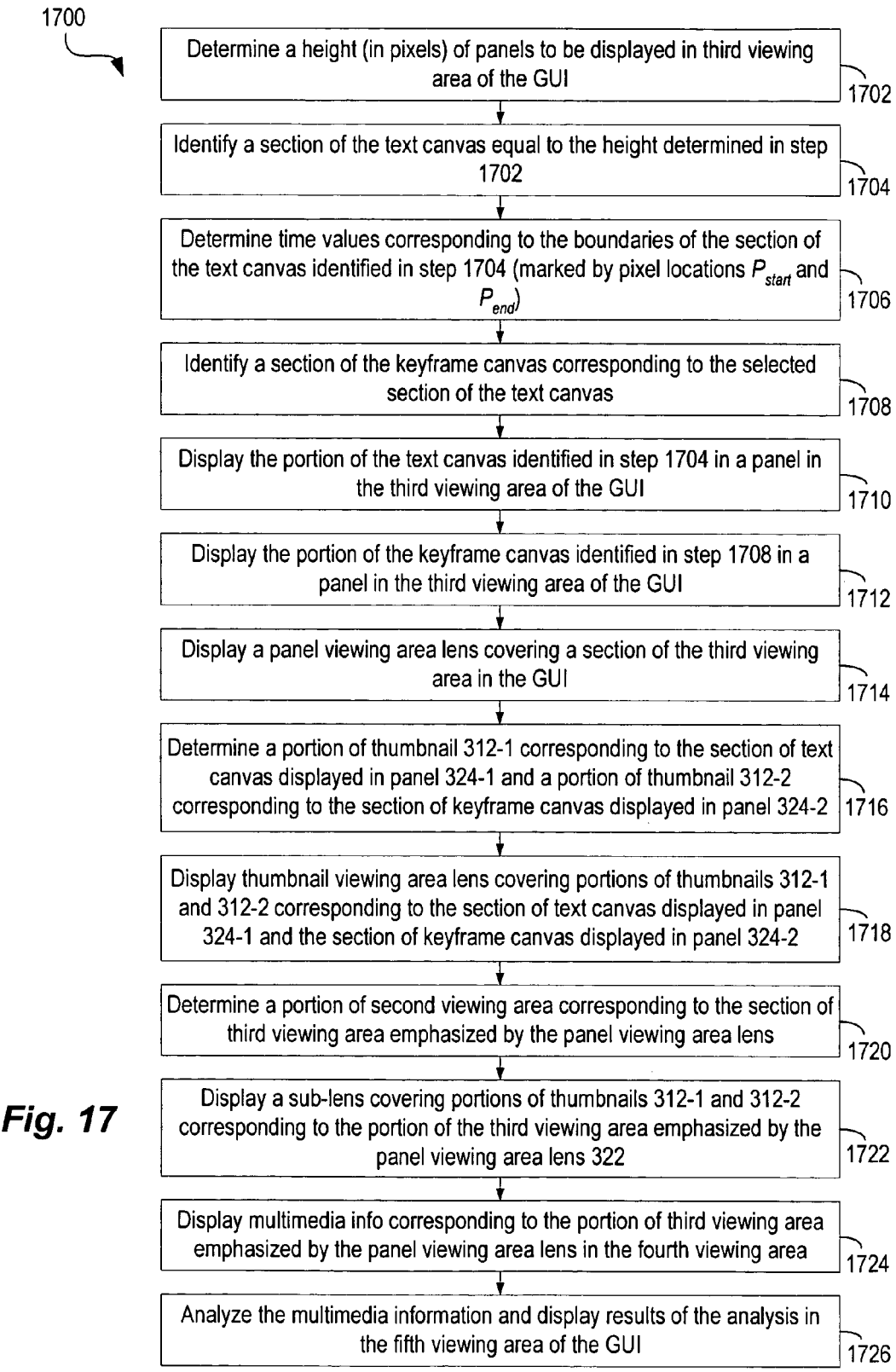
FIG. 17 is a simplified high-level flowchart depicting a method of displaying thumbnail viewing area lens 314, displaying information emphasized by thumbnail viewing area lens 314 in third viewing area 306, displaying panel viewing area lens 322, displaying information emphasized by panel viewing area lens 322 in fourth viewing area 308, and displaying information in fifth viewing area 310 according to an embodiment of the present invention.

FIG. 17 is a simplified high-level flowchart 1700 depicting a method of displaying thumbnail viewing area lens 314, displaying information emphasized by thumbnail viewing area lens 314 in third viewing area 306, displaying panel viewing area lens 322, displaying information emphasized by panel viewing area lens 322 in fourth viewing area 308, and displaying information in fifth viewing area 310 according to an embodiment of the present invention. The method depicted in FIG. 17 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 17 is merely illustrative of an embodiment incorporating the present invention and does not limit the scope of the invention as recited in the claims. One of ordinary skill in the art would recognize other variations, modifications, and alternatives.

As depicted in FIG. 17, server 104 first determines a height (in pixels) of each panel ("PanelHeight") to be displayed in third viewing area 306 of GUI 300 (step 1702). The value of PanelHeight depends on the height (or length) of third viewing area 306. Since the panels are to be aligned to each other, the height of each panel is set to PanelHeight. According to an embodiment of the present invention, PanelHeight is set to the same value as ThumbnailHeight. However, in alternative embodiments of the present invention, the value of PanelHeight may be different from the value of ThumbnailHeight.

A section of the text canvas (generated in the flowchart depicted in FIG. 14) equal to PanelHeight is then identified (step 1704). The section of the text canvas identified in step 1704 is characterized by vertical pixel coordinate ($P_{start}$) marking the starting pixel location of the section, and a vertical pixel coordinate ($P_{end}$) marking the ending pixel location of the section.

Time values corresponding to the boundaries of the section of the text canvas identified in step 1704 (marked by pixel locations $P_{start}$ and $P_{end}$) are then determined (step 1706). The multiplier sec_m is used to calculate the corresponding time values. A time $t_1$ (in seconds) corresponding to pixel location $P_{start}$ is calculated as follows:

$$t_1 = P_{start} * \text{sec\_m}$$

A time $t_2$ (in seconds) corresponding to pixel location $P_{end}$ is calculated as follows:

$$t_2 = P_{end} * \text{sec\_m}$$

A section of the keyframe canvas corresponding to the selected section of the text canvas is then identified (step 1708). Since the height of the keyframe canvas is the same as the height of the keyframe canvas, the selected section of the keyframe canvas also lies between pixels locations $P_{start}$ and $P_{end}$ in the keyframe canvas corresponding to times $t_1$ and $t_2$.

The portion of the text canvas identified in step 1704 is displayed in panel 324-1 in third viewing area 306 (step 1710). The portion of the keyframe canvas identified in step 1708 is displayed in panel 324-2 in third viewing area 306 (step 1712).

A panel viewing area lens 322 is displayed covering a section of third viewing area 306 (step 1714). Panel viewing area lens 322 is displayed such that it emphasizes or covers a section of panel 324-1 panel and 324-2 displayed in third viewing area 306 between times $t_3$ and $t_4$ where ($t_1 \leq t_3 < t_4 \leq t_2$). The top edge of panel viewing area lens 322 corresponds to time $t_3$ and the bottom edge of panel viewing area lens 322 corresponds to time $t_4$. The height of panel viewing area lens 322 (expressed in pixels) is equal to: (Vertical pixel location in the text canvas corresponding to $t_4$)−(Vertical pixel location in the text canvas corresponding to $t_3$). The width of panel viewing area lens 322 is approximately equal to the width of third viewing area 306 (as shown in FIG. 3).

A portion of thumbnail 312-1 corresponding to the section of text canvas displayed in panel 324-1 and a portion of thumbnail 312-2 corresponding to the section of keyframe canvas displayed in panel 324-2 are then determined (step 1716). The portion of thumbnail 312-1 corresponding to the section of the text canvas displayed in panel 324-1 is characterized by vertical pixel coordinate ($TN_{start}$) marking the starting pixel location of the thumbnail portion, and a vertical pixel coordinate ($TN_{end}$) marking the ending pixel location of the thumbnail portion. The multiplier tpix_m is used to determine pixel locations $TN_{start}$ and $TN_{end}$ as follows:

$$TN_{start} = t_1 * \text{tpix\_m}$$

$$TN_{end} = t_2 * \text{tpix\_m}$$

Since thumbnails 312-1 and 312-2 are of the same length and are temporally aligned to one another, the portion of thumbnail 312-2 corresponding to the sections of keyframe canvas displayed in panel 324-2 also lies between pixel locations $TN_{start}$ and $TN_{end}$ on thumbnail 312-2.

Thumbnail viewing area lens 314 is then displayed covering portions of thumbnails 312-1 and 312-2 corresponding to the section of text canvas displayed in panel 324-1 and the section of keyframe canvas displayed in panel 324-2 (step 1718). Thumbnail viewing area lens 314 is displayed covering portions of thumbnails 312-1 and 312-2 between pixels locations $TN_{start}$ and $TN_{end}$ of the thumbnails. The height of thumbnail viewing area lens 314 in pixels is equal to ($TN_{end}$–$TN_{start}$). The width of thumbnail viewing area lens 314 is approximately equal to the width of second viewing area 304 (as shown in FIG. 3).

A portion of second viewing area 304 corresponding to the section of third viewing area 306 emphasized by panel viewing area lens 322 is then determined (step 1720). In step 1720, server 104 determines a portion of thumbnail 312-1 and a portion of thumbnail 312-2 corresponding to the time period between $t_3$ and $t_4$. The portion of thumbnail 312-1 corresponding to the time window between $t_3$ and $t_4$ is characterized by vertical pixel coordinate ($TNSub_{start}$) corresponding to time $t_3$ and marking the starting vertical pixel of the thumbnail portion, and a vertical pixel coordinate ($TNSub_{end}$) corresponding to time $t_4$ and marking the ending vertical pixel location of the thumbnail portion. Multiplier tpix_m is used to determine pixel locations $TNSub_{start}$ and $TNSub_{end}$ as follows:

$$TNSub_{start} = t_3 * tpix\_m$$

$$TNSub_{end} = t_4 * tpix\_m$$

Since thumbnails 312-1 and 312-2 are of the same length and are temporally aligned to one another, the portion of thumbnail 312-2 corresponding to the time period between $t_3$ and $t_4$ also lies between pixel locations $TNSub_{start}$ and $TNSub_{end}$ on thumbnail 312-2.

Sub-lens 316 is then displayed covering portions of thumbnails 312-1 and 312-2 corresponding to the time window between $t_3$ and $t_4$ (i.e., corresponding to the portion of third viewing area 306 emphasized by panel viewing area lens 322) (step 1722). Sub-lens 316 is displayed covering portions of thumbnails 312-1 and 312-2 between pixels locations $TNSub_{start}$ and $TNSub_{end}$. The height of sub-lens 316 in pixels is equal to ($TNSub_{end}$–$TNSub_{start}$). The width of sub-lens 316 is approximately equal to the width of second viewing area 304 (as shown in FIG. 3).

Multimedia information corresponding to the portion of third viewing area 306 emphasized by panel viewing area lens 322 is displayed in fourth viewing area 308 (step 1724). For example, video information starting at time $t_3$ is played back in area 340-1 of fourth viewing area 308 in GUI 300. In alternative embodiments, the starting time of the video playback may be set to any time between and including $t_3$ and $t_4$. Text information corresponding to the time window between $t_3$ and $t_4$ is displayed in area 340-2 of fourth viewing area 308.

The multimedia information may then be analyzed and the results of the analysis are displayed in fifth viewing area 310 (step 1726). For example, the text information extracted from the multimedia information may be analyzed to identify words that occur in the text information and the frequency of individual words. The words and their frequency may be printed in fifth viewing area 310 (e.g., information printed in area 352 of fifth viewing area 310 as shown in FIG. 3). As previously described, information extracted from the multimedia information may be stored in data structures accessible to server 104. For example, text information and video keyframes information extracted from the multimedia information may be stored in one or more data structures accessible to server 104. Server 104 may use the information stored in these data structures to analyze the multimedia information.

Multimedia Information Navigation

As previously described, a user of the present invention may navigate and scroll through the multimedia information stored by a multimedia document and displayed in GUI 300 using thumbnail viewing area lens 314 and panel viewing area lens 322. For example, the user can change the location of thumbnail viewing area lens 314 by moving thumbnail viewing area lens 314 along the length of second viewing area 304. In response to a change in the position of thumbnail viewing area lens 314 from a first location in second viewing area 304 to a second location along second viewing area 304, the multimedia information displayed in third viewing area 306 is automatically updated such that the multimedia information displayed in third viewing area 306 continues to correspond to the area of second viewing area 304 emphasized by thumbnail viewing area lens 314 in the second location.

Likewise, the user can change the location of panel viewing area lens 322 by moving panel viewing area lens 322 along the length of third viewing area 306. In response to a change in the location of panel viewing area lens 322, the position of sub-lens 316 and also possibly thumbnail viewing area lens 314 are updated to continue to correspond to new location of panel viewing area lens 322. The information displayed in fourth viewing area 308 is also updated to correspond to the new location of panel viewing area lens 322.

Figure 18:
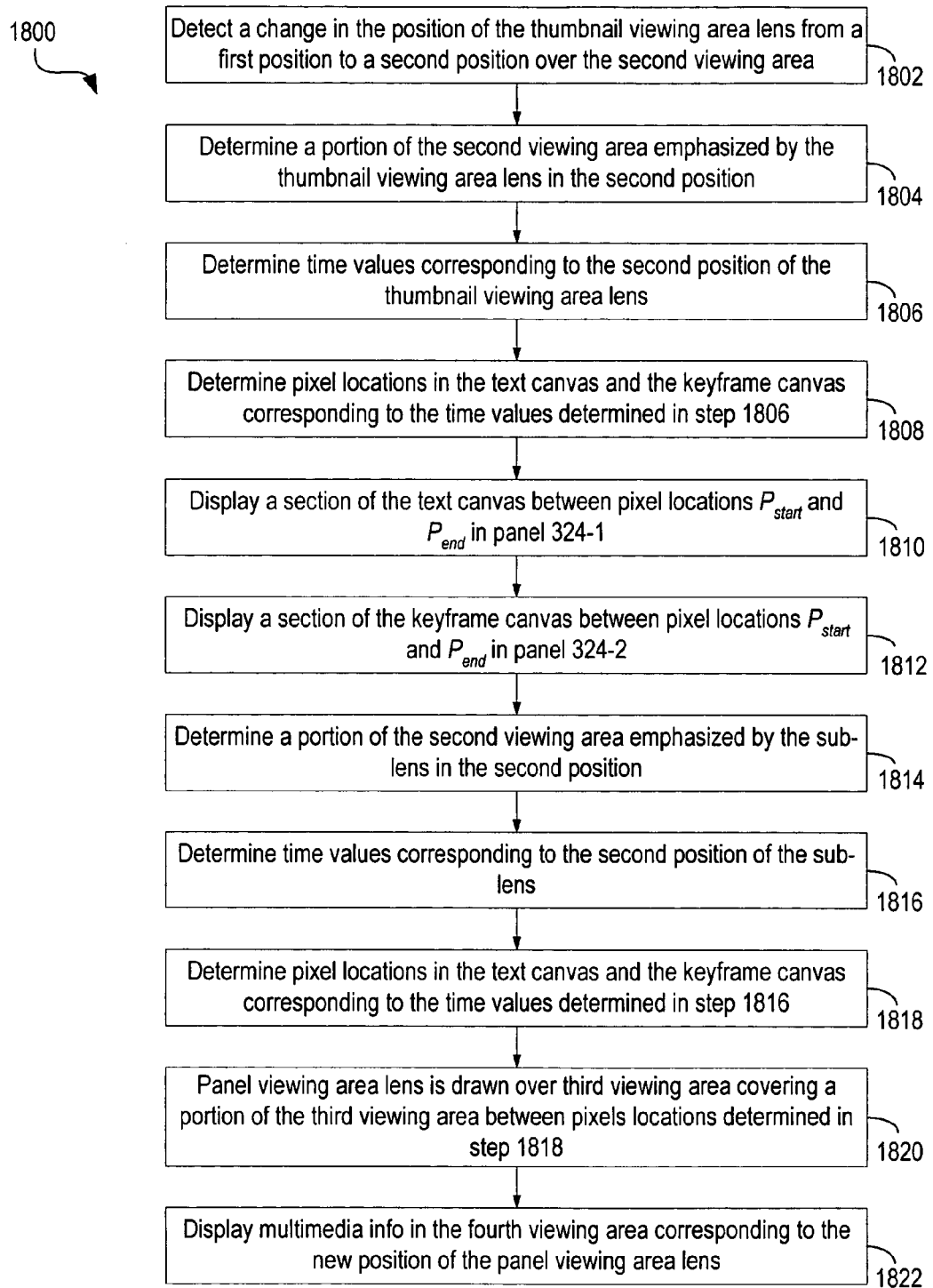
FIG. 18 is a simplified high-level flowchart depicting a method of automatically updating the information displayed in third viewing area 306 in response to a change in the location of thumbnail viewing area lens 314 according to an embodiment of the present invention.

FIG. 18 is a simplified high-level flowchart 1800 depicting a method of automatically updating the information displayed in third viewing area 306 in response to a change in the location of thumbnail viewing area lens 314 according to an embodiment of the present invention. The method depicted in FIG. 18 performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 18 is merely illustrative of an embodiment incorporating the present invention and does not limit the scope of the invention as recited in the claims. One of ordinary skill in the art would recognize other variations, modifications, and alternatives.

As depicted in FIG. 18, the method is initiated when server 104 detects a change in the position of thumbnail viewing area lens 314 from a first position to a second position over second viewing area 304 (step 1802). Server 104 then determines a portion of second viewing area 304 emphasized by thumbnail viewing area lens 314 in the second position (step 1804). As part of step 1804, server 104 determines pixel locations ($TN_{start}$ and $TN_{End}$) in thumbnail 312-1 corresponding to the edges of thumbnail viewing area lens 314 in the second position. $TN_{start}$ marks the starting vertical pixel location in thumbnail 312-1, and $TN_{end}$ marks the ending pixel location in thumbnail 312-1. Since thumbnails 312-1 and 312-2 are of the same length and are temporally aligned to one another, the portion of thumbnail 312-2 corresponding to second position of thumbnail viewing area lens 314 also lies between pixel locations $TN_{start}$ and $TN_{end}$.

Server 104 then determines time values corresponding to the second position of thumbnail viewing area lens 314 (step 1806). A time value $t_1$ is determined corresponding to pixel location $TN_{start}$ and a time value $t_2$ is determined corresponding to pixel location $TN_{end}$. The multiplier tsec_m is used to determine the time values as follows:

$$t_1 = TN_{start} * tsec\_m$$

$$t_2 = TN_{end} * tsec\_m$$

Server 104 then determines pixel locations in the text canvas and the keyframe canvas corresponding to the time values determined in step 1806 (step 1808). A pixel location $P_{start}$ in the text canvas is calculated based upon time $t_1$, and a pixel location $P_{end}$ in the text canvas is calculated based upon time $t_2$. The multiplier pix_m is used to determine the locations as follows:

$$P_{start}=t_1*\text{pix}\_m$$

$$P_{end}=t_2*\text{pix}\_m$$

Since the text canvas and the keyframe canvas are of the same length, time values $t_1$ and $t_2$ correspond to pixel locations $P_{start}$ and $P_{end}$ in the keyframe canvas.

A section of the text canvas between pixel locations $P_{start}$ and $P_{end}$ is displayed in panel 324-1 (step 1810). The section of the text canvas displayed in panel 324-1 corresponds to the portion of thumbnail 312-1 emphasized by thumbnail viewing area lens 314 in the second position.

A section of the keyframe canvas between pixel locations $P_{start}$ and $P_{end}$ is displayed in panel 324-2 (step 1812). The section of the keyframe canvas displayed in panel 324-2 corresponds to the portion of thumbnail 312-2 emphasized by thumbnail viewing area lens 314 in the second position.

When thumbnail viewing area lens 314 is moved from the first position to the second position, sub-lens 316 also moves along with thumbnail viewing area lens 314. Server 104 then determines a portion of second viewing area 304 emphasized by sub-lens 316 in the second position (step 1814). As part of step 1814, server 104 determines pixel locations (TNSub$_{start}$ and TNSub$_{End}$) in thumbnail 312-1 corresponding to the edges of sub-lens 316 in the second position. TNSub$_{start}$ marks the starting vertical pixel location in thumbnail 312-1, and TNSub$_{end}$ marks the ending vertical pixel location of sub-lens 316 in thumbnail 312-1. Since thumbnails 312-1 and 312-2 are of the same length and are temporally aligned to one another, the portion of thumbnail 312-2 corresponding to second position of sub-lens 316 also lies between pixel locations TNSub$_{start}$ and TNSub$_{end}$.

Server 104 then determines time values corresponding to the second position of sub-lens 316 (step 1816). A time value $t_3$ is determined corresponding to pixel location TNSub$_{start}$ and a time value $t_4$ is determined corresponding to pixel location TNSub$_{end}$. The multiplier tsec_m is used to determine the time values as follows:

$$t_3 = TN\text{Sub}_{start}*\text{tsec}\_m$$

$$t_4 = TN\text{Sub}_{end}*\text{tsec}\_m$$

Server 104 then determines pixel locations in the text canvas and the keyframe canvas corresponding to the time values determined in step 1816 (step 1818). A pixel location PSub$_{start}$ in the text canvas is calculated based upon time $t_3$, and a pixel location PSub$_{end}$ in the text canvas is calculated based upon time $t_4$. The multiplier pix_m is used to determine the locations as follows:

$$P\text{Sub}_{start}=t_3*\text{pix}\_m$$

$$P\text{Sub}_{end}=t_4*\text{pix}\_m$$

Since the text canvas and the keyframe canvas are of the same length, time values $t_1$ and $t_2$ correspond to pixel locations PSub$_{start}$ and PSub$_{end}$ in the keyframe canvas.

Panel viewing area lens 322 is drawn over third viewing area 306 covering a portion of third viewing area 306 between pixels location PSub$_{start}$ and PSub$_{end}$ (step 1820). The multimedia information displayed in fourth viewing area 308 is then updated to correspond to the new position of panel viewing area lens 322 (step 1822).

Figure 19:
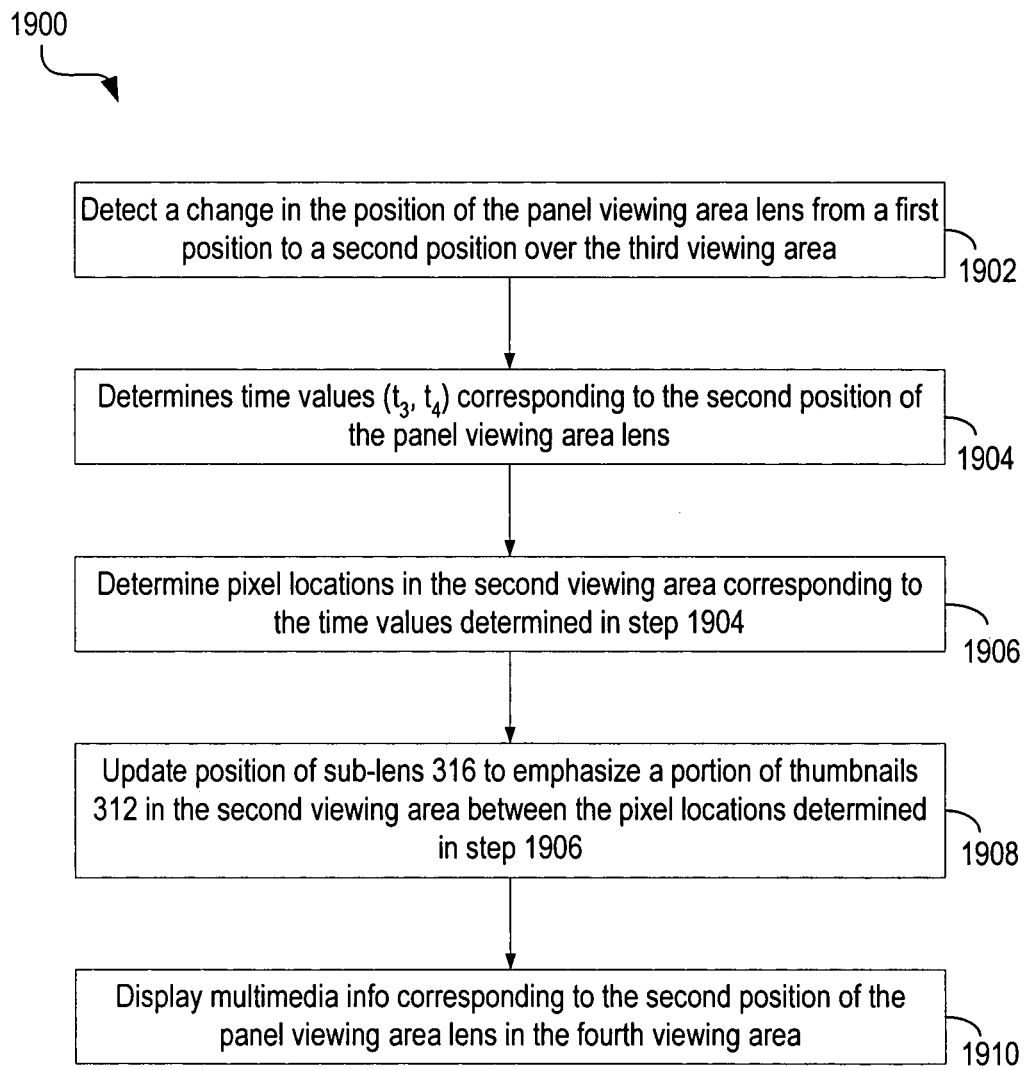
FIG. 19 is a simplified high-level flowchart depicting a method of automatically updating the information displayed in fourth viewing area 308 and the positions of thumbnail viewing area lens 314 and sub-lens 316 in response to a change in the location of panel viewing area lens 322 according to an embodiment of the present invention.

FIG. 19 is a simplified high-level flowchart 1900 depicting a method of automatically updating the information displayed in fourth viewing area 308 and the positions of thumbnail viewing area lens 314 and sub-lens 316 in response to a change in the location of panel viewing area lens 322 according to an embodiment of the present invention. The method depicted in FIG. 19 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 19 is merely illustrative of an embodiment incorporating the present invention and does not limit the scope of the invention as recited in the claims. One of ordinary skill in the art would recognize other variations, modifications, and alternatives.

As depicted in FIG. 19, the method is initiated when server 104 detects a change in the position of panel viewing area lens 322 from a first position to a second position over third viewing area 306 (step 1902). Server 104 then determines time values corresponding to the second position of panel viewing area lens 322 (step 1904). In step 1904, server 104 determines the pixel locations of the top and bottom edges of panel viewing area lens 322 in the second position. Multiplier sec_m is then used to covert the pixel locations to time values. A time value $t_3$ is determined corresponding to top edge of panel viewing area lens 322 in the second position, and a time value $t_4$ is determined corresponding to bottom edge of panel viewing area lens 322.

$$t_3=\text{(Pixel location of top edge of panel viewing area lens 322)}*\text{sec}\_m$$

$$t_4=\text{(Pixel location of bottom edge of panel viewing area lens 322)}*\text{sec}\_m$$

Server 104 then determines pixel locations in second viewing area 304 corresponding to the time values determined in step 1904 (step 1906). A pixel location TNSub$_{start}$ in a thumbnail (either 312-1 or 312-2 since they aligned and of the same length) in second viewing area 304 is calculated based upon time $t_3$, and a pixel location TNSub$_{end}$ in the thumbnail is calculated based upon time $t_4$. The multiplier tpix_m is used to determine the locations as follows:

$$TN\text{Sub}_{start}=t_3*\text{tpix}\_m$$

$$TN\text{Sub}_{end}=t_4*\text{tpix}\_m$$

Sub-lens 316 is then updated to emphasize a portion of thumbnails 312 in second viewing area 304 between pixel locations determined in step 1906 (step 1908). As part of step 1908, the position of thumbnail viewing area lens 314 may also be updated if pixels positions TNSUb$_{start}$ or TNSub$_{end}$ lie beyond the boundaries of thumbnail viewing area lens 314 when panel viewing area lens 322 was in the first position. For example, if a user uses panel viewing area lens 322 to scroll third viewing area 306 beyond the PanelHeight, then the position of thumbnail viewing area lens 314 is updated accordingly. If the second position of panel viewing area lens 322 lies within PanelHeight, then only sub-lens 316 is moved to correspond to the second position of panel viewing area lens 322 and thumbnail viewing area lens 314 is not moved.

As described above, panel viewing area lens 322 may be used to scroll the information displayed in third viewing area 306. For example, a user may move panel viewing area lens 322 to the bottom of third viewing area 306 and cause the contents of third viewing area 306 to be automatically scrolled upwards. Likewise, the user may move panel viewing area lens 322 to the top of third viewing area 306 and cause the contents of third viewing area 306 to be automatically scrolled downwards. The positions of thumbnail viewing area lens 314 and sub-lens 316 are updated as scrolling occurs.

Multimedia information corresponding to the second position of panel viewing area lens 322 is then displayed in fourth viewing area 308 (step 1910). For example, video information corresponding to the second position of panel viewing area lens 322 is displayed in area 340-1 of fourth viewing area 308 and text information corresponding to the second position of panel viewing area lens 322 is displayed in area 340-2 of third viewing area 306.

According to an embodiment of the present invention, in step 1910, server 104 selects a time "t" having a value equal to either $t_3$ or $t_4$ or some time value between $t_3$ and $t_4$. Time "t" be referred to as the "location time". The location time may be user-configurable. According to an embodiment of the present invention, the location time is set to $t_4$. The location time is then used as the starting time for playing back video information in area 340-1 of fourth viewing area 308.

According to an embodiment of the present invention, GUI 300 may operate in two modes: a "full update" mode and a "partial update" mode. The user of the GUI may select the operation mode of the GUI.

When GUI 300 is operating in "full update" mode, the positions of thumbnail viewing area lens 314 and panel viewing area lens 322 are automatically updated to reflect the position of the video played back in area 340-1 of fourth viewing area 308. Accordingly, in "full update" mode, thumbnail viewing area lens 314 and panel viewing area lens 322 keep up or reflect the position of the video played in fourth viewing area 308. The video may be played forwards or backwards using the controls depicted in area 342 of fourth viewing area 308, and the positions of thumbnail viewing area lens 314 and panel viewing area lens 322 change accordingly. The multimedia information displayed in panels 324 in third viewing area 306 is also automatically updated (shifted upwards) to correspond to the position of thumbnail viewing area lens 314 and reflect the current position of the video.

When GUI 300 is operating in "partial update" mode, the positions of thumbnail viewing area lens 314 and panel viewing area lens 322 are not updated to reflect the position of the video played back in area 340-1 of fourth viewing area 308. In this mode, the positions of thumbnail viewing area lens 314 and panel viewing area lens 322 remain static as the video is played in area 340-1 of fourth viewing area 308. Since the position of thumbnail viewing area lens 314 does not change, the multimedia information displayed in third viewing area 306 is also not updated. In this mode, a "location pointer" be displayed in second viewing area 304 and third viewing area 306 to reflect the current position of the video played back in area 340-1 of fourth viewing area 308. The position of the location pointer is continuously updated to reflect the position of the video.

Ranges

According to an embodiment, the present invention provides techniques for selecting or specifying portions of the multimedia information displayed in the GUI. Each portion is referred to as a "range." A range may be manually specified by a user of the present invention or may alternatively be automatically selected by the present invention based upon range criteria provided by the user of the invention.

A range refers to a portion of the multimedia information between a start time ($R_S$) and an end time ($R_E$). Accordingly, each range is characterized by an $R_S$ and a $R_E$ that define the time boundaries of the range. A range comprises a portion of the multimedia information occurring between times $R_S$ and $R_E$ associated with the range.

FIG. 20A depicts a simplified user interface 2000 that displays ranges according to an embodiment of the present invention. It should be apparent that GUI 2000 depicted in FIG. 20A is merely illustrative of an embodiment incorporating the present invention and does not limit the scope of the invention as recited in the claims. One of ordinary skill in the art would recognize other variations, modifications, and alternatives.

As depicted in FIG. 20A, GUI 2000 provides various features (buttons, tabs, etc.) that may be used by the user to either manually specify one or more ranges or to configure GUI 2000 to automatically generate ranges. In the embodiment depicted in FIG. 20A, the user can manually specify a range by selecting "New" button 2002. After selecting button 2002, the user can specify a range by selecting a portion of a thumbnail displayed in second viewing area 2004. One or more ranges may be specified by selecting various portions of the thumbnail. For example, in FIG. 20A, six ranges 2006-1, 2006-2, 2006-3, 2006-4, 2006-5, and 2006-6 have been displayed. One or more of these ranges may be manually specified by the user by selecting or marking portions of thumbnail 2008-2. In FIG. 20A, each specified range is indicated by a bar displayed over thumbnail 2008-2. An identifier or label may also be associated with each range to uniquely identify the range. In FIG. 20A, each range is identified by a number associated with the range and displayed in the upper left corner of the range. The numbers act as labels for the ranges.

Each range specified by selecting a portion of thumbnail 2008-2 is bounded by a top edge ($R_{top}$) and a bottom edge ($R_{bottom}$). The $R_S$ and $R_E$ times for a range may be determined from the pixel locations of $R_{top}$ and $R_{bottom}$ as follows:

$$R_S = R_{top} * tsec\_m$$

$$R_E = R_{bottom} * tsec\_m$$

It should be apparent that various other techniques may also be used for specifying a range. For example, in alternative embodiments of the present invention, a user may specify a range by providing the start time ($R_S$) and end time ($R_E$) for the range.

In GUI 2000 depicted FIG. 20A, information related to the ranges displayed is GUI 2000 is displayed in area 2010. The information displayed for each range in area 2010 includes a label or identifier 2012 identifying the range, a start time ($R_S$) 2014 of the range, an end time ($R_E$) 2016 of the range, a time span 2018 of the range, and a set of video keyframes 2019 extracted from the portion of the multimedia information associated with the range. The time span for a ranges is calculated by determining the difference between the end time $R_E$ and the start time associated with the range (i.e., time span for a range=$R_E$−$R_S$). In the embodiment depicted in FIG. 20A, the first, last, and middle keyframe extracted from the multimedia information corresponding to each range are displayed. Various other techniques may also be used for selecting keyframes to be displayed for a range. The information depicted in FIG. 20A is not meant to limit the scope of the present invention. Various other types of information for a range may also be displayed in alternative embodiments of the present invention.

According to the teachings of the present invention, various operations may be performed on the ranges displayed in GUI 2000. A user can edit a range by changing the $R_S$ and $R_E$ times associated with the range. Editing a range may change the time span (i.e., the value of ($R_E$−$R_S$)) of the range. In GUI 2000 depicted in FIG. 20A, the user can modify or edit a displayed range by selecting "Edit" button 2020. After selecting "Edit" button 2020, the user can edit a particular range by dragging the top edge and/or the bottom edge of the bar representing the range. A change in the position of top edge modifies the start time ($R_S$) of the range, and a change in the position of the bottom edge modifies the end time ($R_E$) of the range.

Figure 20B:
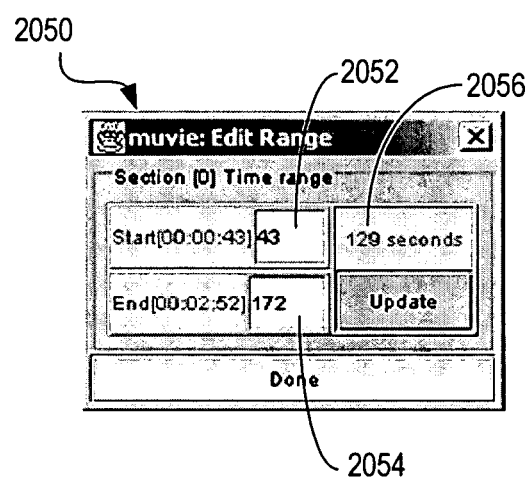
FIG. 20B depicts a simplified dialog box for editing ranges according to an embodiment of the present invention.

The user can also edit a range by selecting a range in area 2010 and then selecting "Edit" button 2020. In this scenario, selecting "Edit" button 2020 causes a dialog box to be displayed to the user (e.g., dialog box 2050 depicted in FIG. 20B). The user can then change the $R_S$ and $R_E$ values associated with the selected range by entering the values in fields 2052 and 2054, respectively. The time span of the selected range is displayed in area 2056 of the dialog box.

The user can also move the location of a displayed range by changing the position of the displayed range along thumbnail 2008-2. Moving a range changes the $R_S$ and $R_E$ values associated with the range but maintains the time span of the range. In GUI 2000, the user can move a range by first selecting "Move" button 2022 and then selecting and moving a range. As described above, the time span for a range may be edited by selecting "Edit" button and then dragging an edge of the bar representing the range.

The user can remove or delete a previously specified range. In GUI 2000 depicted in FIG. 20A, the user can delete a displayed range by selecting "Remove" button 2024 and then selecting the range that is to be deleted. Selection of "Clear" button 2026 deletes all the ranges that have been specified for the multimedia information displayed in GUI 2000.

As indicated above, each range refers to a portion of the multimedia information occurring between times $R_S$ and $R_E$ associated with the range. The multimedia information corresponding to a range may be output to the user by selecting "Play" button 2028. After selecting "Play" button 2028, the user may select a particular range displayed in GUI 2000 whose multimedia information is to be output to the user. The portion of the multimedia information corresponding to the selected range is then output to the user. Various different techniques known to those skilled in the art may be used to output the multimedia information to the user. According to an embodiment of the present invention, video information corresponding to multimedia information associated with a selected range is played back to the user in area 2030. Text information corresponding to the selected range may be displayed in area 2032. The positions of thumbnail viewing area lens 314 and panel viewing area lens 322, and the information displayed in third viewing area 306 are automatically updated to correspond to the selected range whose information is output to the user in area 2030.

The user can also select a range in area 2010 and then play information corresponding to the selected range by selecting "Play" button 2020. Multimedia information corresponding to the selected range is then displayed in area 2030.

The user may also instruct GUI 2000 to sequentially output information associated with all the ranges specified for the multimedia information displayed by GUI 2000 by selecting "Preview" button 2034. Upon selecting "Preview" button 2034, multimedia information corresponding to the displayed ranges is output to the user in sequential order. For example, if six ranges have been displayed as depicted in FIG. 20A, multimedia information corresponding to the range identified by label "1" be output first, followed by multimedia information corresponding to the range identified by label "2", followed by multimedia information corresponding to the range identified by label "3", and so on until multimedia information corresponding to all six ranges has been output to the user. The order in which the ranges are output to the user may be user-configurable.

Multimedia information associated with a range may also be saved to memory. For example, in the embodiment depicted in FIG. 20A, the user may select "Save" button 2036 and then select one or more ranges that are to be saved. Multimedia information corresponding to the ranges selected by the user to be saved is then saved to memory (e.g., a hard disk, a storage unit, a floppy disk, etc.)

Various other operations may also be performed on a range. For example, according to an embodiment of the present invention, multimedia information corresponding to one or more ranges may be printed on a paper medium. Details describing techniques for printing multimedia information on a paper medium are discussed in U.S. application Ser. No. 10/001,895, filed Nov. 19, 2001, the entire contents of which are herein incorporated by reference for all purposes.

Multimedia information associated with a range may also be communicated to a user-specified recipient. For example, a user may select a particular range and request communication of multimedia information corresponding to the range to a user-specified recipient. The multimedia information corresponding to the range is then communicated to the recipient. Various different communication techniques known to those skilled in the art may be used to communicate the range information to the recipient including faxing, electronic mail, wireless communication, and other communication techniques.

Multimedia information corresponding to a range may also be provided as input to another application program such as a search program, a browser, a graphics application, a MIDI application, or the like. The user may select a particular range and then identify an application to which the information is to be provided. In response to the user's selection, multimedia information corresponding to the range is then provided as input to the application.

Figure 21:
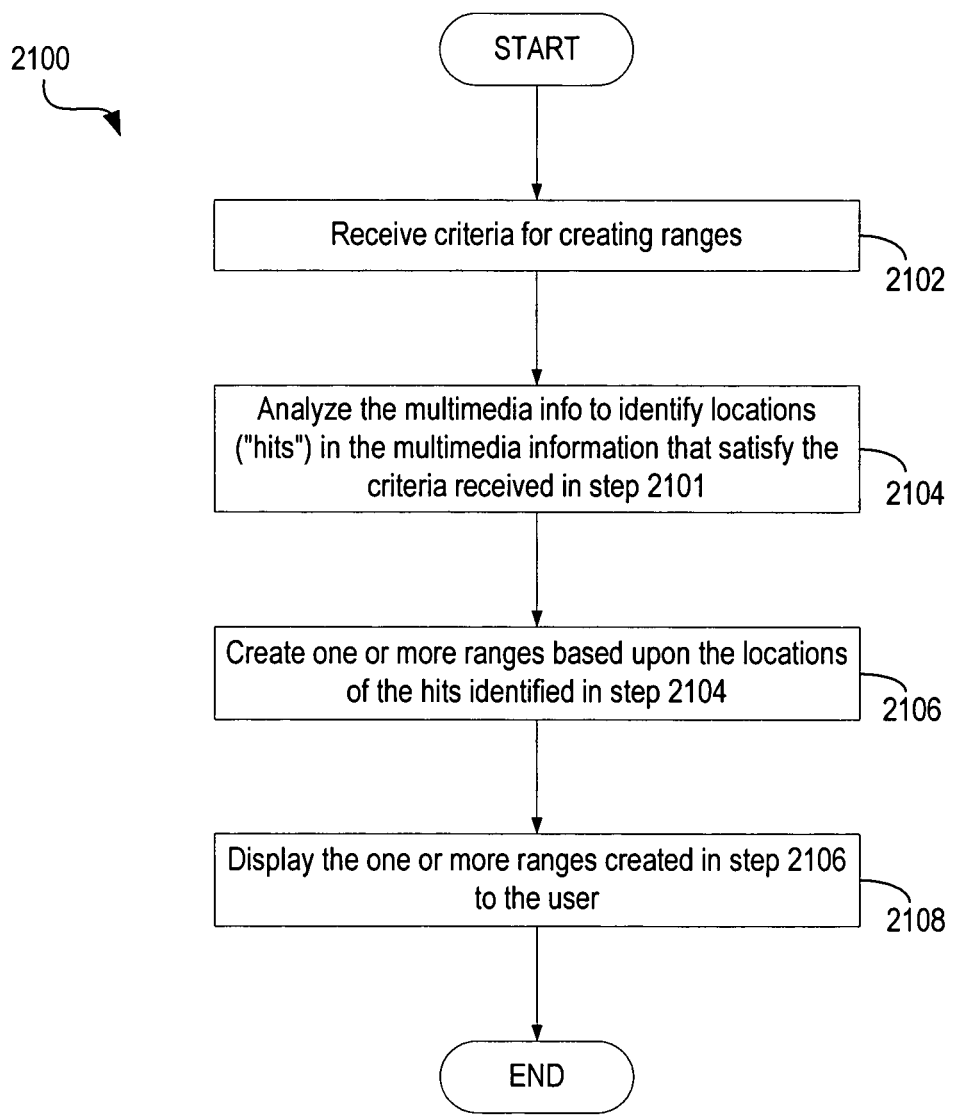
FIG. 21 is a simplified high-level flowchart depicting a method of automatically creating ranges according to an embodiment of the present invention.

As previously stated, ranges may be specified manually by a user or may be selected automatically by the present invention. The automatic selection of ranges may be performed by software modules executing on server 104, hardware modules coupled to server 104, or combinations thereof. FIG. 21 is a simplified high-level flowchart 2100 depicting a method of automatically creating ranges according to an embodiment of the present invention. The method depicted in FIG. 21 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 21 is merely illustrative of an embodiment incorporating the present invention and does not limit the scope of the invention as recited in the claims. One of ordinary skill in the art would recognize other variations, modifications, and alternatives.

As depicted in FIG. 21, the method is initiated when server 104 receives criteria for creating ranges (step 2102). The user of the present invention may specify the criteria via GUI 2000. For example, in GUI 2000 depicted in FIG. 20A, area 2040 displays various options that can be selected by the user to specify criteria for automatic creation of ranges. In GUI 2000 depicted in FIG. 20A, the user may select either "Topics" or "Words" as the range criteria. If the user selects "Topics", then information related to topics of interest to the user (displayed in area 2042) is identified as the range creation criteria. If the user selects "Words", then one or more words selected by the user in area 2044 of GUI 2000 are identified as criteria for automatically creating ranges. In alternative embodiments, the criteria for automatically creating ranges may be stored in a memory location accessible to server 104. For example, the criteria information may be stored in a file accessible to server 104. Various other types of criteria may also be specified according to the teachings of the present invention.

The multimedia information stored in the multimedia document is then analyzed to identify locations (referred to as "hits") in the multimedia information that satisfy the criteria received in step 2102 (step 2104). For example, if the user has specified that one or more words selected by the user in area 2044 are to be used as the range creation criteria, then the locations of the selected words are identified in the multimedia information. Likewise, if the user has specified topics of interest as the range creation criteria, then server 104 analyzes the multimedia information to identify locations in the multimedia information that are relevant to the topics of interest specified by the user. As described above, server 104 may analyze the multimedia information to identify locations of words or phrases associated with the topics of interest specified by the user. Information related to the topics of interest may be stored in a user profile file that is accessible to server 104. It should be apparent that various other techniques known to those skilled in the art may also be used to identify locations in the multimedia information that satisfy the range criteria received in step 2102.

One or more ranges are then created based upon the locations of the hits identified in step 2104 (step 2106). Various different techniques may be used to form ranges based upon locations of the hits. According to one technique, one or more ranges are created based upon the times associated with the hits. Hits may be grouped into ranges based on the proximity of the hits to each other. One or more ranges created based upon the locations of the hits may be combined to form larger ranges.

The ranges created in step 2106 are then displayed to the user using GUI 2000 (step 2108). Various different techniques may be used to display the ranges to the user. In FIG. 20A, each range is indicated by a bar displayed over thumbnail 2008-2.

Figure 22:
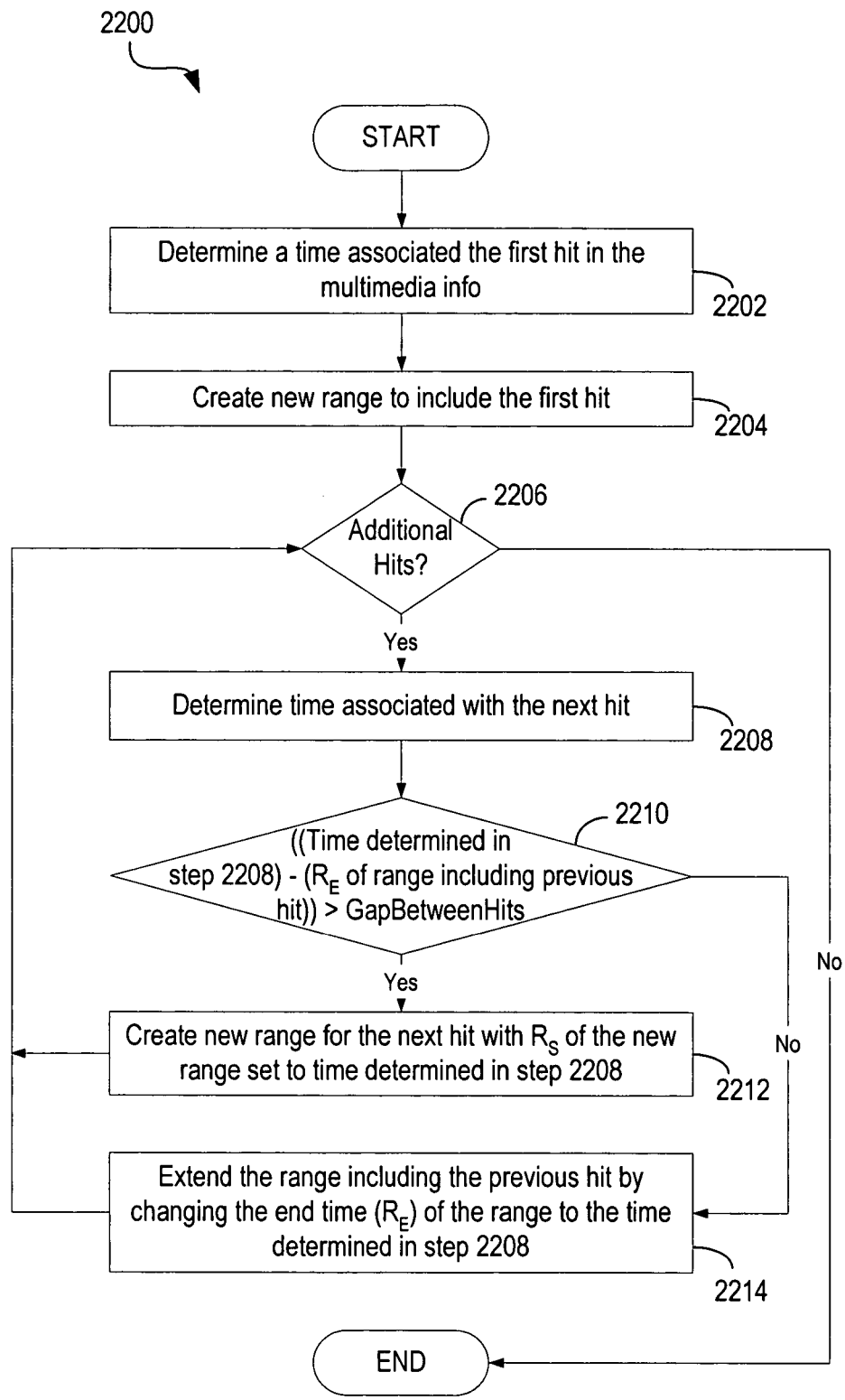
FIG. 22 is a simplified high-level flowchart depicting a method of automatically creating ranges based upon locations of hits in the multimedia information according to an embodiment of the present invention.

FIG. 22 is a simplified high-level flowchart 2200 depicting a method of automatically creating ranges based upon locations of hits in the multimedia information according to an embodiment of the present invention. The processing depicted in FIG. 22 may be performed in step 2106 depicted in FIG. 21. The method depicted in FIG. 22 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 22 is merely illustrative of an embodiment incorporating the present invention and does not limit the scope of the invention as recited in the claims. One of ordinary skill in the art would recognize other variations, modifications, and alternatives.

As depicted in FIG. 22, the method is initiated by determining a time associated he first hit in the multimedia information (step 2202). The first hit in the multimedia information corresponds to a hit with the earliest time associated with it (i.e., a hit that occurs before other hits in the multimedia information). A new range is then created to include the first hit such that $R_S$ for the new range is set to the time of occurrence of the first hit, and $R_E$ for the new range is set to some time value after the time of occurrence of the first hit (step 2204). According to an embodiment of the present invention, $R_E$ is set to the time of occurrence of the hit plus 5 seconds.

Server 104 then determines if there are any additional hits in the multimedia information (step 2206). Processing ends if there are no additional hits in the multimedia information. The ranges created for the multimedia information may then be displayed to the user according to step 2108 depicted in FIG. 21. If it is determined in step 2206 that additional hits exist in the multimedia information, then the time associated with the next hit is determined (step 2208).

Server 104 then determines if the time gap between the end time of the range including the previous hit and the time determined in step 2208 exceeds a threshold value (step 2210). Accordingly, in step 2210 server 104 determines if:

(Time determined in step 2208)−($R_E$ of range including previous hit)>GapBetweenHits wherein, GapBetweenHits represents the threshold time value. The threshold value is user configurable. According to an embodiment of the present invention, GapBetweenHits is set to 60 seconds.

If it is determined in step 2210 that the time gap between the end time of the range including the previous hit and the time determined in step 2208 exceeds the threshold value, then a new range is created to include the next hit such that $R_S$ for the new range is set to the time determined in step 2208, and $R_E$ for the new range is set to some time value after the time determined in step 2208 (step 2212). According to an embodiment of the present invention, $R_E$ is set to the time of occurrence of the hit plus 5 seconds. Processing then continues with step 2206.

If it is determined in step 2210 that the time gap between the end time of the range including the previous hit and the time determined in step 2208 does not exceed the threshold value, then the range including the previous hit is extended by changing the end time $R_E$ of the range to the time determined in step 2208 (step 2214). Processing then continues with step 2206.

According to the method depicted in FIG. 22, a single range is created for hits in the multimedia information that occur within a threshold value ("GapBetweenHits") from the previous range. At the end of the method depicted in FIG. 22, one or more ranges are automatically created based upon the range criteria.

According to an embodiment of the present invention, after forming one or more ranges based upon the times associated with the hits (e.g., according to flowchart 2200 depicted in FIG. 22), one or more ranges created based upon the locations of the hits may be combined with other ranges to form larger ranges. According to an embodiment of the present invention, a small range is identified and combined with a neighboring range if the time gap between the small range and the neighboring range is within a user-configurable time period threshold. If there are two neighboring time ranges that are within the time period threshold, then the small range is combined with the neighboring range that is closest to the small range. The neighboring ranges do not need to be small ranges. Combination of smaller ranges to form larger ranges is based upon the premise that a larger range is more useful to the user than multiple small ranges.

Figure 23:
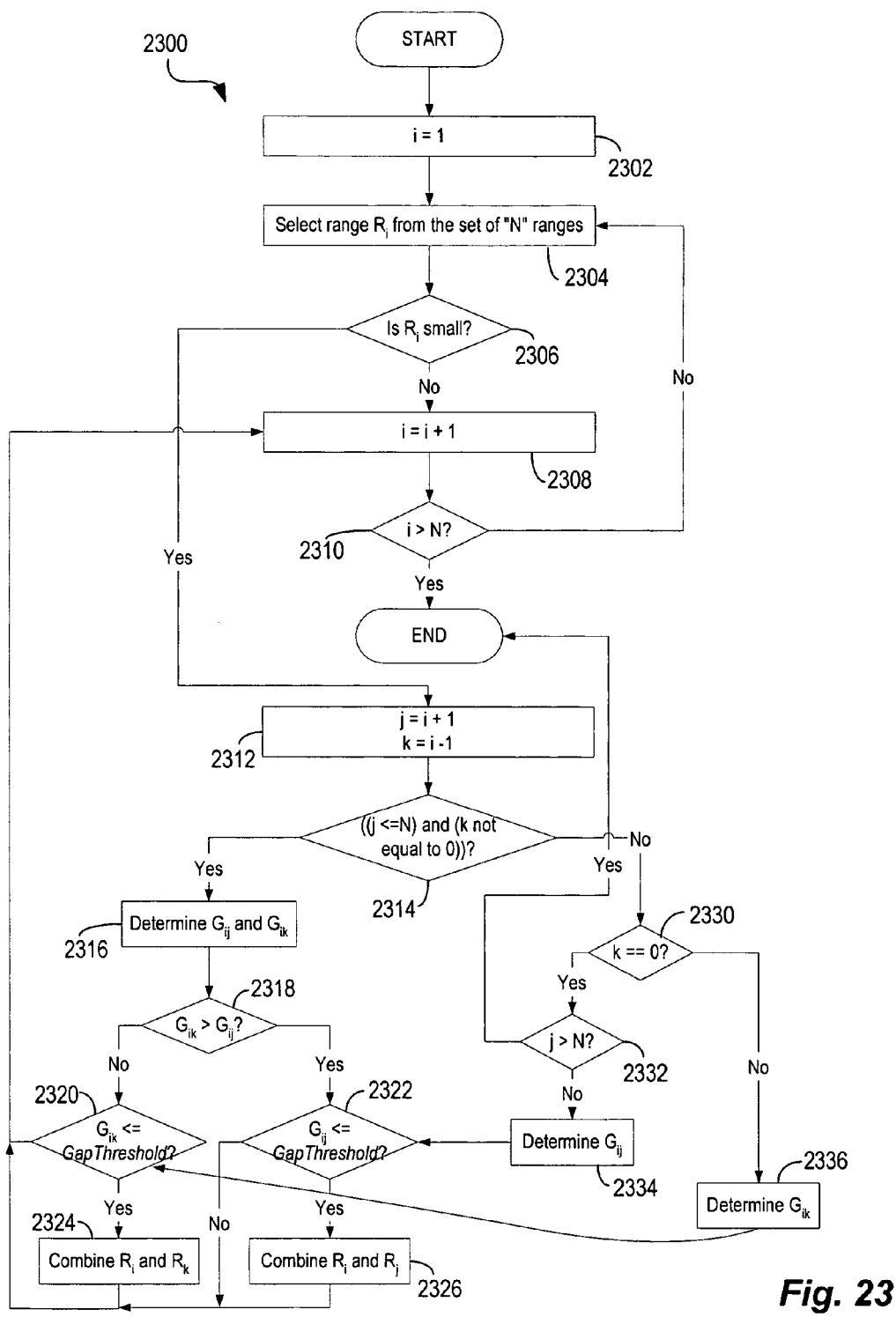
FIG. 23 is a simplified high-level flowchart depicting a method of combining one or more ranges based upon the size of the ranges and the proximity of the ranges to neighboring ranges according to an embodiment of the present invention.

FIG. 23 is a simplified high-level flowchart 2300 depicting a method of combining one or more ranges based upon the size of the ranges and the proximity of the ranges to neighboring ranges according to an embodiment of the present invention. The processing depicted in FIG. 23 may be performed in step 2106 depicted in FIG. 21 after processing according to flowchart 2200 depicted in FIG. 22 has been performed. The method depicted in FIG. 23 may be performed by server 104, by client 102, or by server 104 and client 102 in combination. For example, the method may be executed by software modules executing on server 104 or on client 102, by hardware modules coupled to server 104 or to client 102, or combinations thereof. In the embodiment described below, the method is performed by server 104. The method depicted in FIG. 23 is merely illustrative of an embodiment incorporating the present invention and does not limit the scope of the invention as recited in the claims. One of ordinary skill in the art would recognize other variations, modifications, and alternatives.

In order to describe the processing performed in FIG. 23, it is assumed that "N" ranges (N≥1) have been created for the multimedia information displayed by the GUI. The ranges may have been created according to the processing depicted in flowchart 2200 in FIG. 22. Each range $R_i$, where (1≤i≤N), in the set of "N" ranges has a start time $R_S$ and an end time $R_E$ associated with it. For a range $R_i$, the neighbors of the range include range $R_{(i-1)}$ and range $R_{(i+1)}$, where $R_E$ of range $R_{(i-1)}$ occurs before $R_S$ of range $R_i$ and $R_E$ of range $R_i$ occurs before $R_S$ of range $R_{(i+1)}$. Range $R_{(i-1)}$ is referred to as a range that occurs before range $R_i$. Range $R_{(i+1)}$ is referred to as a range that occurs after range $R_i$.

As depicted in FIG. 23, the method is initiated by initializing a variable "i" to 1 (step 2303). A range $R_i$ is then selected (step 2304). During the first pass through flowchart 2300, the first range (i.e., the range having the earliest $R_S$ time) in the set of "N" ranges is selected. Subsequent ranges are selected in subsequent passes.

Server 104 then determines if range $R_i$ selected in step 2304 qualifies as a small range. According to an embodiment of the present invention, a threshold value "SmallRangeSize" is defined and a range is considered a small range if the time span of the range is less than or equal to threshold value SmallRangeSize. Accordingly, in order to determine if range $R_i$ qualifies as a small range, the time span of range $R_i$ selected in step 2304 is compared to threshold time value "SmallRangeSize" (step 2306). The value of SmallRangeSize may be user-configurable. According to an embodiment of the present invention, SmallRangeSize is set to 8 seconds.

If it is determined in step 2306 that the range $R_i$ selected in step 2304 does not qualify as a small range (i.e., the time span ($R_E$–$R_S$) of range $R_i$ is greater than the threshold value SmallRangeSize), then the range is not a candidate for combination with another range. The value of variable "i" is then incremented by one (step 2308) to facilitate selection of the next range in the set of "N" ranges. Accordingly, according to the teachings of the present invention depicted in FIG. 23, only ranges that qualify as small ranges are eligible for combination with other neighboring ranges.

After step 2308, server 104 determines if all the ranges in the set of "N" ranges have been processed. This is done by determining if the value of "i" is greater than the value of "N" (step 2310). If the value of "i" is greater than "N", it indicates that all the ranges in the set of ranges for the multimedia information have been processed and processing of flowchart 2300 ends. If it is determined in step 2310 that "i" is less than or equal to "N", then it indicates that the set of "N" ranges comprises at least one range that has not been processed according to flowchart 2300. Processing then continues with step 2304 wherein the next range $R_i$ is selected.

Figure 24:
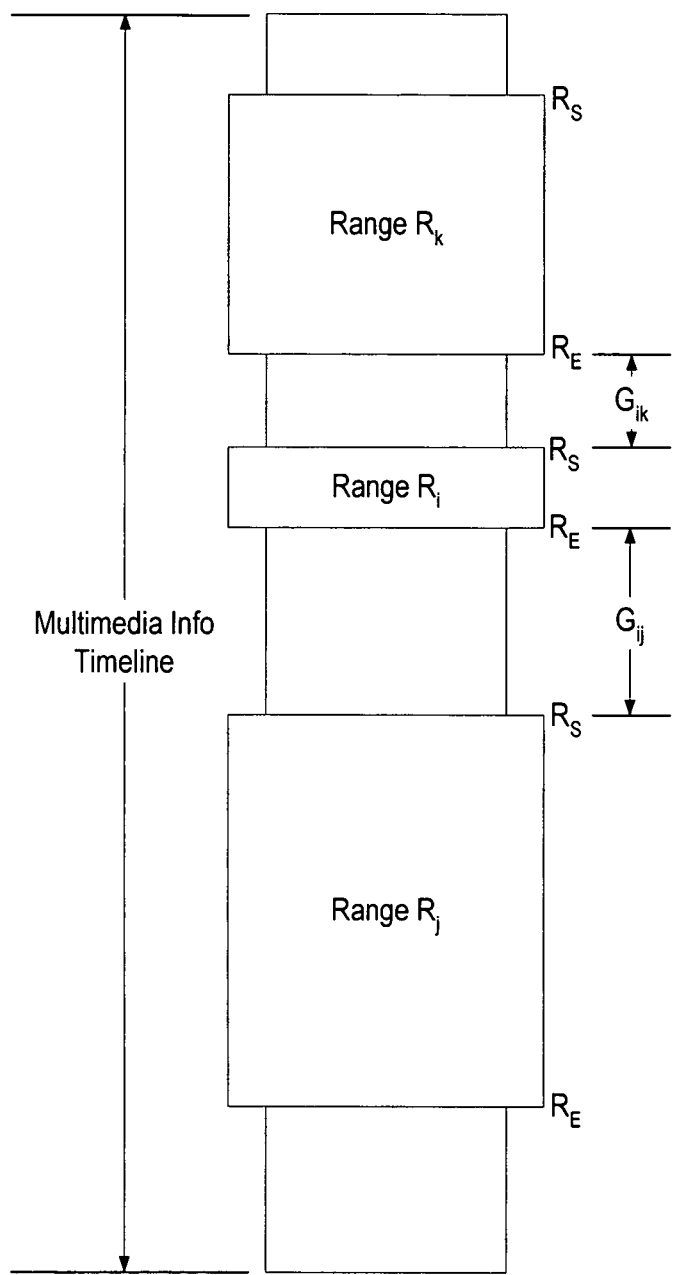
FIG. 24 depicts a simplified diagram showing the relationships between neighboring ranges according to an embodiment of the present invention.

If it is determined in step 2306 that range $R_i$ selected in step 2304 qualifies as a small range (i.e., the time span ($R_E$–$R_S$) of range $R_i$ is less than or equal to the threshold value SmallRangeSize), the present invention then performs processing to identify a range that is a neighbor of range $R_i$ (i.e., a range that occurs immediately before or after range $R_i$ selected in step 2304) with which range $R_i$ can be combined. In order to identify such a range, server 104 initializes variables to facilitates election of ranges that are neighbors of range $R_i$ selected in step 2304 (step 2312). A variable "j" is set to the value (i+1) and a variable "k" is set to the value "(i–1)". A variable "j" is used to refer to a range that is a neighbor of range $R_i$ and occurs after range $R_i$, and a variable "k" is used to refer to a range that is a neighbor of range $R_i$ and occurs before range $R_i$. FIG. 24 depicts a simplified diagram showing the relationship between ranges $R_i$, $R_j$, and $R_k$. As shown in FIG. 24, range $R_i$ occurs after range $R_k$ (i.e., $R_S$ of $R_i$ occurs after $R_E$ of $R_k$) and before range $R_j$ (i.e., $R_E$ of $R_i$ occurs before $R_S$ of $R_j$).

Server 104 then determines if the set of "N" ranges created for the multimedia information includes a range that is a neighbor of range $R_i$ selected in step 2304 and occurs before range $R_i$, and a range that is a neighbor of range $R_i$ and occurs after range $R_i$. This is done by determining the values of variables "j" "k". If the value of "j" is greater than "N", it indicates that the range $R_i$ selected in step 2304 is the last range in the set of "N" ranges created for the multimedia information implying that there is no range that occurs after range $R_i$. If the value of "k" is equal to zero, it indicates that the range $R_i$ selected in step 2304 is the first range in the set of "N" ranges created for the multimedia information implying that there is no range that occurs before range $R_i$.

Accordingly, server 104 determines if range $R_i$ has a neighboring range that occurs before $R_i$ and a neighboring range that occurs after $R_i$. This is done by determining if the value of "j" is less than "N" if the value of "k" is not equal to zero (step 2314). If the condition in step 2314 is satisfied, then it indicates that the set of "N" ranges comprises a range that is a neighbor of range $R_i$ selected in step 2304 and occurs before range $R_i$, and a range that is a neighbor of range $R_i$ and occurs after range $R_i$. In this case, processing continues with step 2316. If the condition in step 2314 is not satisfied, then it indicates that range $R_i$ selected in step 2304 is either the first range in the set of "N" ranges implying that there is no range that occurs before range $R_i$, and/or that range $R_i$ selected in step 2304 is the last range in the set of "N" ranges implying that there is no range that occurs after range $R_i$. In this case, processing continues with step 2330.

If the condition in step 2314 is determined to be true, server 104 then determines time gaps between ranges $R_i$ and $R_k$ and between ranges $R_i$ and $R_j$ (step 2316). The time gap (denoted by $G_{ik}$) between ranges $R_i$ and $R_k$ is calculated by determining the time between $R_S$ of range $R_i$ and $R_E$ of $R_k$, (see FIG. 24) i.e., $$G_{ik} = (R_S \text{ of } R_i) - (R_E \text{ of } R_k)$$

The time gap (denoted by $G_{ij}$) between ranges $R_i$ and $R_j$ is calculated by determining the time between $R_E$ of range $R_i$ and $R_S$ of $R_j$, (see FIG. 24) i.e., $$G_{ij} = (R_S \text{ of } R_j) - (R_E \text{ of } R_i)$$

According to the teachings of the present invention, a small range is combined with a neighboring range only if the gap between the small range and the neighboring range is less than or equal to a threshold gap value. The threshold gap value is user configurable. Accordingly, server 104 then determines the sizes of the time gaps to determine if range $R_i$ can be combined with one of its neighboring ranges.

Server 104 then determines which time gap is larger by comparing the values of time gap $G_{ik}$ and time gap $G_{ij}$ (step 2318). If it is determined in step 2318 that $G_{ik}$ is greater that $G_{ij}$, it indicates that range $R_i$ selected in step 2304 is closer to range $R_j$ than to range $R_k$, and processing continues with step 2322. Alternatively, if it is determined in step 2318 that $G_{ik}$ is not greater that $G_{ij}$, it indicates that the time gap between range $R_i$ selected in step 2304 and range $R_k$ is equal to or less than the time gap between ranges $R_i$ and $R_j$. In this case processing continues with step 2320.

If it is determined in step 2318 that $G_{ik}$ is not greater than $G_{ij}$, server 104 then determines if the time gap ($G_{ik}$) between range $R_i$ and range $R_k$ is less than or equal to a threshold gap value "GapThreshold" (step 2320). The value of GapThreshold is user configurable. According to an embodiment of the present invention, GapThreshold is set to 90 seconds. It should be apparent that various other values may also be used for GapThreshold.

If it is determined in step 2320 that the time gap ($G_{ik}$) between range $R_i$ and range $R_k$ is less than or equal to threshold gap value GapThreshold (i.e., $G_{ik} \leq$ GapThreshold), then ranges $R_i$ and $R_k$ are combined to form a single range (step 2324). The process of combining ranges $R_i$ and $R_k$ involves changing the end time of range $R_k$ to the end time of range $R_i$ (i.e., $R_E$ of $R_k$ is set to $R_E$ of $R_i$) and deleting range $R_i$. Processing then continues with step 2308 wherein the value of variable "i" is incremented by one.

If it is determined in step 2320 that time gap $G_{ik}$ is greater than GapThreshold (i.e., $G_{ik} >$ GapThreshold), it indicates that both ranges $R_j$ and $R_k$ are outside the threshold gap value and as a result range $R_i$ cannot be combined with either range $R_j$ or $R_k$. In this scenario, processing continues with step 2308 wherein the value of variable "i" is incremented by one.

Referring back to step 2318, if it is determined that $G_{ik}$ is greater than $G_{ij}$, server 104 then determines if the time gap ($G_{ij}$) between ranges $R_i$ and $R_j$ is less than or equal to the threshold gap value "GapThreshold" (step 2322). As indicated above, the value of GapThreshold is user configurable. According to an embodiment of the present invention, GapThreshold is set to 90 seconds. It should be apparent that various other values may also be used for GapThreshold.

If it is determined in step 2322 that the time gap ($G_{ij}$) between ranges $R_i$ and $R_j$ is less than or equal to threshold gap value GapThreshold (i.e., $G_{ij} \leq$ GapThreshold), then ranges $R_i$ and $R_j$ are combined to form a single range (step 2326). The process of combining ranges $R_i$ and $R_j$ involves changing the start time of range $R_j$ to the start time of range $R_i$ (i.e., $R_S$ of $R_j$ is set to $R_S$ of $R_i$) and deleting range $R_i$. Processing then continues with step 2308 wherein the value of variable "i" is incremented by one.

If it is determined in step 2322 that time gap $G_{ij}$ is greater than GapThreshold (i.e., $G_{ij} >$ GapThreshold), it indicates that both ranges $R_j$ and $R_k$ are outside the threshold gap value and as a result range $R_i$ cannot be combined with either range $R_j$ or $R_k$. In this scenario, processing continues with step 2308 wherein the value of variable "i" is incremented by one.

If server 104 determines that the condition in step 2314 is not satisfied, server 104 then determines if the value of "k" is equal to zero (step 2330). If the value of "k" is equal to zero, it indicates that the range $R_i$ selected in step 2304 is the first range in the set of "N" ranges created for the multimedia information which implies that there is no range in the set of "N" ranges that occurs before range $R_i$. In this scenario, server 104 then determines if the value of variable "j" is greater than "N" (step 2332). If the value of "j" is also greater than "N", it indicates that the range $R_i$ selected in step 2304 is not only the first range but also the last range in the set of "N" ranges created for the multimedia information which implies that there is no range in the set of ranges that comes after range $R_i$. If it is determined in step 2330 that "k" is equal to zero and that "j">N in step 2332, it indicates that the set of ranges for the multimedia information comprises only one range (i.e., N==1). Processing depicted in flowchart 2300 is then ended since no ranges can be combined.

If it is determined in step 2330 that "k" is equal to zero and that "j" is not greater than "N" in step 2332, it indicates that the range $R_i$ selected in step 2304 represents the first range in the set of "N" ranges created for the multimedia information, and that the set of ranges includes at least one range $R_j$ that is a neighbor of range $R_i$ and occurs after range $R_i$. In this case, the time gap $G_{ij}$ between range $R_i$ and range $R_j$ is determined (step 2334). As indicated above, time gap $G_{ij}$ is calculated by determining the time between $R_E$ of range $R_i$ and $R_S$ of $R_j$, i.e., $$G_{ij} = (R_S \text{ of } R_j) - (R_E \text{ of } R_i)$$

Processing then continues with step 2322 as described above.

If it is determined in step 2330 that "k" is not equal to zero, it indicates that the range $R_i$ selected in step 2304 represents the last range in the set of "N" ranges created for the multimedia information, and that the set of ranges includes at least one range $R_k$ that is a neighbor of range $R_i$ and occurs before range $R_i$. In this case, the time gap $G_{ik}$ between range $R_i$ and range $R_k$ is determined (step 2336). As indicated above, time gap $G_{ik}$ is calculated by determining the time gap between $R_S$ of range $R_i$ and $R_E$ of $R_k$, i.e., $$G_{ik} = (R_S \text{ of } R_i) - (R_E \text{ of } R_k)$$

Processing then continues with step 2320 as described above.

Figure 25A:
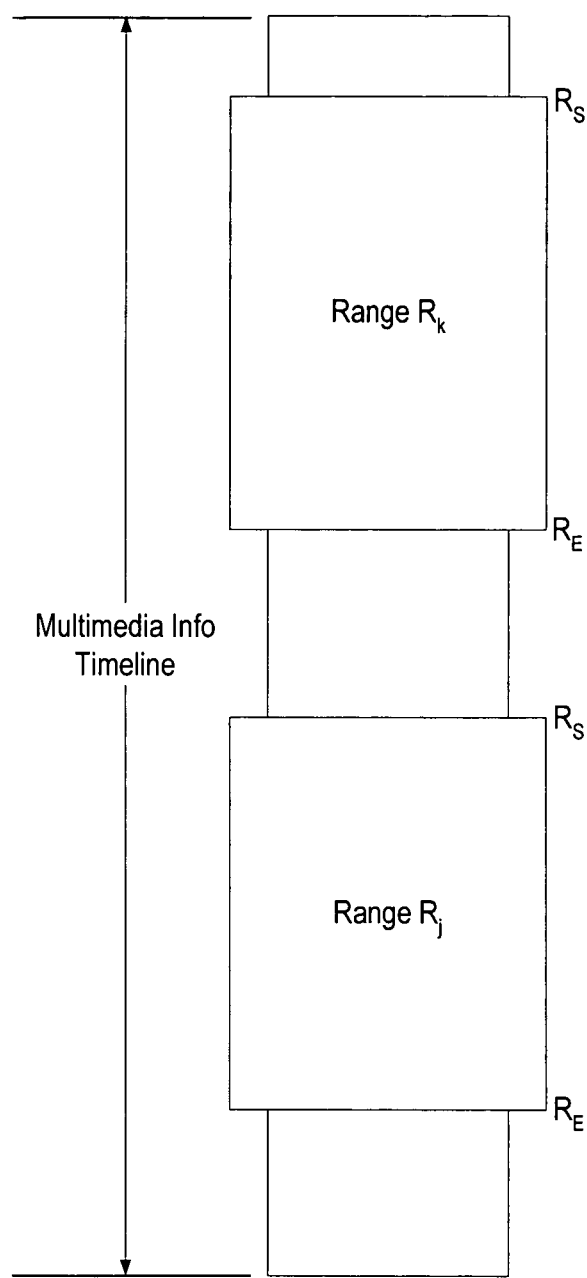
FIG. 25A depicts a simplified diagram showing a range created by combining ranges $R_i$ and $R_k$ depicted in FIG. 24 according to an embodiment of the present invention.
Figure 25B:
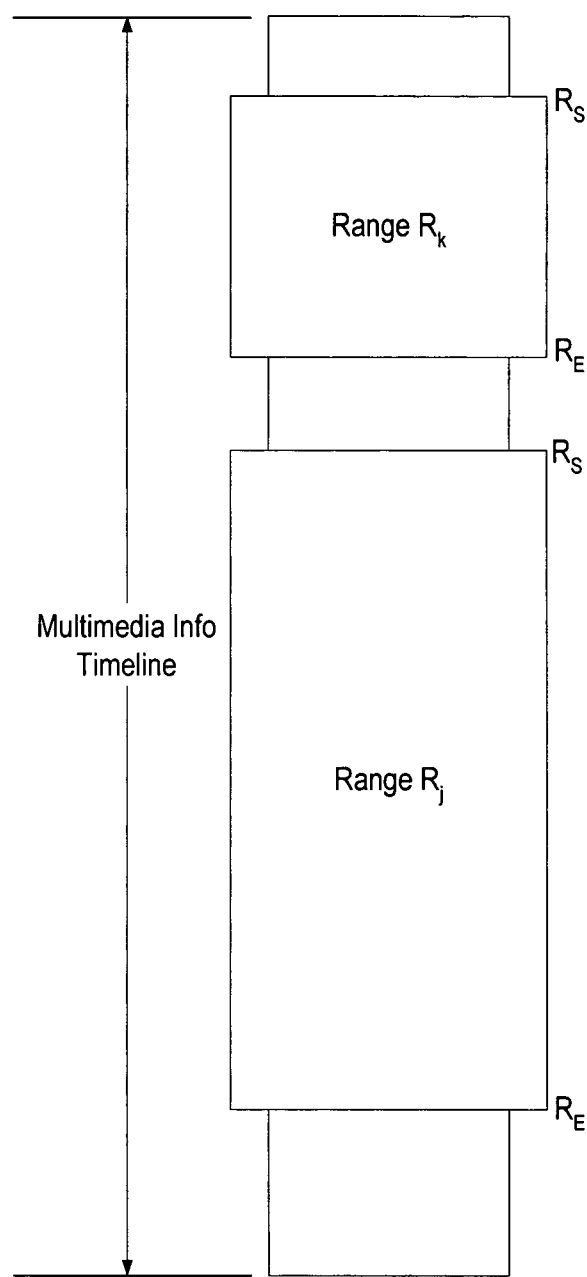
FIG. 25B depicts a simplified diagram showing a range created by combining ranges $R_i$ and $R_j$ depicted in FIG. 24 according to an embodiment of the present invention.

FIG. 25A depicts a simplified diagram showing a range created by combining ranges $R_i$ and $R_k$ depicted in FIG. 24 according to an embodiment of the present invention. FIG. 25B depicts a simplified diagram showing a range created by combining ranges $R_i$ and $R_j$ depicted in FIG. 24 according to an embodiment of the present invention.

As indicated above, the processing depicted in FIG. 23 may be performed after one or more ranges have been created according to the times associated with the hits according to flowchart 2200 depicted in FIG. 22. According to an embodiment of the present invention, after the ranges have been combined according to flowchart 2300 depicted in FIG. 23, the ranges may then be displayed to the user in GUI 2000 according to step 2108 in FIG. 21.

According to an alternative embodiment of the present invention, after combining ranges according to flowchart 2300 depicted in FIG. 23, a buffer time is added to the start time and end time of each range. A user may configure the amount of time (BufferStart) to be added to the start time of each range and the amount of time (BufferEnd) to be added to the end time of each range. The buffer times are added to a range so that a range does not start immediately on a first hit in the range and stop immediately at the last hit in the range. The buffer time provides a lead-in and a trailing-off for the information contained in the range and thus provides a better context for the range.

A buffer is provided at the start of a range by changing the $R_S$ time of the range as follows:

$R_S$ of range=($R_S$ of range before adding buffer)−BufferStart

A buffer is provided at the end of a range by changing the $R_E$ time of the range as follows:

$R_E$ of range=($R_E$ of range before adding buffer)+BufferEnd

Figure 26:
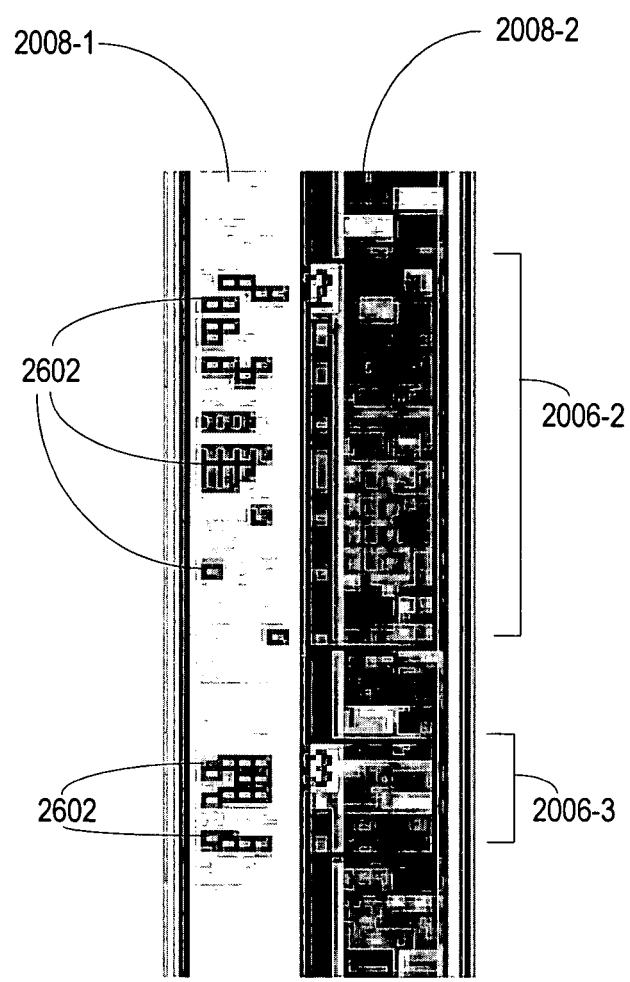
FIG. 26 depicts a zoomed-in version of a GUI depicting ranges that have been automatically created according to an embodiment of the present invention.

FIG. 26 depicts a zoomed-in version of GUI 2000 depicting ranges that have been automatically created according to an embodiment of the present invention. A plurality of hits 2602 satisfying criteria provided by the user are marked in thumbnail 2008-1 that displays text information. According to an embodiment of the present invention, the hits represent words and/or phrases related to user-specified topics of interest. As depicted in FIG. 26, two ranges 2006-2 and 2006-3 have been automatically created based upon locations of the hits. Range 2006-2 has been created by merging several small ranges according to the teachings of the present invention (e.g., according to flowchart 2300 depicted in FIG. 23).

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. For example, the processing for generating a GUI according to the teachings of the present invention may be performed by server 104, by client 102, by another computer, or by the various computer systems in association.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of displaying recorded information of a multimedia document, including audio information and video information, the method comprising:
    displaying, in a first display area, a textual representation of the audio information associated with the multimedia document;
    displaying, in a second display area, a pictorial representation of the video information associated with the multimedia document, the pictorial representation including one or more video keyframes, wherein the textual representation and the pictorial representation are temporally synchronized with each other along a timeline;
    receiving a search term after displaying the textual and pictorial representations;
    determining a plurality of locations in the textual representation that include the search term, each location having an associated time along the timeline;
    identifying a first location and a second location from the plurality of locations;
    determining that a first time associated with the first location and a second time associated with the second location satisfy a proximity criteria;
    generating a first range encompassing the first and the second locations, wherein the first range comprises a portion of the multimedia document occurring between a first start time and a first end time along the timeline;
    visually emphasizing the first range; and
    visually distinguishing every occurrence of the search term within the textual representation from a remainder of the textual representation.

2. The method of claim 1 wherein:
    if the recorded information comprises at least one of audio information or closed-caption text information;
    the textual representation of the audio information comprises at least one of text information obtained from transcribing the audio information or text information obtained from the closed-caption text information; and
    the one or more video keyframes are extracted from the video information.

3. The method of claim 1 further comprising:
    displaying an identifier for each location from the plurality of locations.

4. The method of claim 1 further comprising:
    generating a second range including one or more locations from the plurality of locations, wherein the second range comprises a portion of the multimedia document occurring between a second start time and a second end time along the timeline;
    determining a time interval between the first range and the second range; and
    combining the first range and the second range to form a third range if the time interval is less than a threshold value, wherein the third range comprises a portion of the multimedia document occurring between the first start time and the second end time along the timeline.

5. A computer-implemented method of displaying information of a multimedia document, including audio information and video information, the method comprising:
    displaying a first thumbnail comprising text information obtained from transcribing the audio information associated with the multimedia document;
    displaying a second thumbnail comprising a plurality of video keyframes extracted from the video information associated with the multimedia document, wherein the first thumbnail and the second thumbnail are temporally synchronized with each other along a timeline;
    receiving from a user information identifying a user-provided criterion after displaying the first and the second thumbnails, the user-provided criterion comprising a topic of interest;
    analyzing the text information to determine one or more portions of the audio information displayed in the first thumbnail, each of the one or more portions of the audio information has a start time and an end time along the timeline, and relates to the topic of interest;
    analyzing the plurality of video keyframes to identify one or more video keyframes in the displayed second thumbnail that are relevant to the topic of interest, each video keyframe having an associated time along the timeline;
    identifying a first section within the first thumbnail, the first section including a first subset of the one or more portions of the audio information that satisfy a proximity constraint, wherein the first section comprises a portion of the multimedia document occurring between a first start time and a first end time along the timeline;
    visually indicating the first section; and
    visually distinguishing each of the one or more portions of the audio information that relate to the topic of interest displayed in the first thumbnail from a remainder of the first thumbnail.

6. The method of claim 5 further comprising:
    identifying a second section within the first thumbnail, the second section including a second subset of the one or more portions of the audio information that satisfy the proximity constraint, wherein the second section comprises a portion of the multimedia document occurring between a second start time and a second end time along the timeline;

determining that a time interval between the first section and the second section is less than a threshold value; and combining the first section and the second section to form a third section, wherein the third section comprises a portion of the multimedia document occurring between the first start time and the second end time along the timeline.

7. A non-transitory computer-readable storage medium for storing computer code for displaying recorded information of a multimedia document comprising:

code for displaying a textual representation of audio information associated with the multimedia document in a first display area of a display and a pictorial representation of video information associated with the multimedia document in a second display area of the display, the pictorial representation including one or more video keyframes, wherein the textual representation and the pictorial representation are temporally synchronized with each other along a timeline;

code for receiving, from a user, information identifying a user-provided criterion after displaying the textual and the pictorial representations, the user-provided criterion comprising a search term;

code for determining one or more locations in the textual representation of the audio information using the user-provided criterion, wherein each location in the textual representation of the audio information includes an occurrence of the search term;

code for determining that a first location and a second location in the textual representation of the audio information satisfy a proximity criteria;

code for visually identifying a first section in the textual representation of the audio information, wherein the first section includes the first location and the second location and comprises a portion of the multimedia document occurring between an associated first start time and a first end time along the timeline; and code for visually distinguishing every occurrence of the search term within the textual representation from a remainder of the textual representation.

8. The non-transitory computer-readable storage medium of claim 7 further comprising:

code for determining a second section in the textual representation of the audio information, wherein the second section includes (i) a third location and a fourth location in the textual representation of the audio information that satisfy the proximity criteria and (ii) comprises a portion of the multimedia document occurring between a second start time and a second end time along the timeline;

code for determining that a time interval between the first section and the second section is less than a threshold value; and code for combining the first section and the second section to form a third section, wherein the third section comprises a portion of the multimedia document occurring between the first start time and the second end time along the timeline.

9. The non-transitory computer-readable storage medium of claim 8 further comprising:

code for visually distinguishing the first, the second, the third, and the fourth locations from a remainder of the textual representation of the audio information.

10. The non-transitory computer-readable storage medium of claim 8 further comprising:

code for displaying an identifier for each of the first, the second, the third, and the fourth locations.

11. The non-transitory computer-readable storage medium of claim 7 wherein:

the recorded information includes closed-caption text information;

the textual representation of the audio information comprises at least one of: text information obtained from transcribing the audio information or text information obtained from the closed-caption text information; and the one or more video keyframes are extracted from the video information.

12. A non-transitory computer-readable storage medium for storing computer code for displaying information of a multimedia document, including audio information and video information comprising:

code for displaying a first thumbnail comprising text information obtained from transcribing the audio information associated with the multimedia document;

code for displaying a second thumbnail comprising a plurality of video keyframes extracted from the video information associated with the multimedia document, wherein the first thumbnail and the second thumbnail are temporally synchronized with each other along a timeline;

code for receiving information from a user identifying a user-provided criterion, the user-provided criterion comprising a topic of interest;

code for analyzing the text information using the user-provided criterion to determine a plurality of locations within the text information, each location having a start time and an end time along the timeline and related to the topic of interest;

code for determining a first section within the text information, the first section including a first subset of locations from the plurality of locations that satisfy a proximity criteria, wherein the first section comprises a portion of the multimedia document occurring between a first start time and a first end time along the timeline;

code for visually indicating the first section; and code for visually distinguishing each of the plurality of locations related to the topic of interest within the text information from a remainder of the text information.

13. The non-transitory computer-readable storage medium of claim 12 further comprising:

code for determining a second section within the text information, the second section including a second subset of locations from the plurality of locations that satisfy the proximity criteria, wherein the second section comprises a portion of the multimedia document occurring between a second start time and a second end time along the timeline;

code for determining that a time interval between the first section and the second section is less than a threshold value;

code for combining the first and the second sections to generate a third section, wherein the third section comprises a portion of the multimedia document occurring between the first start time and the second end time along the timeline; and code for visually indicating the third section.

14. A method comprising:

receiving, by a computer system, multimedia information of a multimedia document, including audio information and video information;

displaying, by the computer system, in a first area, a textual representation of the audio information associated with the multimedia document, wherein the textual representation includes text that is generated by transcribing the audio information;

displaying, by the computer system, in a second area, a pictorial representation of the video information associated with the multimedia document, wherein the pictorial representation comprises a plurality of video frames extracted from the video information, wherein the textual representation and the pictorial representation are temporally synchronized with each other along a timeline;

receiving, by the computer system, a search term after displaying the textual and the pictorial representations;

determining, by the computer system, a plurality of locations within the textual representation that include the search term;

determining, by the computer system, a first section within the textual representation, the first section including one or more locations from the plurality of locations that satisfy a proximity constraint and wherein the first section comprises a portion of the multimedia document occurring between a first start time and a first end time along the timeline;

visually emphasizing the first section; and visually distinguishing every occurrence of the search term within the textual representation from a remainder of the textual representation.

15. The method of claim 14 further comprising:

determining a second section within the textual representation, the second section including one or more locations from the plurality of locations that satisfy the proximity constraint and wherein the second section comprises a portion of the multimedia document occurring between a second start time and a second end time along the timeline;

determining that a time interval between the first section and the second section is less than a predetermined value; and combining the first and the second sections to generate a third section, wherein the third section comprises a portion of the multimedia document occurring between the first start time and the second end time along the timeline.

* * * * *